(12) United States Patent
Moriyama et al.

(10) Patent No.: US 7,766,570 B2
(45) Date of Patent: Aug. 3, 2010

(54) RFID LABEL AND LABEL PRODUCING DEVICE

(75) Inventors: Satoru Moriyama, Iwakura (JP); Koshiro Yamaguchi, Kagamihara (JP); Mitsugi Tanaka, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 765 days.

(21) Appl. No.: 11/638,924

(22) Filed: Dec. 14, 2006

(65) Prior Publication Data

US 2007/0147939 A1 Jun. 28, 2007

(30) Foreign Application Priority Data

Dec. 20, 2005 (JP) .............................. 2005-366086

(51) Int. Cl.
B41J 11/00 (2006.01)
B41J 11/70 (2006.01)
B41J 15/04 (2006.01)
B41J 2/36 (2006.01)

(52) U.S. Cl. .................. 400/621; 400/621.1; 400/621.2; 156/353; 156/378; 156/384

(58) Field of Classification Search ................. 156/234, 156/248, 257, 353, 378, 384; 400/621, 621.1–621.2, 400/613

See application file for complete search history.

(56) References Cited

U.S. PATENT DOCUMENTS

| 6,019,865 A | 2/2000 | Palmer et al. |
| 2004/0211521 A1* | 10/2004 | Miyasaka .................... 156/384 |
| 2005/0025553 A1 | 2/2005 | Hohberger et al. |

FOREIGN PATENT DOCUMENTS

| EP | 1 018 703 A1 | 7/2000 |
| JP | 2001-030480 | * 2/2001 |
| JP | 2003-159838 | * 3/2003 |
| JP | 2004-155150 | 6/2004 |
| WO | WO 01-61646 A | 8/2001 |

* cited by examiner

*Primary Examiner*—Ren Yan
*Assistant Examiner*—Marissa L Ferguson-Samreth
(74) *Attorney, Agent, or Firm*—Day Pitney LLP

(57) ABSTRACT

A label producing device for producing an RFID label using a tag label tape with print includes a tape feed roller for feeding the tag label tape with print, a print head for performing printing on a print area provided in a cover film, a half-cut unit for cutting, on both end sides in the tape length direction of the tag label tape with print with respect to the print area, layers other than a separation sheet in the width direction to thereby form half-cut lines, and a cutting mechanism for cutting the tag label tape with print in the width direction on sides further toward the both ends in the tape length direction with respect to these two half-cut lines.

9 Claims, 38 Drawing Sheets

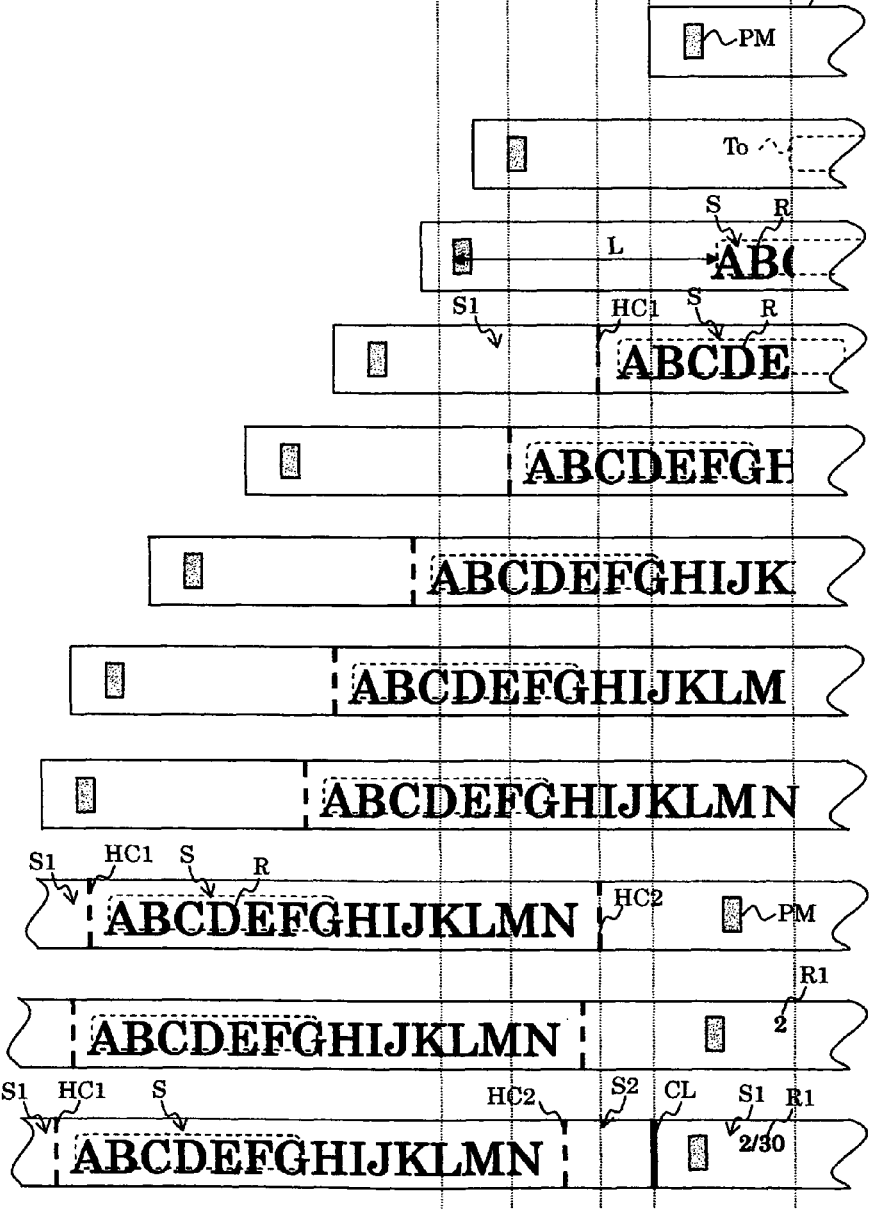

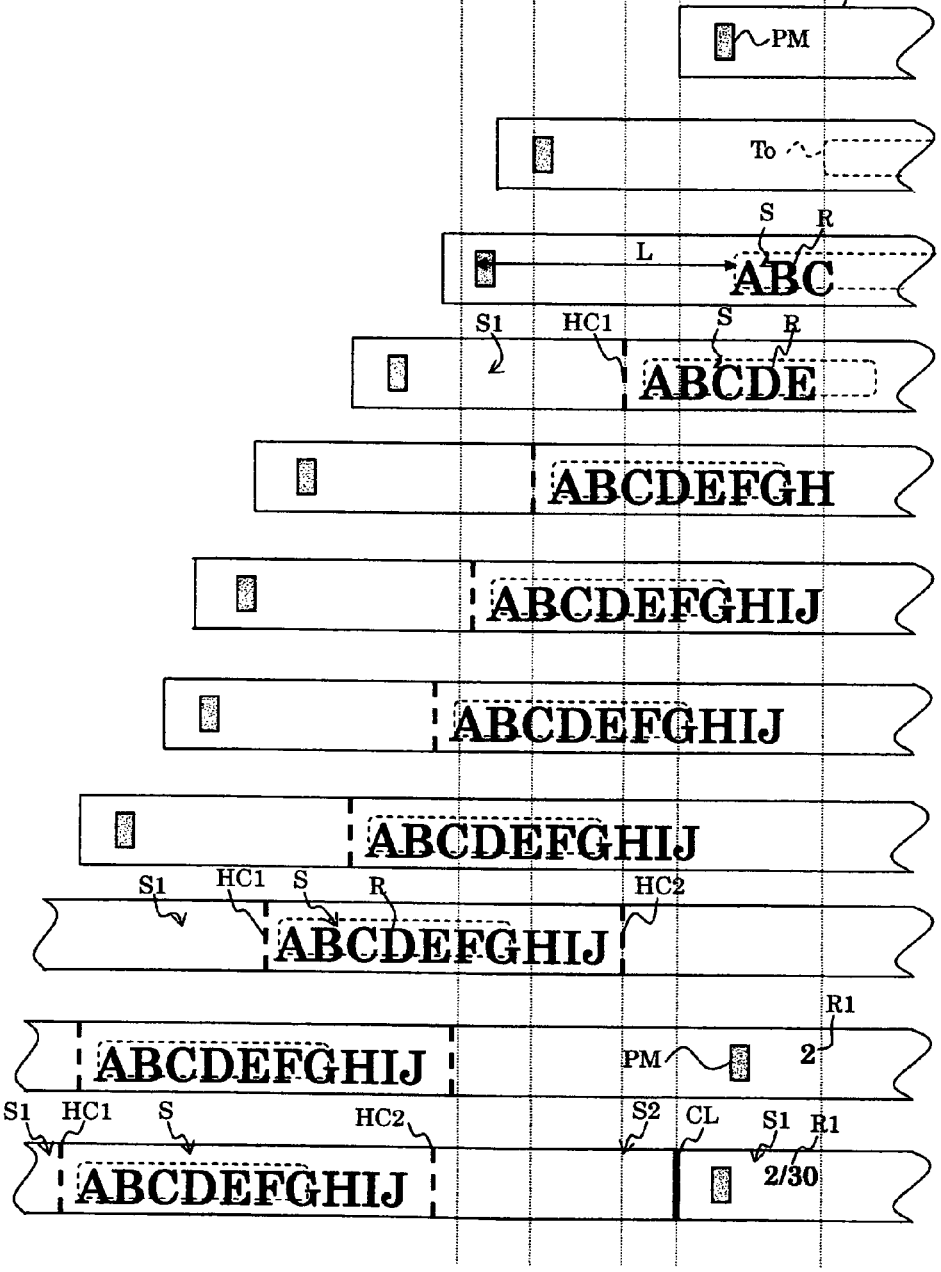

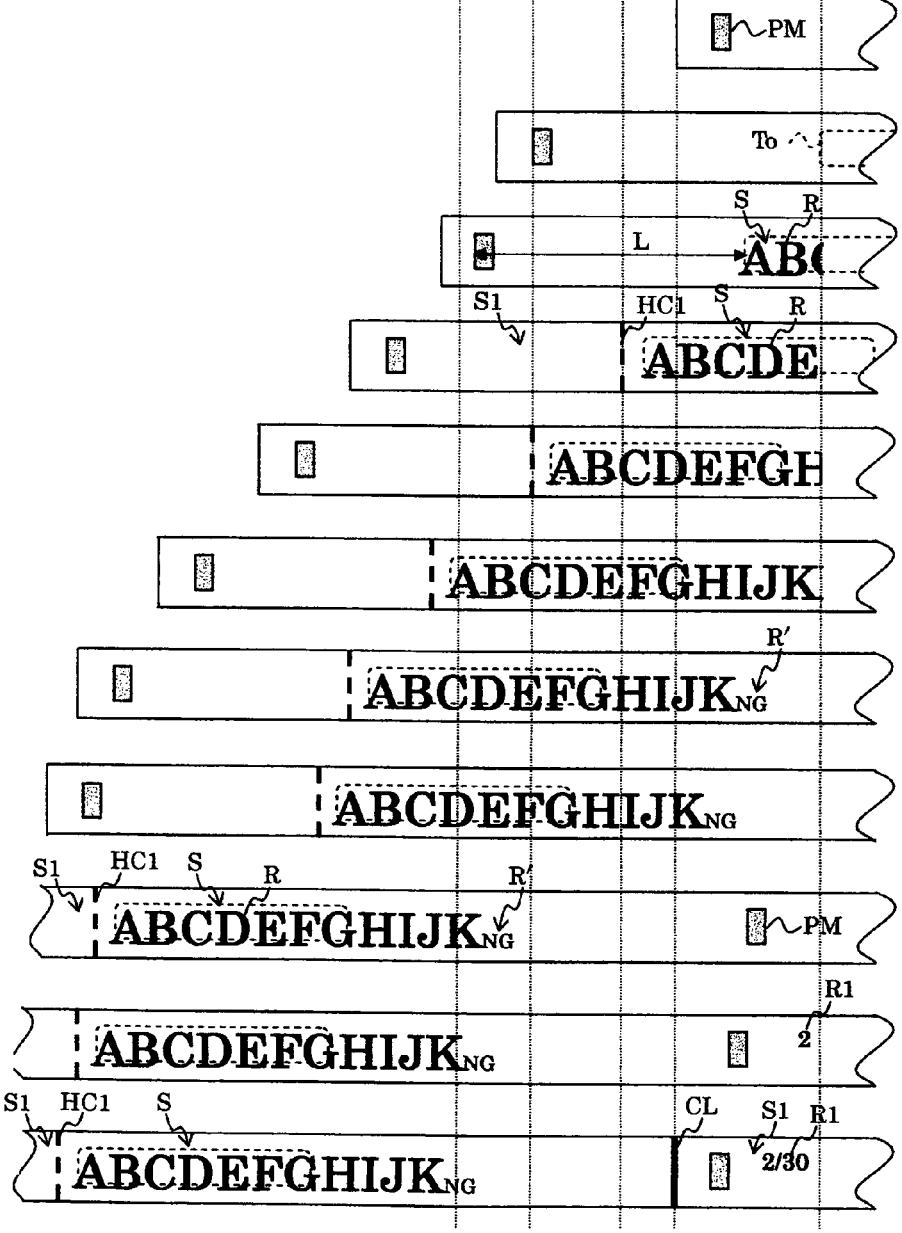

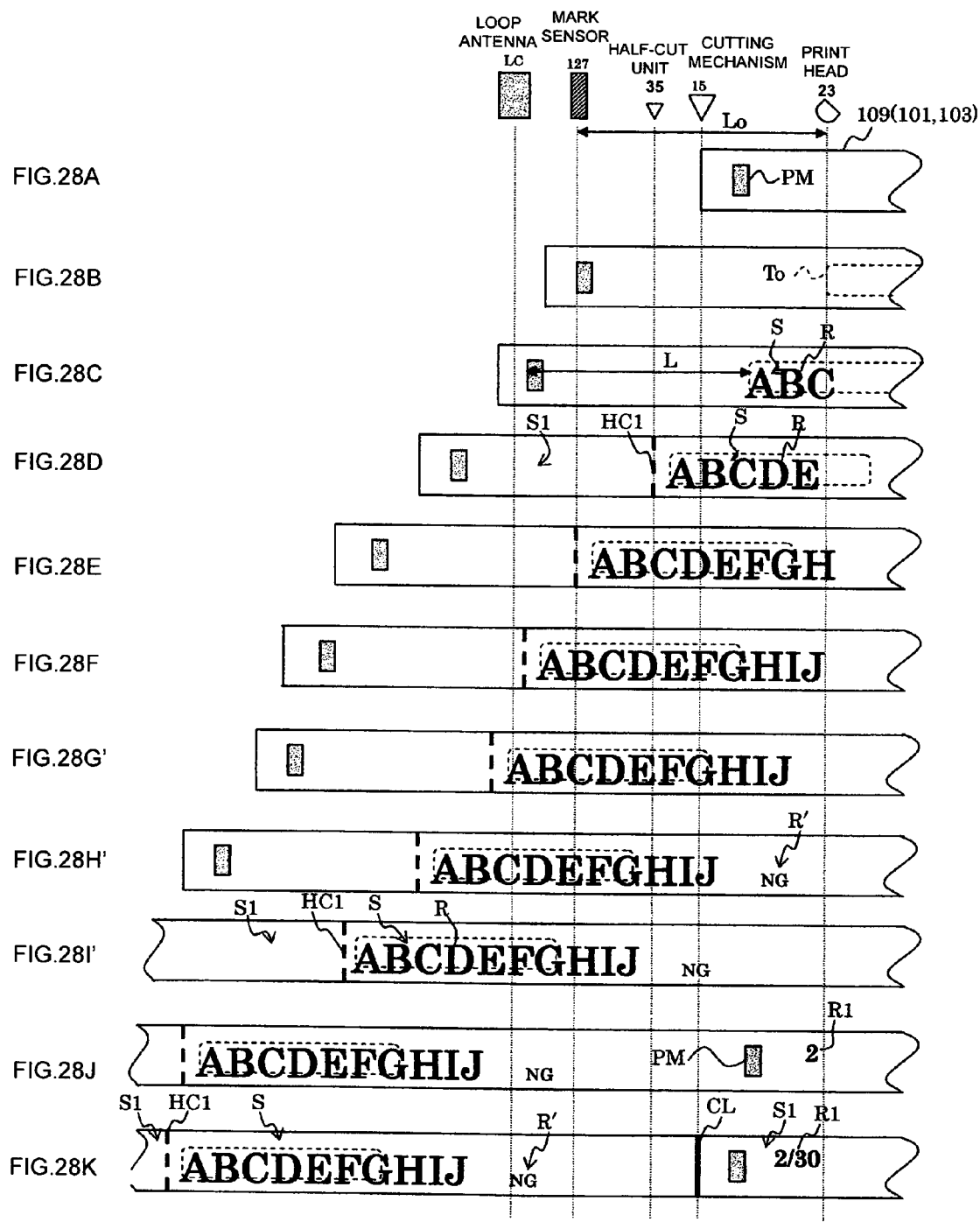

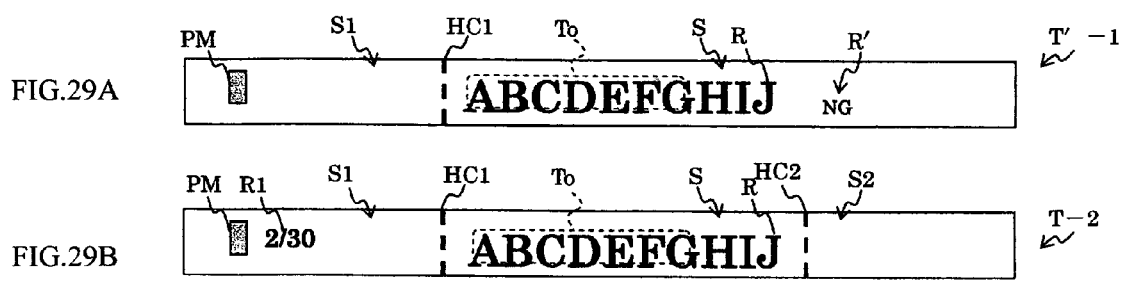

RFID LABEL AND LABEL PRODUCING DEVICE

CROSS-REFERENCE TO RELATED APPLICATIONS

This application claims priority from JP 2005-366086, filed Dec. 20, 2005, the contents of which are hereby incorporated by reference.

BACKGROUND OF THE INVENTION

1. Field of the Invention

The present disclosure relates to an RFID label equipped with an RFID circuit element for performing wireless communication of information with the outside, and a label producing device capable of producing the RFID label.

2. Description of the Related Art

Conventionally, there has already been proposed a tape printing device (label producing device) which has a tape serving as a print-receiving material accommodated in a roll within a cartridge (tape cassette) and is adapted to print desired characters onto the tape as it is paid out from the roll and discharge the tape in the form of a label (see, for example, JP,A,2004-155150).

In this related art, the tape printing device includes a roll having wound thereon a base tape (double-sided adhesive tape) equipped with a separation sheet, and a roll having wound thereon a print-receiving tape (film tape) that is bonded onto the base tape. The tape printing device is adapted to perform, while paying out the base tape and the print-receiving tape from these two rolls, predetermined printing on the print-receiving tape, and bond the print-receiving tape on which printing has been performed and the base tape together to prepare a label tape with print, which is then cut into a predetermined length by cutting device to thereby produce a label. Further, at this time, by performing a half-cut at a predetermined position from the front end portion of the label tape with print so as to cut the layers of the label tape with print other than the separation sheet, enhanced convenience is achieved by making it easier for the user to peel off the separation sheet when using the label.

In the above-mentioned related art, however, the half-cutting part is provided at one location for each one label (only on the front end side of the tape), and further the position of the half-cutting part is fixed. As a result, if the tape cutting part due to the cutting device is at a constant pitch at all times, when the length of a print in the label main body (print portion) located on the tape rear-end side with respect to the half-cutting part is short, a large margin portion remains on the tape rear-end side, which is inconvenient because the user must cut off this margin portion after producing the label by him/herself. Alternatively, if the cutting part by the cutting device can be varied in accordance with the print length, since the length of the label (label prior to the peeling of the separation sheet) as a whole that is produced by the label producing device when the print is short also becomes short, which makes the handling of the label difficult for the user, resulting in a deterioration in the ease of handling. That is, in either case, it is difficult to achieve both of eliminating the inconvenience of the user having to perform margin removal by making the length of the label main body portion variable in accordance with the print length and of enhancing the ease of handling by the user by making the length of the label as a whole constant irrespective of the print length.

SUMMARY OF THE INVENTION

An object of the present disclosure is to provide an RFID label that allows enhanced ease of handling by the user while making the length of the label main body portion variable in accordance with the print length, and a label producing device capable of producing the RFID label.

Means For Solving The Problem

In order to achieve the above-mentioned object, according to first aspect, there is provided an RFID label including: a base layer where an RFID circuit element is arranged, the RFID circuit element including an IC circuit part for storing information and an antenna for performing transmission/reception of information; a first affixing adhesive layer that affixes the base layer onto a target affixing object; a first separation layer that covers the first affixing adhesive layer; a first print area where printing corresponding to information stored in the IC circuit part is performed; and a half-cutting part where layers other than the first separation layer are cut in a width direction on both end sides in a label length direction with respect to the first print area.

An RFID label with print having predetermined printing performed on its first print area is formed by a laminate structure of three layers including the base layer to which the RFID circuit element is mounted, the first affixing adhesive layer for affixing the base layer onto the target affixing object, and the first separation layer covering the first affixing adhesive layer. Further, by providing a half-cutting part where the layers of the RFID label other than the first separation layer are cut, when peeling off the other layers (label main body) from the first separation layer in order to affix the label onto the target affixing object by the user, these layers can be easily peeled off with the fingertips.

In the first aspect, two such half-cutting parts are provided on both end sides of the first print area in the label length direction. Accordingly, for example, by using the half-cutting part on one end side of the first print area in the label length direction as a half-cutting part for discarding a margin as a non-printing portion during use of the label, another half-cutting part can be set on the other end side with respect to the label length direction. Accordingly, in accordance with the print length in the first print area, when the print length is long, the above-mentioned other half-cutting part is set so as to be far from the one end in the label length direction (close to the other end), and when the print length is short, this half-cutting part is set so as to be close to the one end in the label length direction (far from the other end), thereby making it possible to vary the length of the label main body mentioned above in conformity to the above-mentioned print length. Further, in this case, the length of the RFID label can be made constant at all times irrespective of the length of the label main body mentioned above (in other words, the print length). That is, since the length of the produced RFID label is the same irrespective of whether the print length in the label main body is long or the print length in the label main body is short, unlike in the prior art in which only one half-cutting part is provided, it is possible to ensure ease of handling of the RFID label by the user while making the length of the label main body portion variable in accordance with the print length.

According to second aspect, in the RFID label according to the first aspect, the RFID circuit element is provided on a center side in the label length direction with respect to two of the half-cutting parts.

Accordingly, when the label main body located on the center side with respect to the two half-cutting parts is peeled off from the first separation layer, the RFID circuit element can be reliably positioned on the label main body side.

According to third aspect, in the first aspect, the RFID label further includes a second print area where predetermined information is printed, the second print area being provided on a side opposite to the first print area across the half-cutting part.

By providing the second print area on the label end sides with respect to the two half-cutting parts which are not used when affixing the label by the user, and printing predetermined information on this second print area, the portion of the label that is discarded without being used when affixing the label by the user is effectively utilized in order to, for example, inform the user of the sequential order of each RFID circuit element, the remaining/used label number, and the like during the label production with the tag-label producing device, thereby achieving enhanced convenience.

According to fourth aspect, in the first aspect, the RFID label further includes a detection identifier provided on a side opposite to the first print area across the half-cutting part.

By providing the detection identifier on the label end sides with respect to the two half-cutting parts which are not used when affixing the label by the user, the portion of the label that is discarded without being used when affixing the label by the user is effectively utilized in order to, for example, achieve an improvement in feeding accuracy or positioning accuracy by detecting the above-mentioned identifier by the detection device during the feeding of a tag medium or print medium at the time of label production with the tag-label producing device. As a result, an improvement can be achieved in terms of the reliability of the label, label production efficiency, or the like.

According to fifth aspect, in the fourth aspect, the identifier is a color mark applied with a color different from that of the other portion.

Accordingly, for example, by detecting the color of a color mark whose color is different from that of the other portion by optical detection device, an improvement can be achieved in terms of the feeding accuracy or positioning accuracy at the time of label production.

According to sixth aspect, in the fourth aspect, the identifier is a hole provided so as to substantially penetrate the base layer, the first affixing adhesive layer, and the first separation layer.

Accordingly, for example, by detecting this through-hole by optical detection device, an improvement can be achieved in terms of the feeding accuracy or positioning accuracy.

According to seventh aspect, in the first aspect, the RFID label further includes: a first print-receiving medium layer including the first print area and bonded with the base layer; and a bonding adhesive layer that bonds the base layer onto the first print-receiving medium layer.

Accordingly, it is possible to form an RFID label with print having a laminate structure of five layers including: the first print-receiving medium layer including the first print area where predetermined printing has been performed; the bonding adhesive layer; the base layer to which the RFID circuit element is mounted; the first affixing adhesive layer for affixing the base layer onto a target affixing object; and the first separation layer that covers the first affixing adhesive layer.

In order to achieve the above-mentioned object, according to eighth aspect, there is provided a label producing device including: a feeding device that feeds a label tape with print, the label tape with print including a second print-receiving medium layer, a second affixing adhesive layer for affixing the second print-receiving medium layer onto a target affixing object, and a second separation layer that covers the second affixing adhesive layer; a printing device that performs printing on a first print area provided in the second print-receiving medium layer; a half-cutting device that cuts layers of the label tape with print other than the second separation layer in a width direction to form a half-cutting part, on each of both end sides in a tape length direction with respect to the first print area of the label tape with print; and a cutting device that forms a cutting part where the label tape with print is cut in the width direction, on sides further toward both ends in the tape length direction with respect to two of the half-cutting parts respectively formed on the both end sides in the tape length direction by the half-cutting device.

Predetermined printing is performed by the printing device with respect to the first print area of the second print-receiving medium layer. The label tape with print, which is of a laminate structure of three layers including the above-mentioned second print-receiving medium layer, the second affixing adhesive layer for affixing the print-receiving medium layer onto a target affixing object, and the second separation layer covering the second affixing adhesive layer, is fed by the feeding device, and this label tape with print is cut by the cutting device into a predetermined length to thereby produce a label. At this time, the layers other than the second separation layer are cut by the half-cutting device, thus forming a half-cutting part. Accordingly, when peeling off the other layers (label main body) from the second separation layer in order to affix the produced label to the target affixing object by the user, these layers can be easily peeled off with the fingertips.

In the eighth aspect, two half-cutting parts are formed by the half-cutting device on both end sides of the first print area in the label length direction. Accordingly, for example, by using the half-cutting part on one end side of the first print area in the label length direction as a half-cutting part for discarding a margin as a non-printing portion during use of the label, another half-cutting part can be set on the other end side with respect to the label length direction. Accordingly, in accordance with the print length in the first print area, when the print length is long, the above-mentioned other half-cutting part is set so as to be far from the one end in the label length direction (close to the other end), and when the print length is short, this half-cutting part is set so as to be close to the one end in the label length direction (far from the other end), thereby making it possible to vary the length of the label main body mentioned above in conformity to the above-mentioned print length. Further, in this case, the length of the RFID label can be made constant at all times irrespective of the length of the label main body mentioned above (in other words, the print length). That is, since the length of the produced RFID label is the same irrespective of whether the print length in the label main body is long or the print length in the label main body is short, unlike in the prior art in which only one half-cutting part is provided, it is possible to ensure ease of handling of the RFID label by the user while making the length of the label main body portion variable in accordance with the print length.

According to ninth aspect, in the eighth aspect, the label producing device further includes a cooperative control device that cooperatively controls the feeding device, the cutting device, and the half-cutting device so as to be able to execute: a first step of performing feeding in a forward direction by the feeding device after forming the cutting part, and then stopping the feeding to form one of the two half-cutting parts by the half-cutting device; a second step of performing feeding in the forward direction by the feeding device after forming the half-cutting part, and then stopping the feeding to form the other of the two half-cutting parts by the half-cutting device on a side opposite to the half-cutting part formed in the first step across the first print area; and a third step of performing feeding in the forward direction by the feeding device after forming the half-cutting part, and then stopping the feeding to form the cutting part by the cutting device.

After forming one half-cutting part in the first step with respect to the label tape with print, the label tape with print is fed in the forward direction and then stopped to form the other half-cutting part on the opposite side (across the first print area) in the second step, and the label tape with print is further fed in the forward direction and then stopped to be cut by the cutting device in the third step, thereby completing a label. Accordingly, the production of a label having half-cutting parts respectively provided on one end side and on the other end side of the first print area in the label length direction can be smoothly performed.

According to tenth aspect, in the ninth aspect, the cooperative control device cooperatively controls the half-cutting device and the feeding device so that a position of the half-cutting part due to the half-cutting device in at least one of the first and second steps is varied in accordance with the content of printing in the first print area.

Accordingly, in accordance with the print length in the first print area, when the print length is long, the half-cutting part formed on the other end side in the length direction of the label by the half-cutting device is set so as to be far from the one end in the label length direction (close to the other end), and when the print length is short, this half-cutting part is set so as to be close to the one end in the label length direction (far from the other end), thereby making it possible to vary the length of the label main body mentioned above in conformity to the above-mentioned print length. As a result, the length of the RFID label can be made constant at all times irrespective of the length of the label main body mentioned above (in other words, the print length).

According to eleventh aspect, in the ninth aspect, the cooperative control device cooperatively controls the half-cutting device and the feeding device so that formation of the half-cutting part by the half-cutting device is not performed depending on the content of printing in the first print area.

Accordingly, when the print length of the label print in the first print area is particularly long, the formation of the half-cutting part on the other end side in the label length direction in the second step is omitted, whereby the first print area can be made to extend as close as possible to the other end portion in the label length direction. As a result, a label can be reliably produced without causing an error even in this case.

According to twelfth aspect, in the ninth aspect, the cooperative control device cooperatively controls the cutting device and the feeding device so that a length of a label produced by forming the cutting part in the third step equals a predetermined fixed value.

By setting the length of the label in the feed direction to a fixed value (constant value), the length of the produced RFID label is the same irrespective of whether the print length in the label main body is long or the print length in the label main body is short, whereby the ease of handling of the RFID label by the user can be reliably ensured.

According to thirteenth aspect, in the eighth aspect, the printing device prints predetermined information on a second print area that is located on a side opposite to the first print area of the second print-receiving medium layer across the half-cutting part.

By providing the second print area on the label end side with respect to the half-cutting part which is not used when affixing the label by the user, and printing predetermined information on this second print area, the portion of the label that is discarded without being used when affixing the label by the user is effectively utilized in order to, for example, inform the user of the sequential order of each RFID circuit element, the remaining/used label number, and the like during the label production, thereby achieving enhanced convenience.

According to fourteenth aspect, in the eighth aspect, the label producing device further includes detection device that detects a detection identifier that is located on a side opposite to the first print area of the second print-receiving medium layer across the half-cutting part.

By providing the detection identifier on the label end sides with respect to the two half-cutting parts which are not used when affixing the label by the user, and detecting the detection identifier by the detection device, it is possible to achieve an improvement in feeding accuracy or positioning accuracy during the feeding of a tag medium or print medium at the time of label production. As a result, an improvement can be achieved in terms of the reliability of the label, label production efficiency, or the like.

According to fifteenth aspect, in the fourteenth aspect, the label producing device further includes transmitting/receiving device that performs transmission/reception of information to/from an RFID circuit element in a non-contact manner, the RFID circuit element being included in the label tape with print and having an IC circuit part for storing information and an antenna for performing transmission/reception of information.

Accordingly, the RFID label with print can be produced by performing reading of information from or writing of information to the IC circuit part of the RFID circuit element, and further, the length of the label main body mentioned above can be varied in accordance with the print length in the first print area at this time.

According to sixteenth aspect, in the fifteenth aspect, the label producing device further includes pressure device that bonds the second print-receiving medium layer and a base layer, where the RFID circuit element is arranged, with each other via a bonding adhesive layer.

Accordingly, it is possible to from an RFID label with print having a laminate structure of five layers including: the second print-receiving medium layer including the first print area where predetermined printing has been performed; the bonding adhesive layer; the base layer to which the RFID circuit element is mounted; the second affixing adhesive layer for affixing the base layer onto a target affixing object; and the second separation layer that covers the second affixing adhesive layer.

According to seventeenth aspect, in the fifteenth aspect, a distance Lo between the detection device and the printing device along a feed path due to the feeding device is shorter than a distance L in the label tape with print between a front end portion of the RFID circuit element in the feed direction and the identifier.

By arranging the printing device closer to the detection device, when the half-cutting device is provided between the detection device and the printing device, the distance between the half-cutting device and the printing device can be made short. In this case, at the time of label production, the distance between the half-cutting part due to the half-cutting device and the printing start position can be made short, whereby the size of a margin area that can be produced on the label due to that distance can be made small.

According to eighteenth aspect, in the fifteenth aspect, a distance Lo between the detection device and the printing device along a feed path due to the feeding device is substantially equal to a distance L in the label tape with print between a front end portion of the RFID circuit element in the feed direction and the identifier.

Accordingly, when the identifier reaches the position of the detection device as the label tape with print moves, the position corresponding to the RFID circuit element of the second print-receiving medium layer of the label tape with print reaches the position of the printing device. Accordingly, by starting printing upon detecting the identifier, a predetermined print can be formed at a position corresponding to the RFID circuit element.

According to the present disclosure, it is possible to achieve enhanced ease of handling of the label by the user while making the length of the label main body portion variable in accordance with the print length.

BRIEF DESCRIPTION OF THE DRAWING

FIG. 21 is an explanatory view illustrating the positional relation between a tag label tape with print, a loop antenna, a mark sensor, a half-cut unit, a cutting mechanism, and a print head.

FIG. 24 is an explanatory view showing the positional relation between a tag label tape with print, a loop antenna, a mark sensor, a half-cut unit, a cutting mechanism, and a print head.

FIG. 26 is an explanatory view showing the processing when a communication error occurs in the case where the print length is relatively long.

FIG. 28 is an explanatory view showing the processing when a communication error occurs in the case where the print length is relatively short.

FIG. 29 is a view showing the RFID label completed in a communication failure state.

DETAILED DESCRIPTION OF THE PREFERRED EMBODIMENTS

A tag-label producing device according to an embodiment of the present disclosure will be described below with reference to the drawings. In this embodiment, the present disclosure is applied to an RFID tag manufacturing system.

Figure 1:
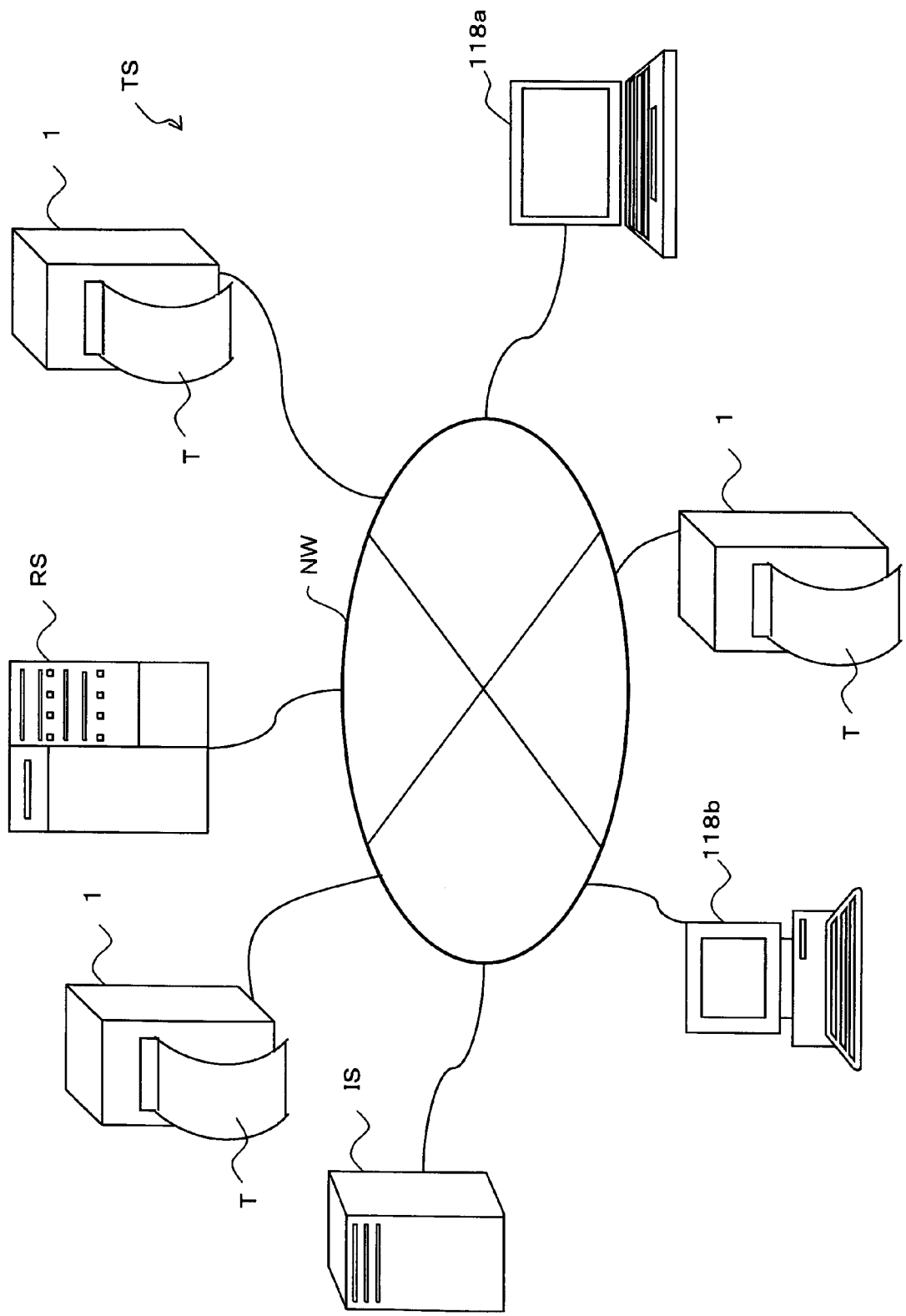
FIG. 1 is a system configuration diagram showing an RFID tag manufacturing system equipped with a tag-label producing device according to an embodiment of the present disclosure.

FIG. 1 is a system diagram showing an RFID tag manufacturing system equipped with a tag-label producing device according to this embodiment.

In the RFID tag manufacturing system TS shown in FIG. 1, a tag-label producing device 1 is connected to a route server RS, a plurality of information servers IS, a terminal 118a, and a general purpose computer 118b via a wired or wireless communication line NW. It should be noted that in the following description, the terminal 118a and the general purpose computer 118b will be generically referred to simply as "PC 118" as appropriate.

Figure 2:
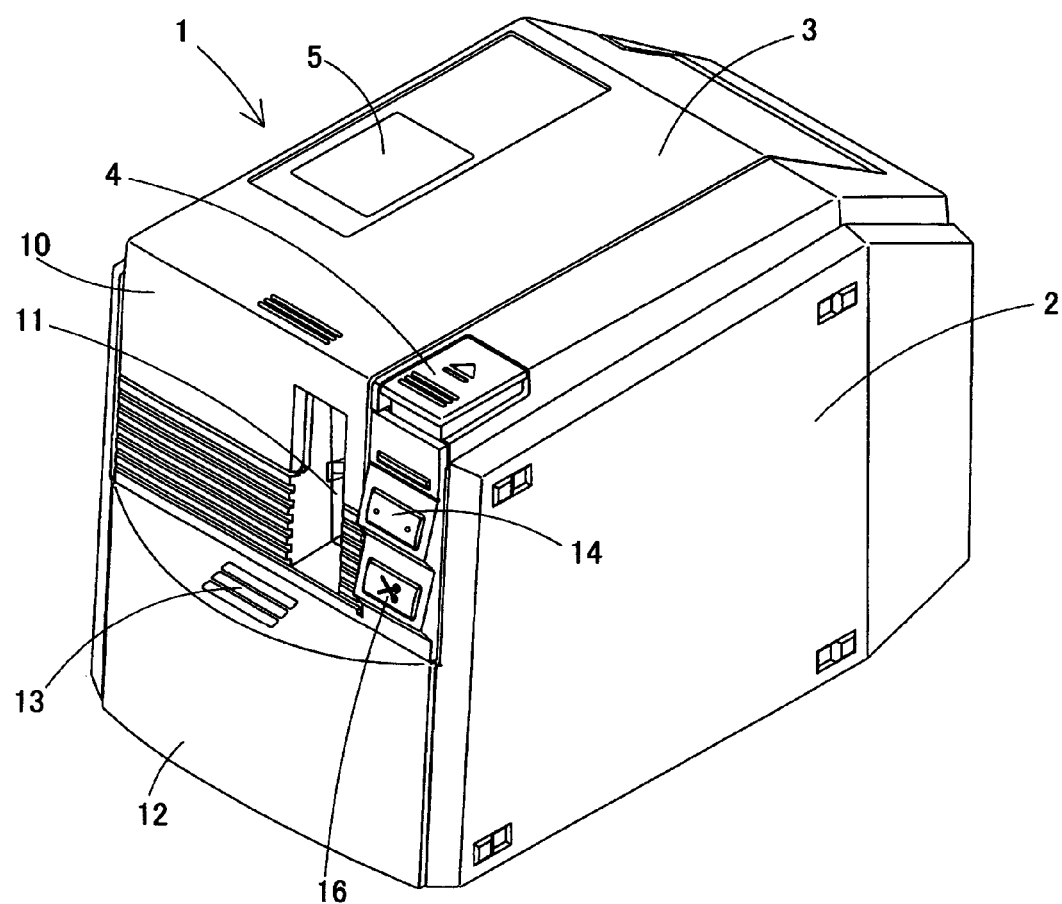
FIG. 2 is a perspective view showing the overall construction of the tag-label producing device shown in FIG. 1.

FIG. 2 is a perspective view showing the overall construction of the tag-label producing device 1.

In FIG. 2, the tag-label producing device 1 is connected to the PC 118 and produce an RFID label with a desired print on the basis of operation from the PC 118. The tag-label producing device 1 includes a main body 2, and an open/close cover 3 provided to the upper surface of the main body 2 so as to freely open and close.

The main body 2 is located on the forward side (the left forward side in FIG. 2), and includes a side wall 10 equipped with a label discharge port 11 for discharging an RFID label T (print label; details of which will be described later) produced inside the main body 2, and a side cover 12 that is provided in the portion of the side wall 10 below the label discharge port 11 and whose lower end is rotatably supported in place.

The side cover 12 includes a pressing portion 13. The side cover 12 opens forward by pressing the pressing portion 13 from above. Further, a power supply button 14 for turning on/off the power supply of the tag-label producing device 1 is provided in the portion of the side wall 10 below an open/close button 4. Provided below the power supply button 14 is a cutter driving button 16 for driving a cutting mechanism 15 (see FIG. 3 that will be described later) disposed inside the main body 2 through manual operation by the user. When the button 16 is pressed, a tag label tape 109 with print (label tape with print; details of which will be described later) is cut into a predetermined length, thereby producing an RFID label T.

The open/close cover 3 is rotatably pivoted on the end of the main body 2 on the right rear side in FIG. 2, and always urged in the opening direction via an urging member such as a spring. When the open/close button 4 arranged in the upper surface of the main body 2 so as to be adjacent to the open/close cover 3 is pressed, the locking engagement between the open/close cover 3 and the main body 2 is released, causing the open/close cover 3 to open due to the operation of the urging member. It should be noted that a see-through window 5 covered with a transparent cover is provided at the central side portion of the open/close cover 3.

Figure 3:
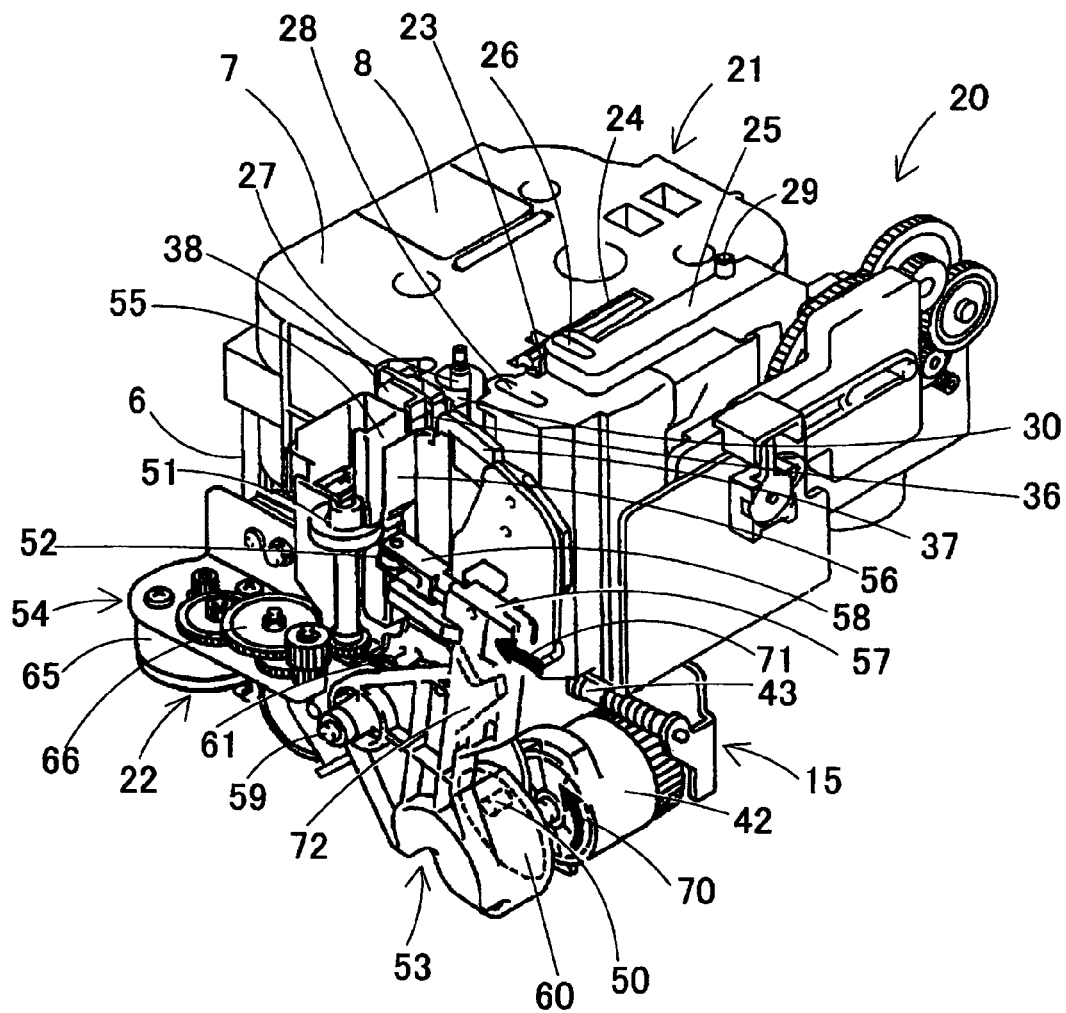
FIG. 3 is a perspective view showing the construction of an internal unit of the tag-label producing device.

FIG. 3 is a perspective view showing the construction of an internal unit 20 of the tag-label producing device 1 (however, a loop antenna LC that will be described later is omitted). In FIG. 3, the internal unit 20 generally includes a cartridge holder 6 accommodating a cartridge (RFID circuit element cartridge) 7, a printing mechanism 21 equipped with a print head (thermal head) 23, the cutting mechanism 15, a half-cut unit 35 (see FIG. 8 that will be described later), and a label discharge mechanism 22 for discharging the produced RFID label T (see FIG. 19 that will be described later) from the label discharge port 11 (see FIG. 2).

Figure 4:
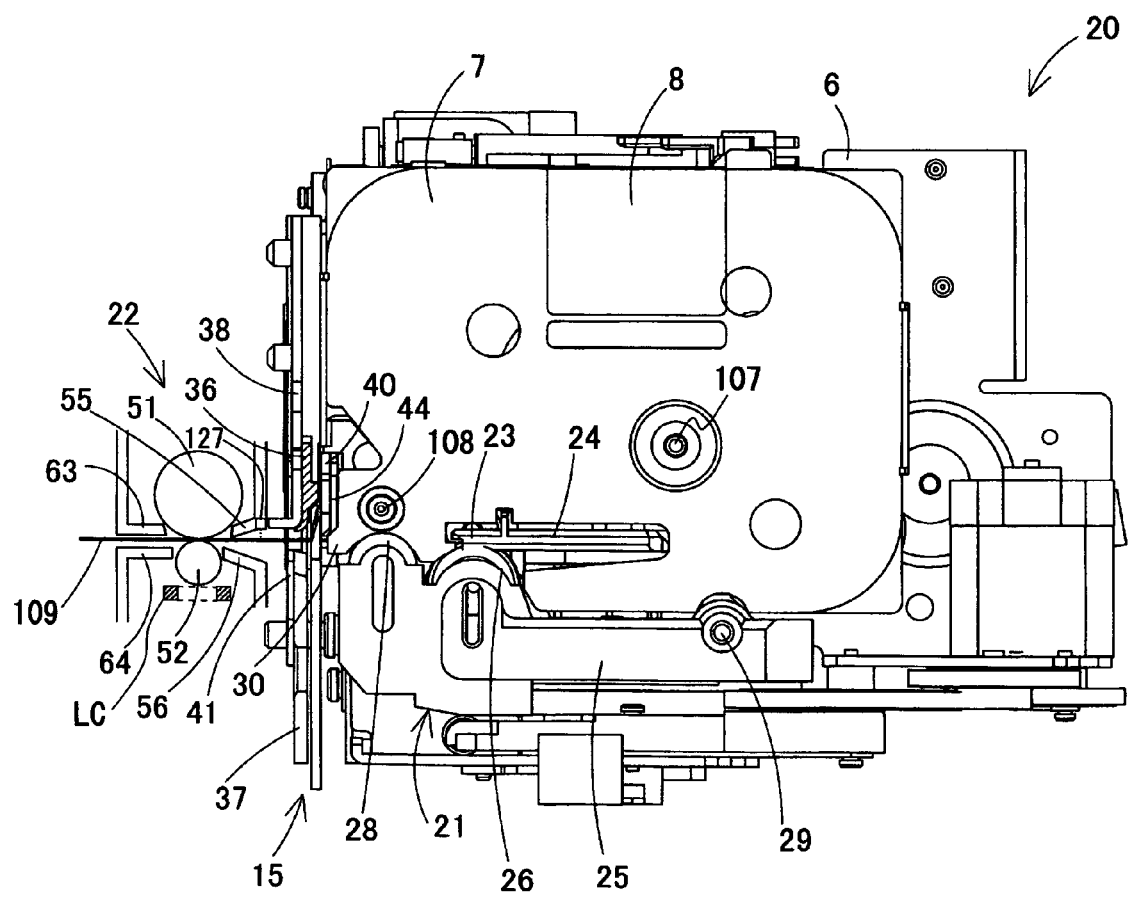
FIG. 4 is a plan view showing the construction of the internal unit shown in FIG. 3.
Figure 5:
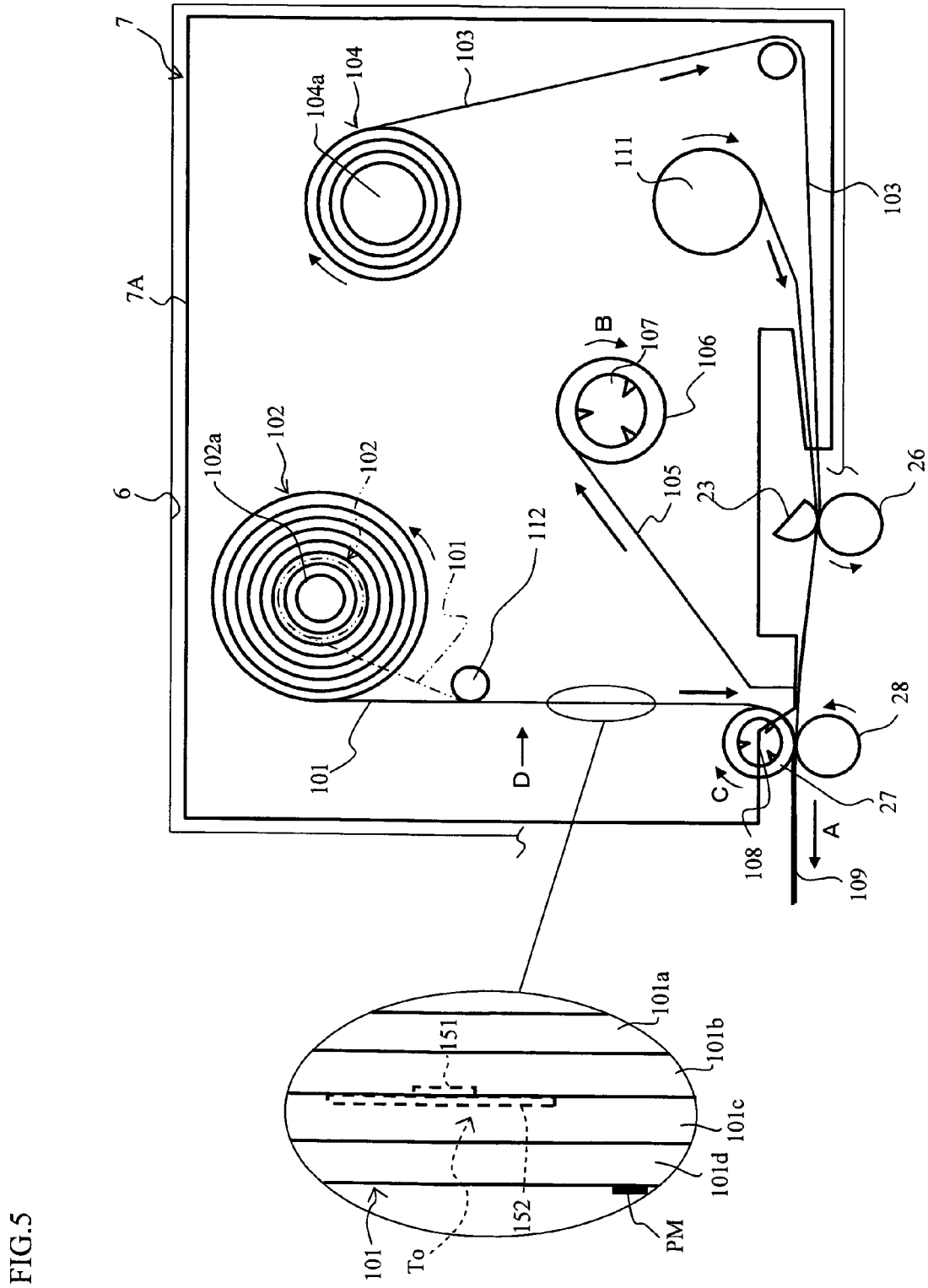
FIG. 5 is an enlarged plan view schematically showing the detailed construction of a cartridge.

FIG. 4 is a plan view showing the construction of the internal unit 20 shown in FIG. 3, and FIG. 5 is an enlarged plan view schematically showing the detailed construction of the cartridge 7.

In FIGS. 4 and 5, the cartridge holder 6 accommodates the cartridge 7 so that the orientation in the width direction of the tag label tape 109 with print discharged from the label discharge port 11 becomes perpendicular. The cartridge 7 has a housing 7A, a first roll 102 arranged inside the housing 7A and around which a base tape 101 having a band-like shape is wound, a second roll 104 around which a transparent cover film 103 of substantially the same width as the base tape 101 is wound, a ribbon-supply-side roll 111 for paying out an ink ribbon 105 (thermal transfer ribbon; unnecessary when the print-receiving tape used is a thermal tape), a ribbon take-up roller 106 for taking up the ink ribbon 105 after printing, a tape feed roller 27 rotatably supported near a tape discharging portion 30 of the cartridge 7, and a guide roller 112.

The tape feed roller 27 presses the base tape 101 and the cover film 103 into adhesion with each other to thereby prepare the tag label tape 109 with print, and feeds the tag label tape 109 with print in the direction indicated by the arrow A.

The first roll 102 has the base tape 101 wound around a reel member 102a. The base tape 101 has a plurality of RFID circuit elements To successively formed at equal predetermined intervals in the longitudinal direction thereof. The base tape 101 is of a four-layer structure in this example (see the partially enlarged view in FIG. 5). The base tape 101 includes an adhesive layer 101a made of a suitable adhesive material, a colored base film 101b made of PET (polyethylene terephthalate) or the like, an adhesive layer 101c made of a suitable adhesive material, and a separation sheet 101d, which are laminated in the stated order from the side wound on the inner side (the right side in FIG. 5) toward the side opposite thereto (the left side in FIG. 5).

On the back side (the left side in FIG. 5) of the base film 101b, a loop antenna 152 (tag-side loop antenna) that is formed in a loop coil-like configuration and performs transmission/reception of information is provided integrally in this example, with an IC circuit part 151 for storing information being formed so as to connect to the loop antenna 152. These components constitute each RFID circuit element To.

The above-mentioned adhesive layer 101a for adhering the cover film 103 later is formed on the front side (the right side in FIG. 5) of the base film 101b. Further, on the back side (the left side in FIG. 5) of the base film 101b, the separation sheet 101d is adhered onto the base film 101b by means of the above-mentioned adhesive layer 101c provided so as to contain the RFID circuit element To.

The separation sheet 101d is peeled off when affixing the finally completed RFID label T having a label-shaped configuration onto a predetermined item or the like, thus allowing adhesion of the RFID label T onto the item or the like by means of the adhesive layer 101c. Further, on the surface of the separation sheet 101d, a predetermined identifier for feed control (which in this example is a black-painted identifier. Alternatively, this may also be a hole bored by laser machining or the like so as to substantially penetrate the base tape 101, or the like. See FIG. 19C that will be described later) PM is provided at a predetermined position corresponding to each RFID circuit element To (which in this example is a position located on the side further forward with respect to the distal end of the antenna 152 located on the forward side in the feed direction).

The second roll 104 has the cover film 103 wound around a reel member 104a. In the cover film 103 paid out from the second roll 104, the ink ribbon 105 driven by the ribbon-supply-side roll 111, which is arranged on the back surface side (that is, the side where the cover film 103 is adhered onto the base tape 101) of the cover film 103, and the ribbon take-up roller 106 is pressed by the print head 23 into abutment with the back surface of the cover film 103.

The ribbon take-up roller 106 and the tape feed roller 27 are rotationally driven in synchronization with a ribbon take-up roller drive shaft 107 and a tape-feed-roller drive shaft 108 as the drive force of a feed motor 119 (see FIG. 15 that will be described later) that is, for example, a pulse motor provided outside the cartridge 7 is transmitted to the ribbon take-up roller drive shaft 107 and the tape-feed-roller drive shaft 108 via a gear mechanism (not shown), respectively.

On the other hand, at this time, the print head 23 equipped with a large number of heater elements is mounted to a head mounting portion 24 provided upright to the cartridge holder 6, and is arranged on the upstream side of the tape feed roller 27 with respect to the feed direction of the cover film 103.

Further, a roller holder 25 is rotatably pivoted by means of a support shaft 29 on the portion of the cartridge holder 6 located forward of the cartridge 7 (the lower side in FIG. 4), and can be switched by means of a switching mechanism between a printing position (abutting position; see FIG. 4) and a release position (separated position). A platen roller 26 and a tape pressure-contact roller 28 are rotatably disposed in the roller holder 25. When the roller holder 25 is switched to the above-mentioned printing position, the platen roller 26 and the tape pressure-contact roller 28 are brought into press contact with the print head 23 and the tape feed roller 27, respectively.

In the above-described construction, the base tape 101 paid out from the first roll 102 is supplied to the tape feed roller 27. On the other hand, in the cover film 103 paid out from the second roll 104, the ink ribbon 105 driven by the ribbon-supply-side roll 111, which is arranged on the back surface side (that is, the side where the cover film 103 is adhered onto the base tape 101) of the cover film 103, and the ribbon take-up roller 106 is pressed by the print head 23 into abutment with the back surface of the cover film 103.

When the cartridge 7 is loaded onto the cartridge holder 6 and the roller holder 25 is moved from the release position to the printing position, the cover film 103 and the ink ribbon 105 are held between the print head 23 and the platen roller 26, and also the base tape 101 and the cover film 103 are held between the tape feed roller 27 and the pressure roller 28. Then, due to the drive force of the feed motor 119, the ribbon take-up roller 106 and the tape feed roller 27 are rotationally driven in synchronization with each other in the directions indicated by the arrow B and the arrow C, respectively. At this time, the tape-feed-roller drive shaft 108, the pressure roller 28 and the platen roller 26 are coupled together by a gear mechanism (not shown). As the tape-feed-roller drive shaft 108 is driven, the tape feed roller 27, the pressure roller 28, and the platen roller 26 rotate, and the base tape 101 is paid out from the first roll 102 and supplied to the tape feed roller 27 as described above. On the other hand, the cover film 103 is paid out from the second roll 104, and the plurality of heater elements of the print head 23 are energized by a print-head drive circuit 120 (see FIG. 15 that will be described later). As a result, a label print R (see FIG. 18 that will be described later), which corresponds to the information stored in the RFID circuit elements To on the base tape 101 onto which the cover film 103 is to be bonded, is formed on the back surface of the cover film 103. Then, the base tape 101 and the cover film 103 on which printing has been finished as described above are adhered and integrated together by means of the tape feed roller 27 and the pressure roller 28, thus forming the tag label tape 109 with print, which is carried to the outside of the cartridge 7 by the tape discharging portion 30. The ink ribbon 105 for which printing on the cover film 103 has been finished is taken up on the ribbon take-up roller 106 due to the drive of the ribbon take-up roller drive shaft 107.

It should be noted that a tape specific indication portion 8, which indicates, for example, the width, color, and the like of the base tape 101 incorporated in the cartridge 7, is provided in the upper surface of the housing 7A of the cartridge 7. When the cartridge 7 is loaded onto the cartridge holder 6 and the open/close cover 3 is closed, the above-mentioned see-through window 5 and the tape specific indication portion 8 are opposed to each other, thus allowing the tape specific indication portion 8 to be viewed from the outside of the main body 2 through the transparent cover of the see-through window 5. This allows the kind or the like of the cartridge 7 loaded on the cartridge holder 6 to be readily identified visually from the outside of the main body 2 through the see-through window 5.

On the other hand, as described above, the internal unit 20 includes the cutting mechanism 15 and the label discharge mechanism 22. The internal unit 20 further includes a loop antenna LC for performing reading or writing of information via wireless communication with respect to the RFID circuit element To equipped in the base tape 101 (the tag label tape with print after the bonding; the same applies hereinafter). After reading or writing of information from or to the RFID circuit element To is performed by the loop antenna LC with respect to the tag label tape 109 with print produced through the bonding process as described above, the tag label tape 109 with print is cut by the cutting mechanism 15 automatically or by operating the cutter driving button 16 (see FIG. 2), thereby producing the RFID label T. This RFID label T is then further discharged by the label discharge mechanism 22 from the label discharge port 11 formed in the side wall 10 (see FIG. 2).

The cutting mechanism 15 includes a stationary blade 40, a movable blade 41 for performing cutting operation together with the stationary blade 40, a cutter helical gear 42 coupled to the movable blade 41, and a cutter motor 43 coupled to the cutter helical gear 42 through a gear train.

The label discharge mechanism 22 is disposed near the label discharge port 11 provided in the side wall 10 of the main body 2, and functions for forcibly discharging from the label discharge port 11 the tag label tape 109 with print that has been cut by the cutting mechanism 15 (in other words, the RFID label T; the same applies hereinafter). That is, the label discharge mechanism 22 includes a drive roller 51, a pressing roller 52 opposed to the drive roller 51 with the tag label tape 109 with print therebetween, a pressing actuation mechanism portion 53 that is actuated so as to press the pressing roller 52 against the tag label tape 109 with print or to release the pressing, and a discharge drive mechanism portion 54 that operates in synchronization with the pressing release operation of the pressing actuation mechanism portion 53 to rotate the drive roller 51 so that the tag label tape 109 with print is discharged by the drive roller 51.

At this time, first guide walls 55, 56 and second guide walls 63, 64 for guiding the tag label tape 109 with print toward the label discharge port 11 are provided on the inner side of the label discharge port 11 (see FIG. 4). The first guide walls 55, 56 and the second guide walls 63, 64 are respectively formed integrally, and are arranged so as to be spaced apart from each other by a predetermined distance at the discharge position of the tag label tape 109 with print that has been cut by the stationary blade 40 and the movable blade 41.

The pressing actuation mechanism portion 53 includes a roller supporting holder 57, a roller supporting portion 58 that is mounted to the roller supporting holder 57 and retains the pressing roller 52 at its distal end portion, a holder supporting portion 59 that rotatably supports the roller supporting holder 57, a cam 60 that operates in synchronization with the cutting mechanism 15 to drive the pressing actuation mechanism portion 53, and an urging spring 61.

The roller supporting portion 58 is rotatably supported in place so as to sandwich the pressing roller 52 from above and below. When, due to the rotation of the cutter helical gear 42, the roller supporting holder 57 is pivoted counterclockwise (the arrow 71 direction in FIG. 3) about the holder supporting shaft 59 through the cam 60, the pressing roller 52 is pressed against the tag label tape 109 with print. Further, when the cutter helical gear 42 is rotated again, the holder supporting shaft 59 is pivoted in the direction opposite to the above-mentioned direction due to the urging spring 61, thus releasing the pressing roller 52 from the tag label tape 109 with print.

The discharge drive mechanism portion 54 is composed of a tape discharging motor 65 and a gear train 66. After the tag label tape 109 with print is pressed against the drive roller 51 by the pressing roller 52, the tape discharging motor 65 is driven and the drive roller 51 is rotated in the direction for discharging the tag label tape 109 with print, whereby the tag label tape 109 with print is forcibly discharged in the discharging direction.

It should be noted that a mark sensor 127, which can detect a suitable identifier PM (see FIG. 6 or the like that will be described alter) provided to the separation sheet 101d of the base tape 101 in correspondence with the position of each RFID circuit element, is provided on the upstream side of the drive roller 51 with respect to the feed direction (in other words, between a half-cutter 34 that will be described later and the loop antenna LC). The mark sensor 127 is, for example, a known reflection-type photoelectric sensor composed of a light projector and a light receiver. The control output from the light receiver is inverted depending on whether or not the above-mentioned identifier PM is present between the light projector and the light receiver. It should be noted that the first guide wall 56 opposed to the mark sensor 127 is formed such that the surface of the first guide wall 56 is of a color that does not reflect the light from the light projector or is inclined so that the light receiver does not receive the reflection light.

Figure 6:
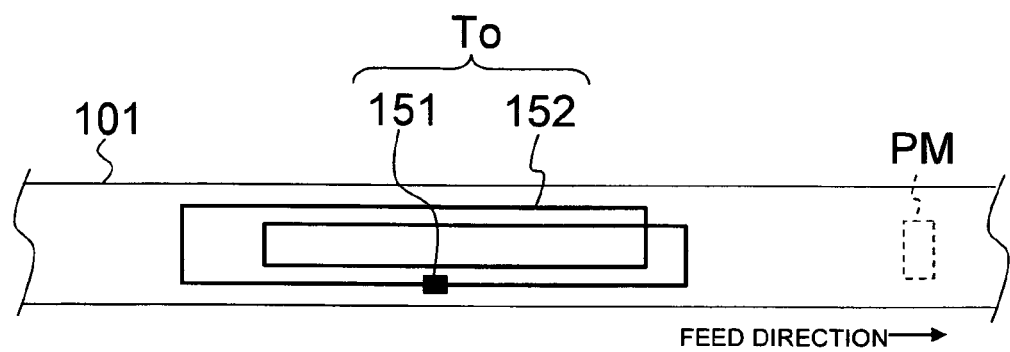
FIG. 6 is a diagram as seen in the direction of the arrow D of FIG. 5, showing the conceptual structure of an RFID circuit element.

FIG. 6 is a conceptual diagram as seen in the direction of the arrow D of FIG. 5, showing the conceptual structure of the RFID circuit element To equipped in the base tape 101 paid out from the first roll 102. In FIG. 6, the RFID circuit element To is composed of the loop antenna 152 that is formed in a loop coil-like configuration and performs transmission/reception of information, and an IC circuit part 151 that is connected to the loop antenna 152 and stores information.

Figure 7:
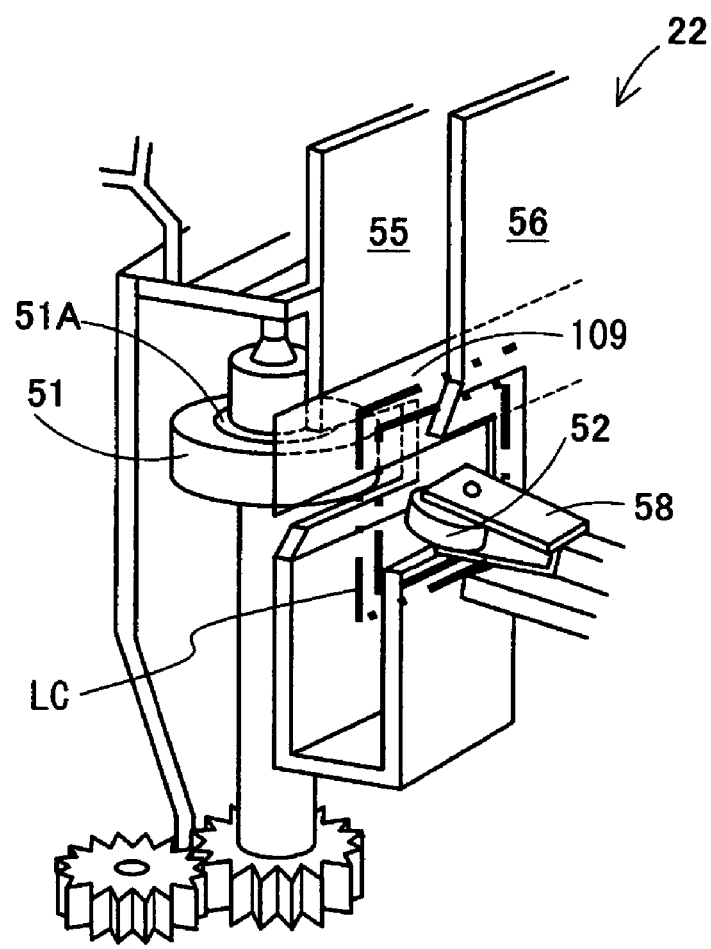
FIG. 7 is a partially extracted perspective view showing the detailed construction of the main potion of a label discharge mechanism.

FIG. 7 is a partially extracted perspective view showing the detailed construction of the main portion of the label discharge mechanism 22. In FIG. 7, the first guide walls 55, 56 are cutout at their vertically midway portions, with the drive roller 51 being provided to the first guide wall 55 so as to face the discharge position of the tag label tape 109 with print. It should be noted that the drive roller 51 has a roller cutout portion 51A formed by a concentric groove on its upper surface. On the other hand, in the other first guide wall 56, the pressing roller 52 is supported on the roller supporting portion 58 of the pressing actuation mechanism portion 53 so as to face the discharge position of the tag label tape 109 with print from the cutout portion.

The loop antenna LC (conceptually indicated by the imaginary line in FIG. 7) is arranged near the pressing roller 52 with the pressing roller 52 being positioned at the center in the radial direction thereof. Access to (reading of information from or writing of information to) the RFID circuit element To equipped in the tag label tape 109 with print is performed by magnetic induction (electromagnetic induction, magnetic coupling, and other such non-contact induction method performed via a magnetic field).

Figure 8:
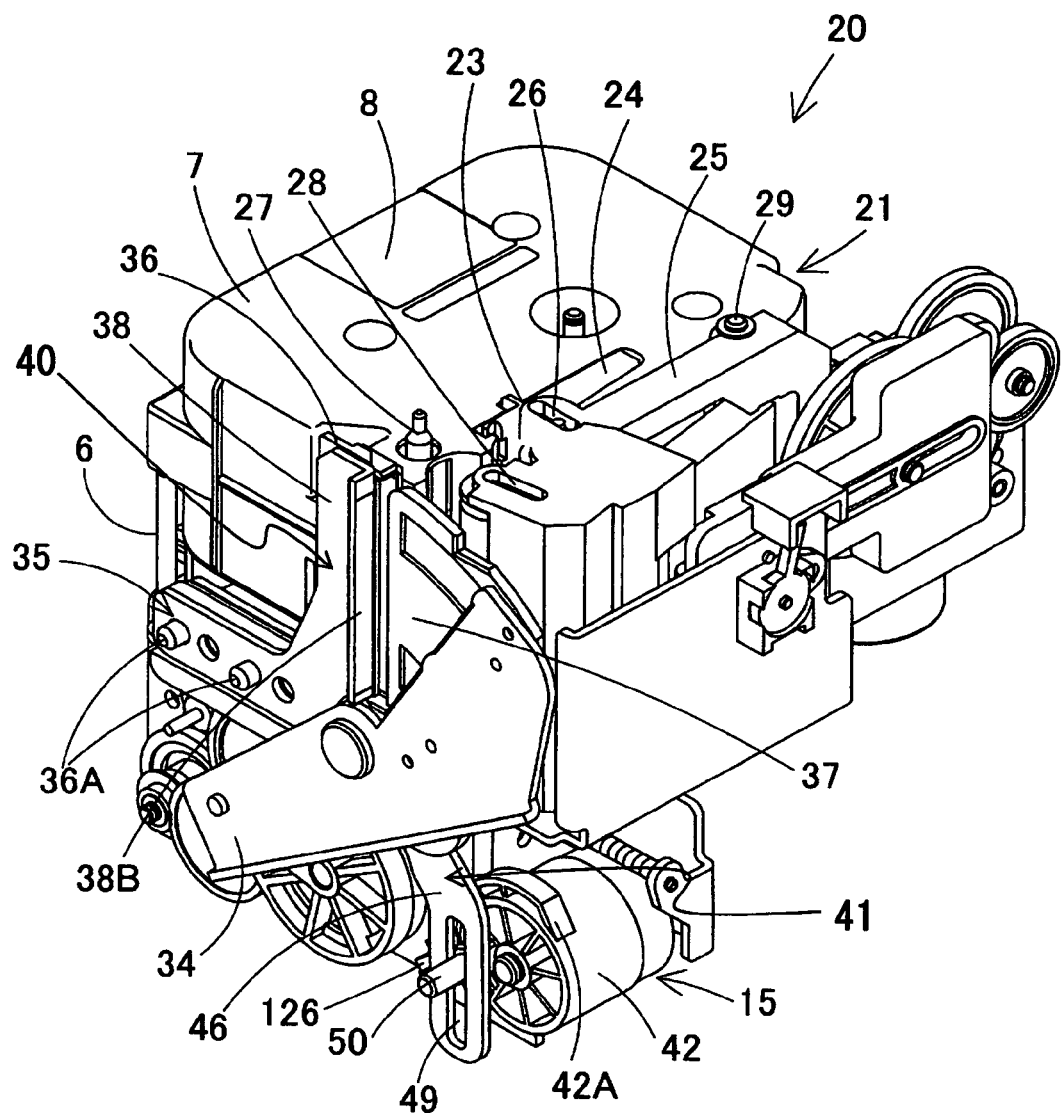
FIG. 8 is a perspective view showing the outward appearance of the internal unit, with the label discharge mechanism removed from the construction shown in FIG. 3.

FIG. 8 is a perspective view showing the outward appearance of the internal unit 20 with the label discharge mechanism 22 removed from the construction shown in FIG. 3.

In FIG. 8, the cutter helical gear 42 is provided with a boss 50 in the form of a projection, and the boss 50 is inserted into an elongated hole 49 of the movable blade 41 (see also FIG. 11 or 9 that will be described later). Further, on the downstream side of the stationary blade 40 and the movable blade 41 along the tape discharge direction, the half-cut unit 35 is mounted so as to be located between the stationary blade 40 and the movable blade 41, and the first guide walls 55, 56 (see FIG. 4).

The half-cut unit 35 is composed of a pad 38 arranged in alightment with the stationary blade 40, the half-cutter 34 opposed to the pad 38 and arranged on the movable blade 41 side, a first guide portion 36 arranged in alignment with the stationary blade 40 between the stationary blade 40 and the pad 38, and a second guide portion 37 opposed to the first guide portion 36 and arranged in alignment with the movable blade 41 (see also FIG. 11 that will be described later). The first guide portion 36 and the second guide portion 37 are formed integrally, and mounted to a side plate 44 (see FIG. 4) together with the stationary blade 40 by means of a guide fixing portion 36A provided at a position corresponding to a fixing hole 40A of the stationary blade 40.

A half-cutter motor 129 (not shown; see FIG. 15 that will be described later) is provided to pivot the half-cutter 34 about a predetermined pivot point (not shown). Although its detailed illustration is omitted, the drive mechanism of the half-cutter 34 using the half-cutter motor 129 can be constructed as follows, for example. That is, for example, the half-cutter motor 129 is formed by an electric motor that can rotate in forward and in reverse, and connected via a gear train (not shown) to a crank member (also not shown) equipped with a pin (also not shown), with an elongated groove for engagement with the pin of the crank member being bored in the half-cutter 34. Then, when the crank member is pivoted due to the drive force of the half-cutter motor 129, the pin of the crank member moves along the elongated groove, thereby allowing the half-cutter 34 to pivot in a predetermined direction (clockwise or counterclockwise direction).

The pad 38 is bent so that its end portion opposed to the tag label tape 109 with print discharged from the tape discharge portion 30 becomes parallel to the tape, thus forming a receiving surface 38B. At this time, as described above, the tag label tape 109 with print is of a five-layer structure obtained by bonding together the cover film 103 and the base tape 101 that has a four-layer structure consisting of the adhesive layer 101a, the base film 101b, the adhesive layer 101c, and the separation sheet 101d (see also FIG. 19 that will be described later). Then, by pressing the half-cutter 34 against the receiving surface 38B using the drive force of the half-cutter motor 129 as mentioned above, the cover film 103, the adhesive layer 101a, the base film 101b, and the adhesive layer 101c are cut off from the tag label tape 109 with print located between the half-cutter 34 and the receiving surface 38B, and only the separation sheet 101d is left uncut, whereby half-cut lines HC (see FIG. 18 that will be described later) are formed substantially along the tape width direction. Preferably, after the half-cutter 34 comes into abutment against the receiving surface 38B, an overload is prevented from occurring in the half-cutter motor 129 by means of, for example, a sliding clutch (not shown) that is interposed in the gear train in the case of the above-described construction. The receiving surface 38B also serves to guide the tag label tape 109 with print toward the label discharge port 11 together with the first guide portions 55, 56.

Figure 9:
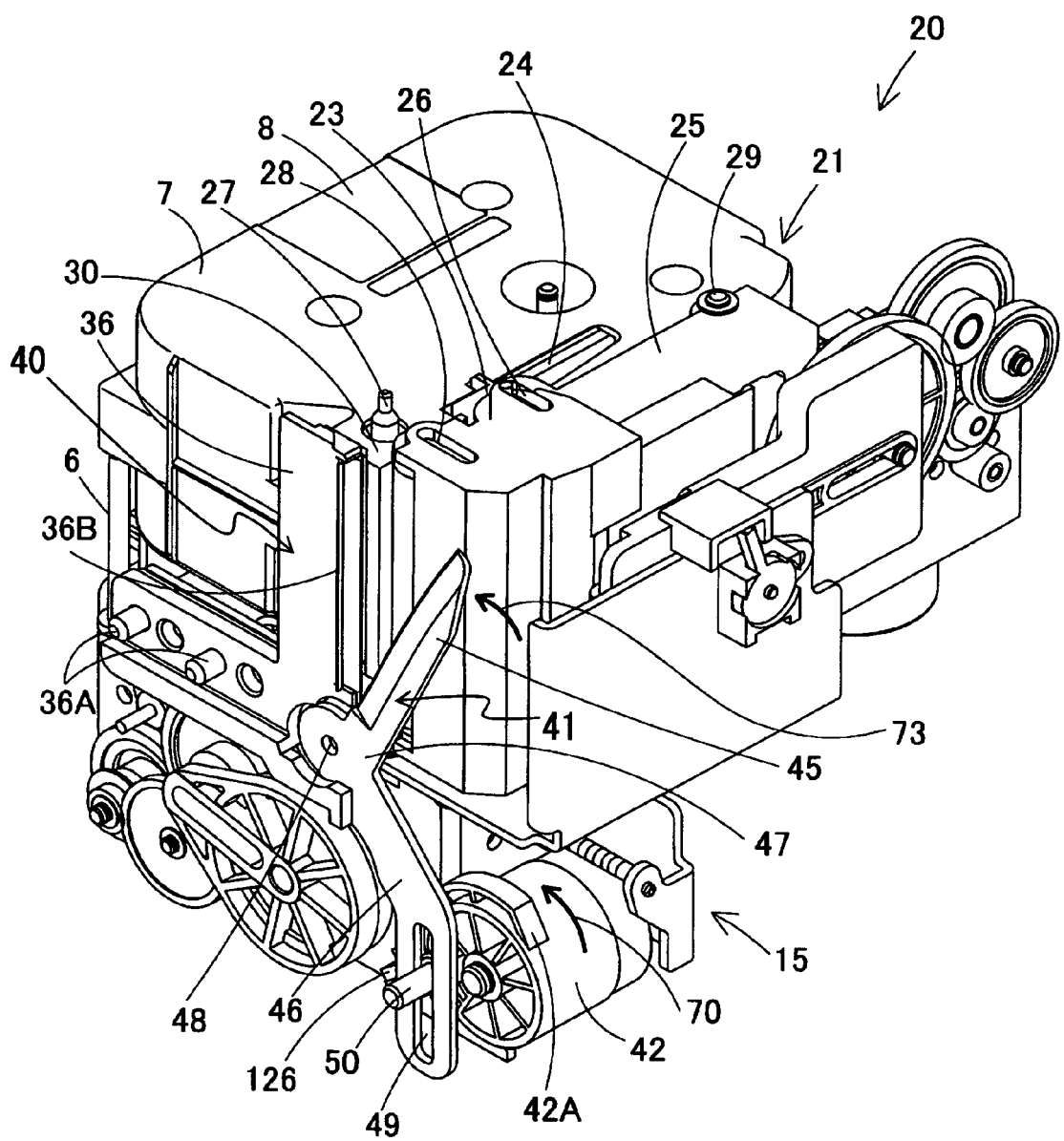
FIG. 9 is a perspective view showing the outward appearance of a cutting mechanism, with a half-cutter removed from the internal unit.
Figure 10:
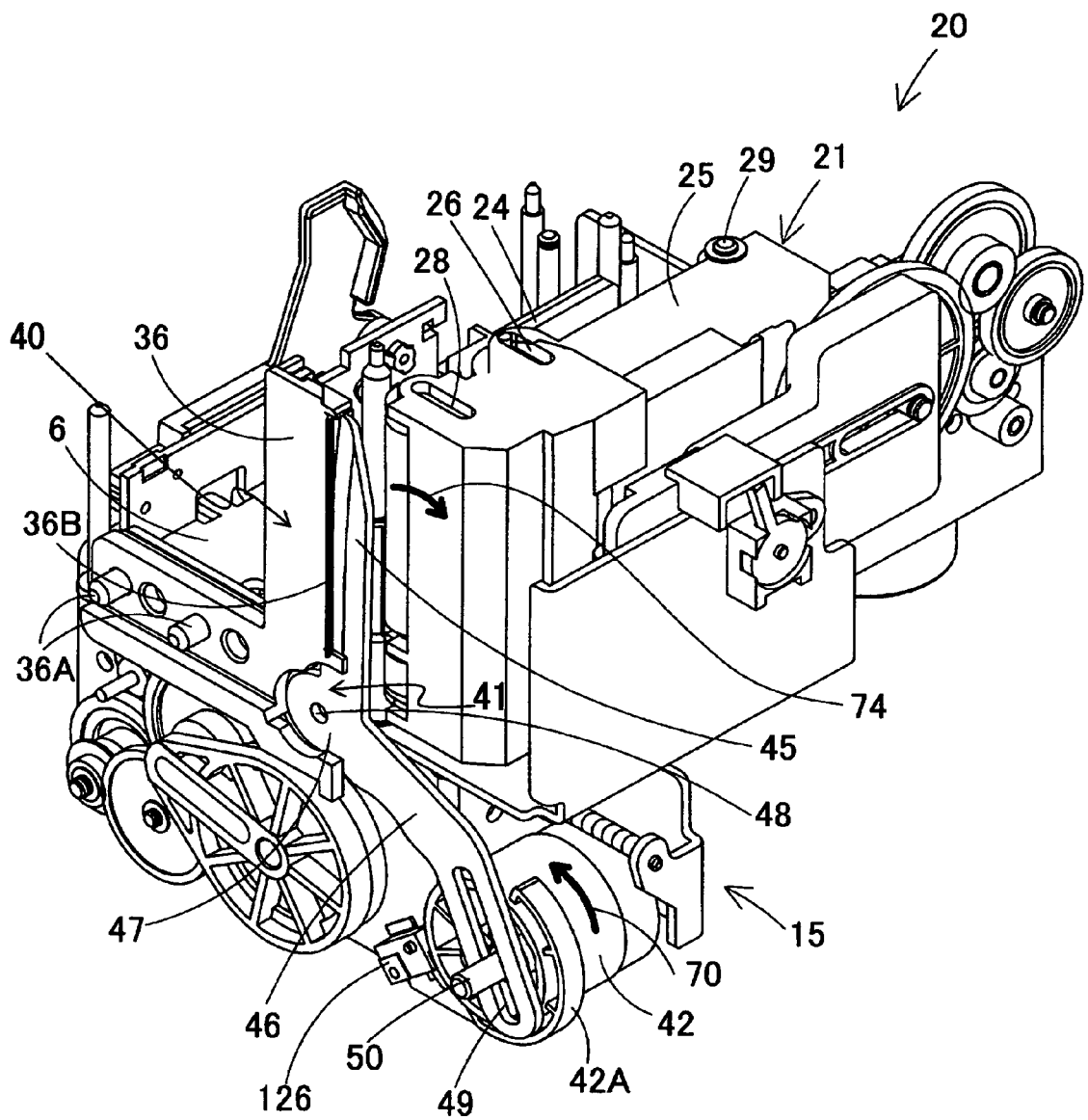
FIG. 10 is a perspective view showing the outward appearance of the cutting mechanism, with the half-cutter removed from the internal unit.

FIGS. 9 and 10 are perspective views each showing the outward appearance of the cutting mechanism 15 with the half-cutter 34 removed from the internal unit 20.

In FIGS. 9 and 10, in the cutting mechanism 15, when the cutter helical gear 42 is rotated by the cutter motor 43 (see FIG. 3), the movable blade 41 swings about a shaft hole 48 due to the boss 50 and the elongated hole 49, thereby cutting the tag label tape 109 with print.

That is, first, when the boss 50 of the cutter helical gear 42 is located on the inner side (the left side in FIG. 9), the movable blade 41 is positioned away from the stationary blade 40 (hereinafter, this state will be referred to as the initial state; see FIG. 9). Then, when the cutter motor 43 is driven in this initial state, and the cutter helical gear 42 rotates counterclockwise (the arrow 70 direction), the boss 50 moves to the outer side, and the movable blade 41 pivots counterclockwise (the arrow 73 direction) about the shaft hole 48 to cut the tag label tape 109 with print together with the stationary blade 40 fixed to the internal unit 20 (hereinafter, this state will be referred to as the cut state; see FIG. 10).

After the tag label tape 109 with print is cut in this way to produce an RFID label, it is necessary to return the movable blade 41 to the initial state in order to cut the next tag label tape 109 with print that is fed. Accordingly, the cutter motor 43 is driven again to rotate the cutter helical gear 42 counterclockwise (the arrow 70 direction), so the boss 50 is moved to the inner side again and the movable blade 41 pivots clockwise (the arrow 74 direction), thus separating the movable blade 41 away from the stationary blade 40 (see FIG. 9). This makes it ready for the movable blade 41 to cut the next tag label tape 109 with print to be cut and fed by the cartridge 7.

It should be noted that at this time, a cutter helical gear cam 42A is provided on the cylindrical outer wall of the cutter helical gear 42. When the cutter helical gear 42 is rotated by the cutter motor 43, a micro switch 126 that is provided adjacent to the cutter helical gear 42 is switched from the OFF state to the ON state through the operation of the cutter helical gear cam 42A. The cut state of the tag label tape 109 with print can be thus detected.

Figure 11:
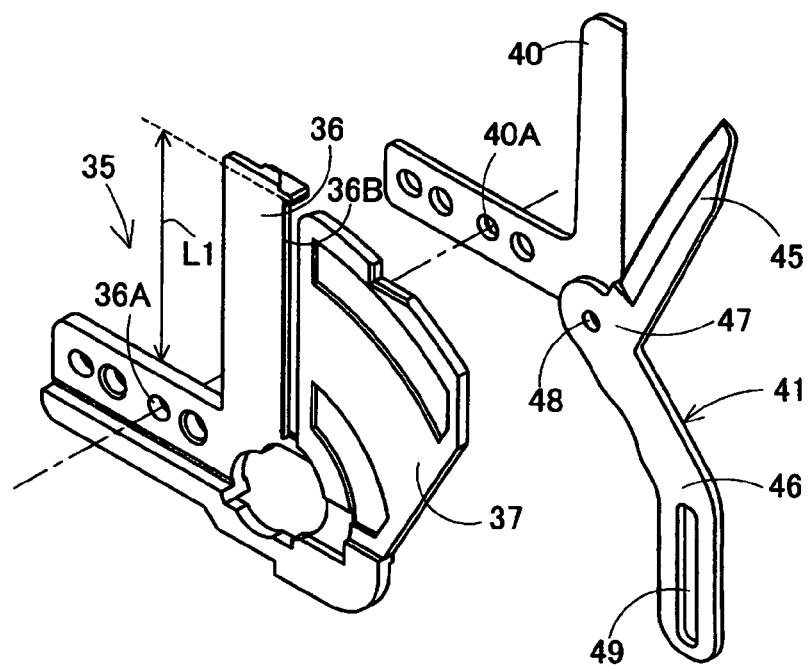
FIG. 11 is a perspective view showing the detailed construction of a movable blade and stationary blade together with a half-cut unit.
Figure 12:
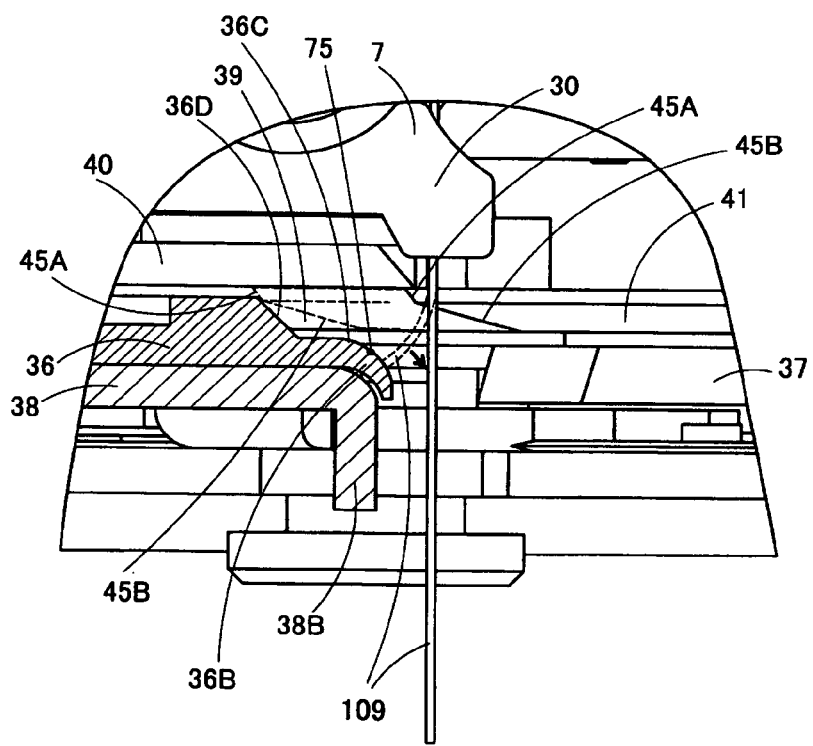
FIG. 12 is a partial enlarged sectional view of the detailed construction of the movable blade and stationary blade.

FIG. 11 is a perspective view showing the detailed construction of the movable blade 41 and stationary blade 40 together with the half-cut unit 35. FIG. 12 is a partial enlarged sectional view of FIG. 11. In FIGS. 11 and 12, the stationary blade 40 is fixed to the side plate 44 (see FIG. 4), which is provided upright on the left side of the cartridge holder 6 inside the cutting mechanism 15, through the fixing hole 40A by means of a screw or the like.

The movable blade 41 is substantially V-shaped and includes a blade portion 45 provided at the cutting part, a handle portion 46 located opposite to the blade portion 45, and a bent portion 47. The shaft hole 48 is provided in the bent portion 47, and the movable blade 41 is supported onto the side plate 44 at the shaft hole 48 so as to be pivotable about the bent portion 47. Further, the elongated hole 49 is formed in the handle potion 46 on the side opposite to the blade portion 45 provided at the cutting part of the movable blade 41. The blade portion 45 is formed by a two-step blade whose blade surface includes two inclined surfaces of different inclination angles, namely a first inclined surface 45A and a second inclined surface 45B, which cause the thickness of the blade portion 45 to gradually decrease.

On the other hand, an end portion 36B of the first guide portion 36 of the above-described half-cut unit 35 which is opposed to the tag label tape 109 with print is projected along the receiving surface 38B formed at an end portion of the pad 38, and is bent in the discharging direction of the tag label tape 109 with print. Accordingly, at the end portion 36B of the first guide portion 36, a contact surface 36C with respect to the tag label tape 109 with print discharged from the cartridge 7 has a gently curved surface with respect to the discharge direction of the tag label tape 109 with print.

Since the end portion 36B of the first guide portion 36 is projected and the contact surface 36C is formed as a curved surface, the leading end portion of the tag label tape 109 with print curled at a predetermined curvature or more first comes into abutment with the contact surface 36C of the first guide portion 36. At this time, when the leading end portion of the tag label tape 109 with print abuts a position on the downstream side (the lower side in FIG. 12) in the discharge direction of the tag label tape 109 with print with respect to a boundary point 75 on the contact surface 36C of the first guide portion, the leading end portion of the tag label tape 109 with print moves to the downstream side along the curved surface, whereby the tag label tape 109 with print is guided toward the label discharge port 11 without entering between the stationary blade 40 and the first guide portion 36 or the pad 38.

Further, the first guide portion 36 is formed so that its guide width L1 (see FIG. 11) corresponding to the feed path of the tag label tape 109 with print is larger than the maximum width of the tag label tape 109 with print to be loaded (36 mm in the embodiment), and an inner surface 36D is formed so as to extend continuous to the contact surface 36C. The inner surface 36D is formed so as to be opposed to the first and second inclined surfaces 45A, 45B (details of which will be described later) of the movable blade 41. When performing cutting, the first and second inclined surfaces 45A, 45B of the movable blade 41 partially abut the inner surface 36D (see FIG. 12). Since the blade portion of the movable blade 41 is formed by a two-step blade as described above, upon cutting the tag label tape 109 with print by the movable blade 41, a gap 39 is formed between each of the contact surface 36C, which corresponds to the end portion of the first guide portion 36, and the inner surface 36D, and the second inclined surface 45B of the movable blade 41 (see FIG. 12).

Figure 13:
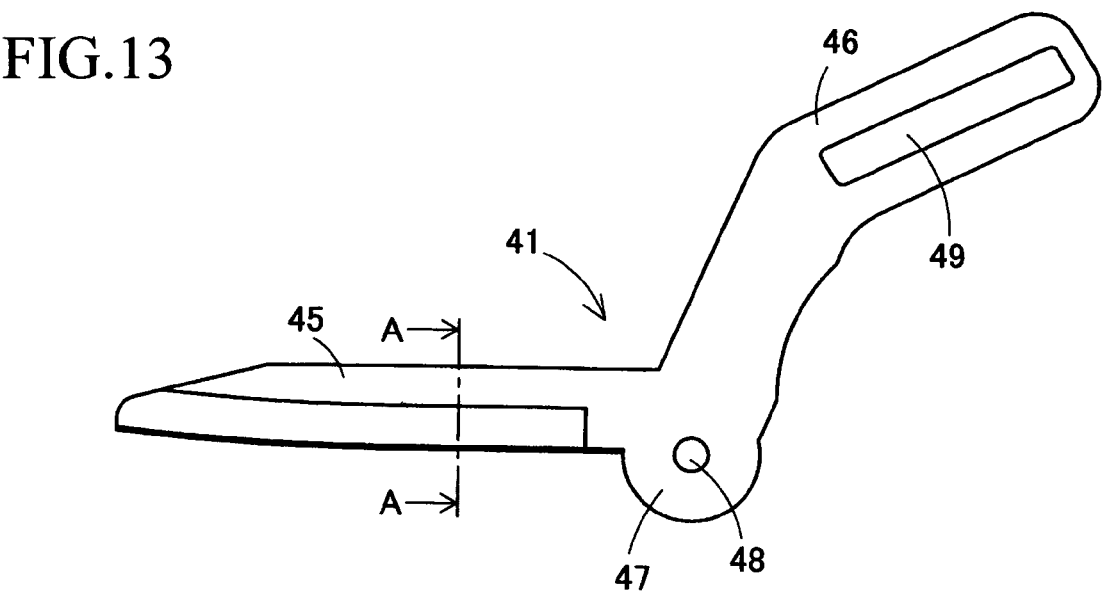
FIG. 13 is a front view showing the outward appearance of the movable blade.
Figure 14:
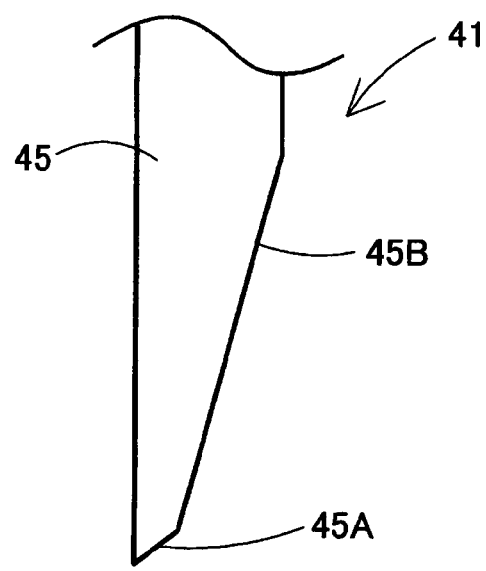
FIG. 14 is a cross-sectional view taken along the line A-A of FIG. 13.

FIG. 13 is a front view showing the outward appearance of the movable blade 41, and FIG. 14 is a cross-sectional view taken along the line A-A of FIG. 13.

In FIGS. 13 and 14, the angle formed between the first inclined surface 45A and the back surface of the blade portion 45 on the side opposite to the first inclined surface 45A is 50 degrees in this embodiment.

Figure 15:
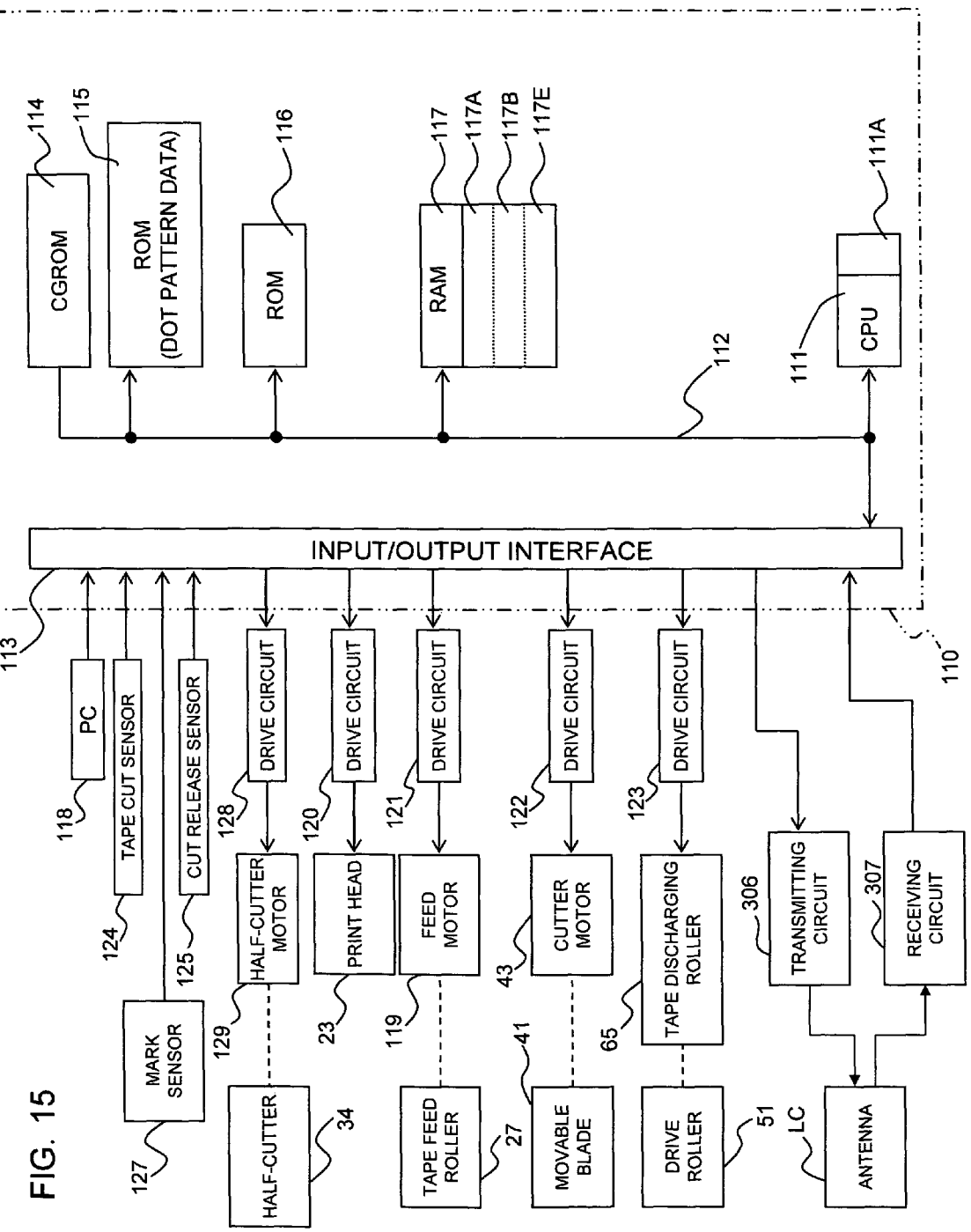
FIG. 15 is a functional block diagram showing the control system of the tag-label producing device.

FIG. 15 is a functional block diagram showing the control system of the tag-label producing device 1 according to this embodiment. In FIG. 15, a control circuit 110 is arranged on a control board (not shown) of the tag-label producing device 1.

The control circuit 110 includes a CPU 111 that has a timer 111A provided therein and controls respective devices, an input/output interface 113 that is connected to the CPU 111 through a data bus 112, a CGROM 114, ROMs 115, 116, and a RAM 117.

In the CGROM 114, dot pattern data for display is stored in correspondence with code data with respect to each of a large number of characters.

In the ROM (dot pattern data memory) 115, dot pattern data is stored with respect to each of a large number of characters for printing characters such as alphabet letters or signs while being classified into respective typefaces (gothic type typeface, Mincho typeface, and the like) in correspondence with the size of the print letter for each typeface. Graphic pattern data for printing graphic images including grayscale expressions are also stored in the ROM 115.

The ROM 116 stores a print drive control program for driving the print head 23, the feed motor 119, and the tape discharging motor 65 by reading data of a print buffer in correspondence with code data of characters such as letters or numerals input from the PC 118, a pulse number determining program for determining the number of pulses corresponding to the amount of energy for forming each print dot, a cutting drive control program for driving the feed motor 119 upon the completion of printing to feed the tag label tape 109 with print to the cutting position, and driving the cutter motor 43 to cut the tag label tape 109 with print, a tape discharging program for forcibly discharging the cut tag label tape 109 with print (=RFID label T) through the tape discharge port 11 by driving the tape discharging motor 65, and other various programs necessary for controlling the tag-label producing device 1. The CPU 111 performs various computations on the basis of these various programs that are stored in the ROM 116.

The RAM 117 is provided with a text memory 117A, a print buffer 117B, a parameter storing area 117E, and the like. The text memory 117A stores document data input from the PC 118. The print buffer 117B stores as dot pattern data a plurality of dot patterns for printing letters, signs, and the like, or the number of applied pulses representing the amount of energy for forming each dot. The print head 23 performs dot printing in accordance with the dot pattern data stored in the print buffer 117B. Various computation data are stored in the parameter storing area 117E.

Connected to the input/output interface 113 are the PC 118, the print-head drive circuit 120 for driving the print head 23, a feed-motor drive circuit 121 for driving the feed motor 119, a cutter-motor drive circuit 122 for driving the cutter motor 43, a half-cutter motor drive circuit 128 for driving the half-cutter motor 129, a tape-discharging-motor drive circuit 123 for driving the tape discharging motor 65, a transmitting circuit 306 that generates a carrier wave for making access to (performing reading/writing with respect to) the RFID circuit element To via the loop antenna LC, and modulates the carrier wave on the basis of a control signal input from the control circuit 110, a receiving circuit 307 that performs demodulation of a reply signal received from the RFID circuit element To via the loop antenna LC, and outputs the resultant to the control circuit 110, a tape cut sensor 124 and a cut release sensor 125.

In the control system built around the control circuit 110 as described above, upon input of letter data or the like via the PC 118, the text (document data) thereof is sequentially stored into the text memory 117A, and the print head 23 is driven via the drive circuit 120; the respective heater elements are selectively heated and driven in correspondence with printing dots of one line to thereby perform printing of dot pattern data stored in the print buffer 117B, and in synchronization with this, the feed motor 119 performs tape feed control via the drive circuit 121. Further, the transmitting circuit 306 performs modulation control of the carrier wave on the basis of a control signal from the control circuit 110, and the receiving circuit 307 performs processing on a signal demodulated on the basis of a control signal from the control circuit 110.

The tape cut sensor 124 and the cut release sensor 125 are each composed of the cutter helical gear cam 42A and the micro switch 126 that are provided on the cylindrical outer wall of the cutter helical gear 42 (see FIG. 9 or 10). More particularly, when the cutter helical gear 42 is rotated by the cutter motor 43, the micro switch 126 is switched from OFF to ON through the operation of the cutter helical gear cam 42A, thus detecting the completion of cutting of the tag label tape 109 with print by the movable blade 45. The above-mentioned process constitutes the tape cut sensor 124. When the cutter helical gear 42 is further rotated, the micro switch 126 is switched from ON to OFF through the operation of the cutter helical gear cam 42A, thus detecting the return of the movable blade 45 to the release position. The above-mentioned process constitutes the cut release sensor 125.

Figure 16:
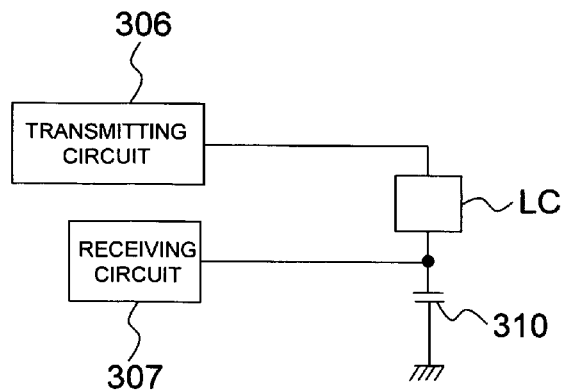
FIG. 16 is a simplified circuit diagram showing the circuit configuration of the connecting portion between a transmitting circuit, a receiving circuit, and a loop antenna.

FIG. 16 is a simplified circuit diagram showing the circuit configuration of the connecting portion between each of the transmitting circuit 306 and receiving circuit 307 with the loop antenna LC. In FIG. 16, the transmitting circuit 306 is connected to the device-side loop antenna LC, and the receiving circuit 307 is connected to a capacitor 310 that is connected in series with the device-side loop antenna LC.

Figure 17:
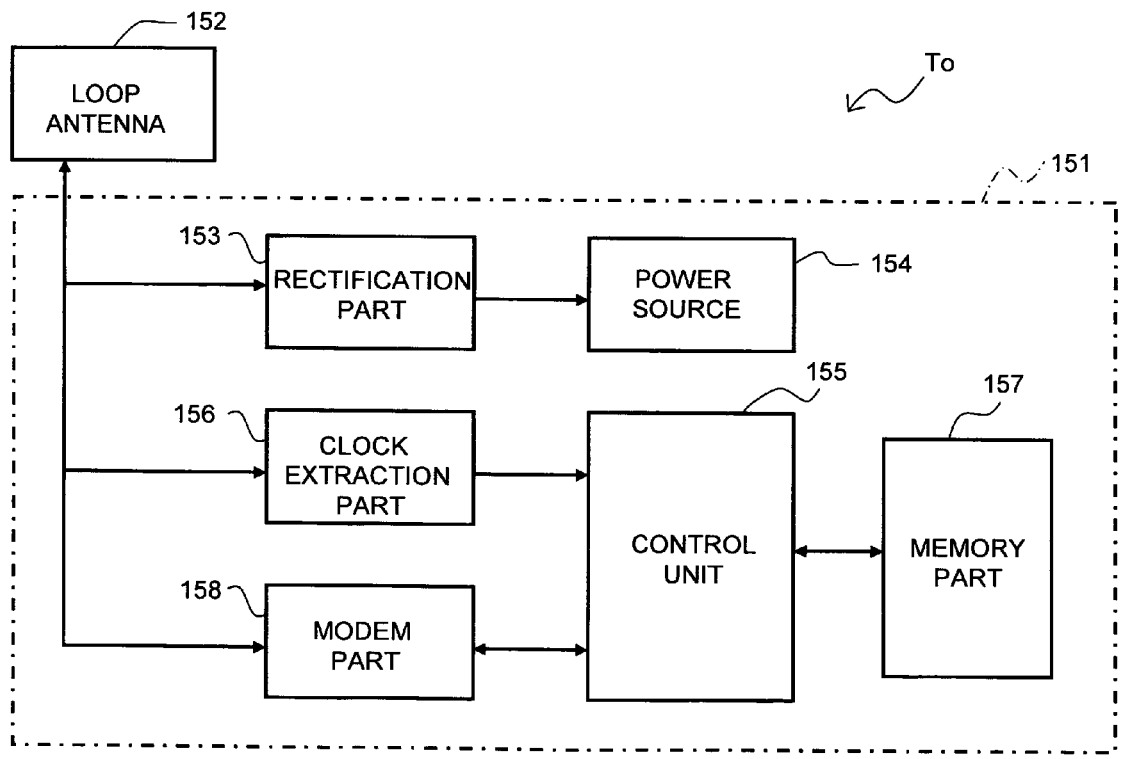
FIG. 17 is a functional block diagram showing the functional configuration of the RFID circuit element.

FIG. 17 is a functional block diagram showing the functional configuration of the RFID circuit element To. In FIG. 17, the RFID circuit element To includes the loop antenna 152 for performing transmission/reception of a signal to/from the loop antenna LC on the tag-label producing device 1 side by magnetic induction in a non-contact manner, and the IC circuit part 151 connected to the loop antenna 152.

The IC circuit part 151 includes a rectification part 153 for rectifying the carrier wave received by the loop antenna 152, a power source part 154 for storing the energy of the carrier wave rectified by the rectification part 153 to use the stored energy as a drive power source, a clock extraction part 156 for extracting a clock signal from the carrier wave received by the loop antenna 152 and supplying it to a control unit 155, a memory part 157 capable of storing a predetermined information signal, a modem part 158 connected to the loop antenna 152, and the control unit 155 for controlling the actuation of the RFID circuit element To via the rectification part 153, the clock extraction part 156, the modem part 158, and the like.

The modem part 158 performs demodulation of a communication signal from the loop antenna LC of the tag-label producing device 1 received by the loop antenna 152, and on the basis of a response signal from the control unit 155, modulates and reflects the carrier wave received by the loop antenna 152.

The control unit 155 executes a basic control, such as interpreting the received signal demodulated by the modem part 158, generating a reply signal on the basis of an information signal stored in the memory part 157, and returning the reply signal by the modem part 158.

Figure 18A:
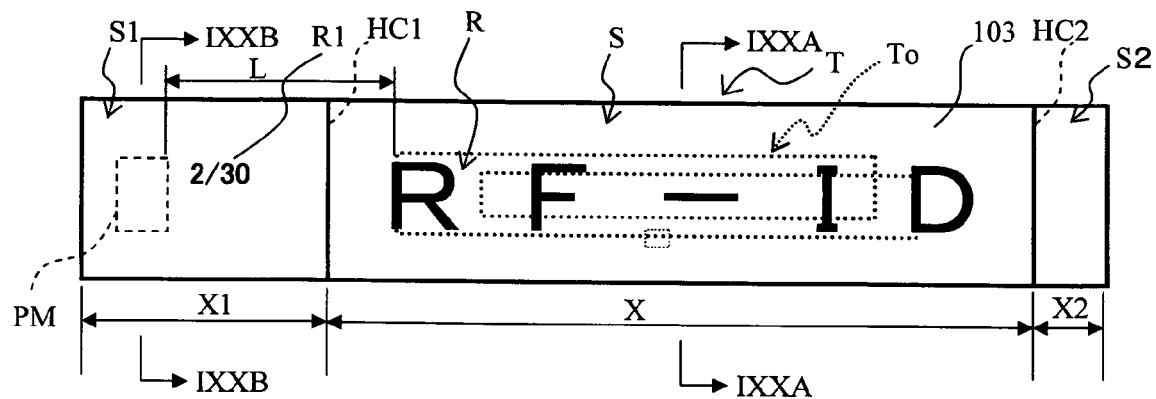
FIG. 18 is a view showing an example of the outward appearance of an RFID label T.
Figure 18B:
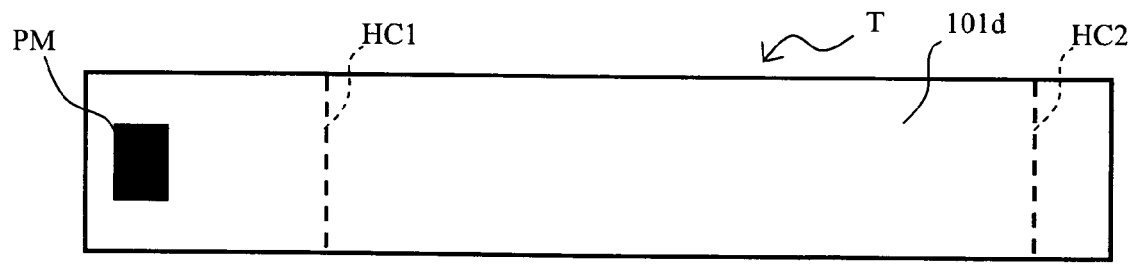
Figure 19A:
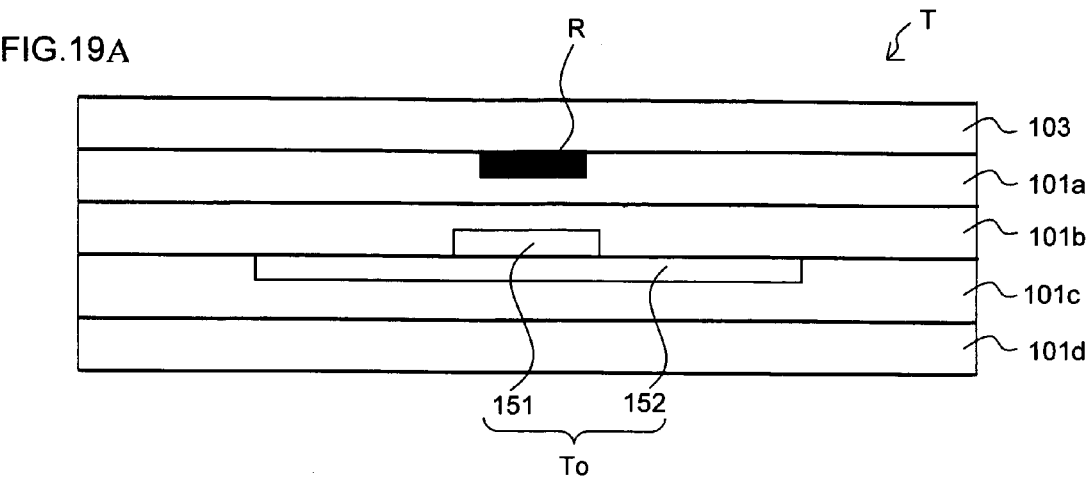
FIG. 19 is a view obtained by rotating each of the cross-sectional views taken along the lines IXXA-IXXA' and IXXB-IXXB' of FIG. 18.
Figure 19B:
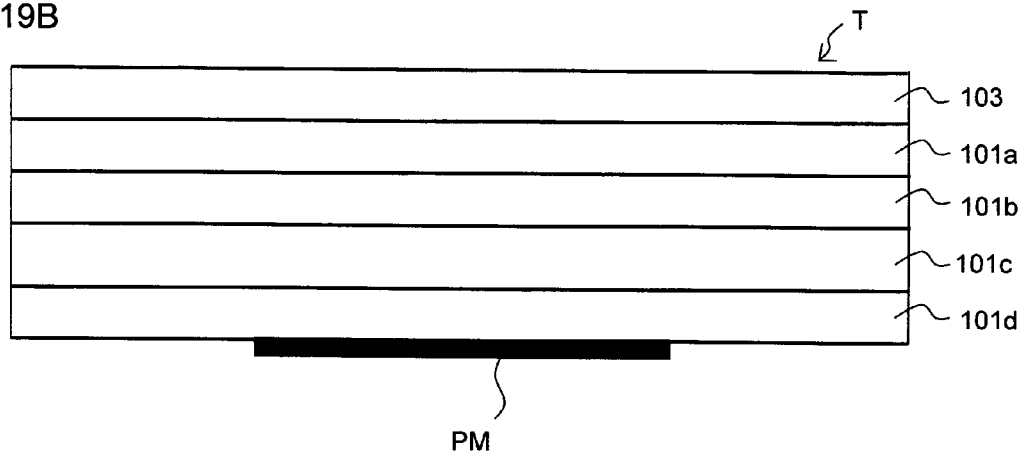
Figure 19C:
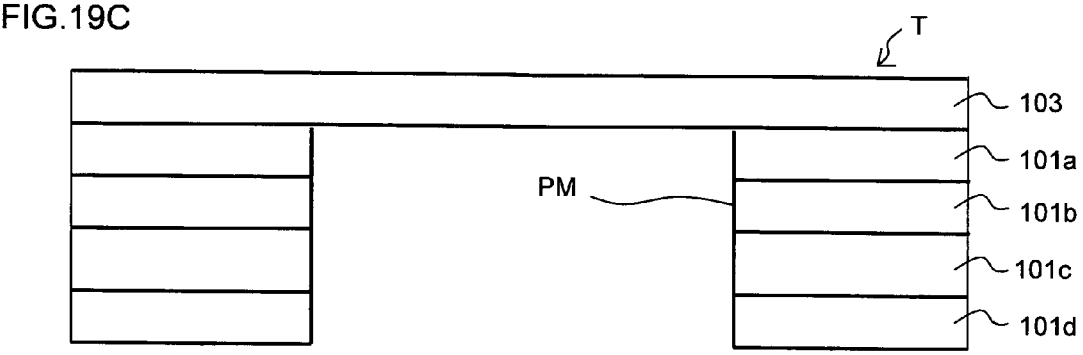

FIGS. 18A and 18B are views each showing an example of the outward appearance of the RFID label T formed after completing writing (or reading) of information to the RFID circuit element To and cutting of the tag label tape 109 with print. FIG. 18A is a top view, and FIG. 18B is a bottom view. Further, FIG. 19A is a view obtained by rotating the cross-sectional view taken along the line IXXA-IXXA' in FIG. 18 counterclockwise by 90°. FIG. 19B is a view obtained by rotating the cross-sectional view taken along the line IXXB-IXXB' in FIG. 18 counterclockwise by 90°.

In FIGS. 18A, 18B, 19A, and 19B, as described above, the RFID label T is of a five-layer structure with the cover film 103 added to the four-layer structure shown in FIG. 5. The five layers consist of the cover film 103, the adhesive layer 101a, the base film 101b, the adhesive layer 101c, and the separation sheet 101d that are laminated in the stated order from the cover film 103 side (the upper side in FIG. 14) toward the side opposite thereto (the lower side in FIG. 14). Further, as described above, the RFID circuit element To including the loop antenna 152 provided on the back side of the base film 101b is equipped inside each of the base film 101b and adhesive layer 101c, and the label print R (in this example, the character "RF-ID" indicating the kind of the RFID label T) corresponding to information stored in the RFID circuit element To, or the like is printed on the back surface of the cover film 103.

As has been already described above, the half-cut lines HC (half-cutting part; this example includes two half-cut lines HC, a front half-cut line HC1 and a rear half-cut line HC2, details of which will be described later) are formed by the half-cutter 34 substantially along the tape width direction in the cover film 103, the adhesive layer 101a, the base film 101b, and the adhesive layer 101c. The area of the cover film 103 sandwiched between these half-cut lines HC1, HC2 serves as a print area S (as a first print area) where the label print R is printed, and the areas on both sides of the print area S across the half-cut lines HC1, HC2 with respect to the tape length direction serve as a front margin area S1 and a rear margin area S2 (as a second print area), respectively. In the tag-label producing device 1, using a pair of base tape 101 and cover film 103 as described above, a plurality of RFID labels T are sequentially produced from the tag label tape 109 with print obtained by bonding the base tape 101 and the cover film 103 together. In this embodiment, information on the remaining number of RFID circuit elements To in the base tape 101 (in this example, information on the sequential order of an RFID circuit element To relating to the RFID label T. That is, usage number information indicating that the RFID circuit element To being used is the second RFID circuit element To out of 30 RFID circuit elements To equipped in the base tape 101) R1 is printed in the front margin area S1 of the cover film 103 of each RFID label T.

It should be noted that the total length of the label is set to a predetermined value in advance (fixedly at a value substantially equal to the arrangement pitch of the RFID circuit elements To, for example). The dimension (the distance from the leading end of the tape to the half-cut line HC1) X1 of the front margin area with respect to the tape length direction is also set to a predetermined value (fixedly in this example) in advance. The dimension X (the distance from the half-cut line HC1 to the half-cut line HC2) of the print area S with respect to the tape length direction is also set so as to be variable in accordance with the content or form (for example, the number of letters, font, or the like) of the label print R. The dimension (the distance from the half-cut line HC2 to the rear end of the tape) X2 of the rear margin area with respect to the tape length direction is set so as to be variable in accordance with the value of the dimension X of the print area S (however, as will be described later, there are cases where the rear half-cut line HC2 is not provided). Further, the above-mentioned identifier PM remains in the separation sheet 101d, and the distance from the leading end of the identifier PM in the tape feed direction to the leading end of the RFID circuit element To in the tape feed direction, which is offset with respect to the identifier PM, is set to a predetermined value L. It should be noted that instead of providing a black-painted marking as shown in each of FIGS. 19A and 19B as the identifier PM as already described above, as shown in FIG. 19C, a hole bored by laser machining or the like so as to substantially penetrate the base tape 101 may also serve as the identifier PM. In this case, when the mark sensor 127 is formed by a known reflection-type photoelectric sensor composed of a light projector and a light receiver, as the identifier PM formed by the above-mentioned hole comes to the position between the light projector and the light receiver, light from the light projector passes through the hole of the identifier PM and the transparent cover film 103 and is no longer reflected and hence no longer received by the light receiver, whereby the control output from the light receiver is inverted.

Figure 20:
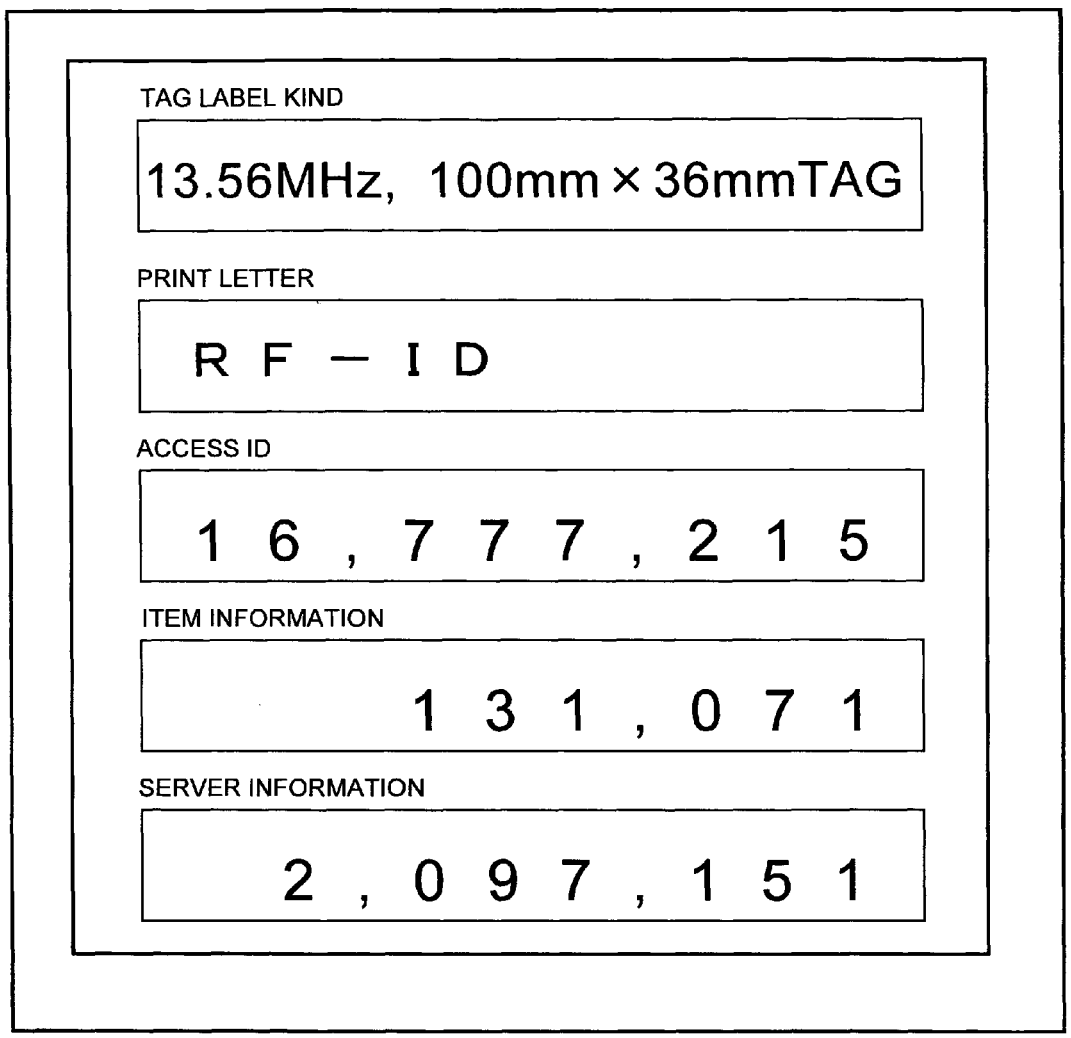
FIG. 20 is a view showing an example of the screen displayed on the PC when making access to (performing reading from or writing to) RFID tag information.

FIG. 20 is a view showing an example of the screen displayed on the PC 118 (the terminal 118a or the general purpose computer 118b) mentioned above when making access to (performing reading from or writing to) the RFID tag information of the IC circuit part 151 of the RFID circuit element To by the tag-label producing device 1 as described above.

In FIG. 20, in this example, the tag label kind (access frequency and tape dimensions), the label print R printed in correspondence with the RFID circuit element To, an access (reading or writing) ID as identification information (tag ID) unique to that RFID circuit element To, the address of item information stored in the information server IS, and the storage destination addresses of those corresponding information in the route serer RS, and the like can be displayed on the PC 118. Through operation on the PC 118, the tag-label producing device 1 is activated and the label print R is printed onto the cover film 103, and also information such as the writing ID or item information is written to the IC circuit part 151 (or information such as the reading ID or item information previously stored in the IC circuit part 151 is read).

It should be noted that at the time of performing reading and writing as described above, the correspondence between the tag ID of the RFID circuit element To of the produced RFID label T and information read from the IC circuit part 151 (or information written into the IC circuit part 151) of that RFID label T is stored in the route server RS described above and can be referenced as required.

According to this embodiment, in the tag-label producing device 1 having the basic configuration as described above, at the time when the RFID circuit element To reaches the communication position with the loop antenna LC as the tag label tape 109 with print is fed, the subsequent control on the print head 23 or the loop antenna LC is switched in accordance with whether or not printing with the print head 23 has been completed at that time. Now, the control behaviors according to the feed position will be described with reference to FIGS. 21 to 29.

(A) When the Print Length is Relatively Long

FIGS. 21A to 21K are explanatory diagrams each showing the positional relation between the identifier PM, RFID circuit element To, and print area S for label print R of the tag label tape 109 with print that is continuously paid out, and the loop antenna LC, the mark sensor 127, the half-cut unit 34, the cutting mechanism 15, and the print head 23. It should be noted that as illustrated in the drawings, in this embodiment, the distance L in the base tape 101 from the leading end position of the identifier PM in the tape feed direction to the leading end of the RFID circuit element To in the tape feed direction is set in advance so to be equal to the distance Lo in the tape feed direction between the mark sensor 127 and the print head 23.

First, FIG. 21A shows a state immediately after the paying out of the tag label tape 109 with print from the cartridge 7 is started. In the state illustrated in the drawing, the identifier PM has not been detected by the mark sensor 127.

When the feeding of the tag label tape 109 with print further proceeds in this state (in other words, the feeding of the base tape 101 and cover film 103; the same applies hereinafter), the portion in the vicinity of the leading end of the RFID circuit element To in the tape feed direction reaches the position of the print head 23 (FIG. 21B). At this time, since L=Lo as described above, when, due to the movement of the tag label tape 109 with print, the leading end of the identifier PM reaches the position of the mark sensor 127, the position of the cover film 103 corresponding to the RFID circuit element To (the position where the cover film 103 is to be bonded to the RFID circuit element To position of the base tape 101) reaches the position of the print head 23. When, in correspondence with this, the identifier PM is detected by the mark sensor 127, printing of the label print R onto the cover film 103 is started (FIG. 21C). In this example, as shown in FIGS. 21I to 21K that will be described later, a relatively long string of letters (alphabet letters "ABCDEFGHIJKLMN") is printed.

When the feeding of the tag label tape 109 with print further proceeds from the state as shown in FIG. 21C, the preset position of the front half-cut line HC1 (as described above, the position at the distance X1 from the leading end of the tape; see FIG. 18) reaches the position of the half-cut unit 34 (FIG. 21D). In this state, since the identifier PM has already been detected by the mark sensor 127 as described above, the detection of the arrival at this position is performed by detecting that the tag label tape 109 with print has moved by a predetermined distance from the state shown in FIG. 21B mentioned above (identifier PM detection start state). In response to this detection, the feeding of the tag label tape 109 with print is stopped, and the front half-cut line HC1 is formed by means of the half-cut unit 34 (FIG. 21D).

Thereafter, the feeding of the tag label tape 109 with print is resumed, and as the feeding of the tag label tape 109 with print further proceeds from the state shown in FIG. 21D mentioned above (FIG. 21E), the RFID circuit element To reaches the position of the loop antenna LC (FIG. 21F). At this time, since a relatively long letter string ("ABCDEFGHIJKLMN") is printed as the label print R in this example, not all of the printing in the print area S has been finished at this point. Accordingly, the feeding and printing of the tag label tape 109 with print are temporarily stopped (interrupted), and after performing wireless communication with the RFID circuit element To by means of the loop antenna LC in this feeding stopped state, the feeding and printing are resumed (FIG. 21G), thus eventually completing printing of all of the string of letters ("ABCDEFGHIJKLMN") (FIG. 21H).

When the feeding of the tag label tape 109 with print further proceeds from the above-mentioned state shown in FIG. 21H, the preset position of the rear half-cut line HC2 (as described above, the position at the distance X2 from the rear end of the tape; see FIG. 18) reaches the position of the half-cut unit 34. As in the detection of the position of the front half-cut line HC1 as described above, the detection of the arrival at this position is performed by detecting that the tag label tape 109 with print has moved by a predetermined distance from the state shown in FIG. 21B. In response to this detection, the feeding of the tag label tape 109 with print is stopped, and the rear half-cut line HC2 is formed by means of the half-cut unit 34 (FIG. 21I).

In this embodiment, as described above, in each RFID label T, information on the remaining number of RFID circuit elements To is printed in the front margin area S1 of the cover film 103. In view of the positional relation of the loop antenna LC, the print head 23, and the like with respect to the front-to-rear direction as described above, the remaining-number information relating to a given RFID label T is printed in the front margin area S1 of the cover film 103 at the time of producing the previous immediately preceding RFID label T. That is, as the feeding of the tag label tape 109 with print further proceeds from the state shown in FIG. 21I mentioned above, the front margin area S1 of the cover film 103 corresponding to the above-mentioned next RFID label T reaches the position of the print head 23. In the same manner as described above, the detection of the arrival at this position is performed by detecting that the tag label tape 109 with print has moved by a predetermined distance from the state shown in FIG. 21B. In response to this detection, printing of finished print number R1 as the above-mentioned remaining-number information is started with respect to the cover film 103 (FIG. 21J).

As the feeding of the tag label tape 109 with print further proceeds from the state shown in FIG. 21J mentioned above, the position of a cutting line CL (cutting part) corresponding to the dimension X of the print area S of each RFID label T with respect to the tape length direction, which is set so as to be variable in accordance with the length of the label print R, reaches the position of the cutting mechanism 15 (at this stage, the printing of the above-mentioned finished print number R1 has been completed). In the same manner as described above, the detection of the arrival at this position is also performed by detecting that the tag label tape 109 with print has moved by a predetermined distance from the state shown in FIG. 21B. In response to this detection, the feeding of the tag label tape 109 with print is stopped, and cutting is performed by the cutting mechanism 15 at the cutting line CL (FIG. 21K), so the leading end side of the tag label tape 109 with print is cut off to produce the RFID label T.

Figure 22A:
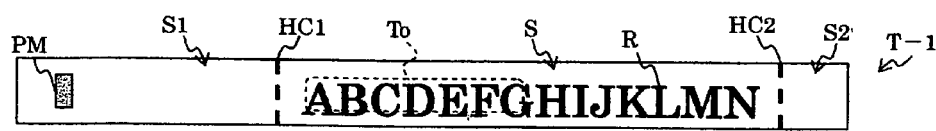
FIG. 22 is a view showing an example of the RFID label.
Figure 22B:
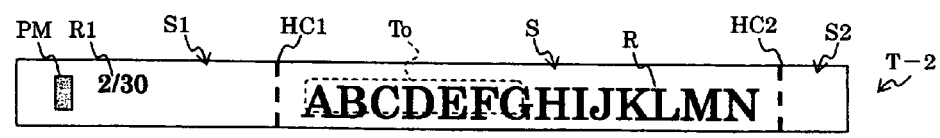

FIGS. 22A and 22B are views, substantially corresponding to FIG. 18A described above, each showing an example of the RFID label T completed as described above. FIG. 22A shows the example of an RFID label T-1 that is produced for the first time (that is, the first RFID label) using a new base tape 101 and a new cover film 103. FIG. 22B shows the example of another RFID label T-2 (that is, the second RFID label onward). In each of the RFID labels T-1 and T-2, the RFID circuit element To is arranged on the center side in the tape length direction, the label print R is printed in the print area S corresponding to the RFID circuit element To, and the front margin area S1 where the identifier PM is present, and the rear margin area S2 are provided across the front and rear half cut lines HC1, HC2, respectively, from the print area S. As described above, since the RFID label shown in FIG. 22A is the first RFID label T-1, the remaining-number information is not printed in the front margin area S1, whereas the finished print number R1 is printed in the front margin area S1 of the second RFID label T-2 onward (in this example, the second RFID label) shown in FIG. 22B.

It should be noted while the length of the print area S varies according to the form of the label print R as described above, if the length of the print area S becomes longer than a certain length for reasons such as the large number of letters in the label print R, the rear half-cut line HC2 is omitted (that is, the rear margin area S2 is not set), so the area extending all the way up to the rear end of the tag label tape 109 with print serves as the print area S where the label print R is printed.

Figure 23A:
FIG. 23 is a view showing an example of the RFID label T with no rear margin area.
Figure 23B:
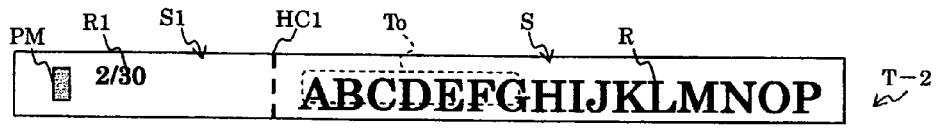

FIGS. 23A and 23B are views, respectively corresponding to FIGS. 22A and 22B mentioned above, each showing an example of such an RFID label T with no rear margin area S2. FIG. 23A shows the example of the RFID label T-1 that is produced for the first time using a new base tape 101 and a new cover film 103 (that is, the first RFID label). FIG. 23B shows the example of another RFID label T-2 (that is, the second RFID label onward). In each of the RFID labels T-1 and T-2, the RFID circuit element To is arranged on the center side in the tape length direction, the label print R is printed in the print area S corresponding to the RFID circuit element To, and only the front margin area S1 where the identifier PM is present is provided across the front half-cut line HC1 from the print area S. Since the RFID label shown in FIG. 23A is the first RFID label T-1, the remaining-number information is not printed in the front margin area S1, whereas the finished print number R1 is printed in the front margin area S1 of the second RFID label T-2 onward shown in FIG. 23B.

(B) When the Print Length is Relatively Short

Like FIGS. 21A to 21K, FIGS. 24A to 24K are explanatory diagrams each showing the positional relation between the identifier PM, RFID circuit element To, and print area S for label print R of the tag label tape 109 with print that is continuously paid out, and the loop antenna LC, the mark sensor 127, the half-cut unit 34, the cutting mechanism 15, and the print head 23. In this example, as shown in FIGS. 24F to 24K that will be described later, a relatively short string of letters (alphabet letters "AMCDEFJHIJ") is printed as an example.

First, FIGS. 24A to 24E are the same as FIGS. 21A to 21E. That is, when, after the paying out of the tag label tape 109 with print from the cartridge 7 is started (FIG. 24A), the tag label tape 109 with print is further fed and the leading end of the identifier PM reaches the position of the mark sensor 127 (FIG. 24B, the printing of the label print R onto the cover film 103 is started (FIG. 24C). When the feeding further proceeds, and the position of the front half-cut line HC1 reaches the position of the half-cut unit 35, the front half-cut line HC1 is formed by means of the half-cut unit 34 (FIG. 24D); thereafter, the feeding of the tag label tape 109 with print is resumed, and the feeding of the tag label tape 109 with print further proceeds (FIG. 24E).

Then, since the number of letters in the label print R is relatively small in this example, the printing of the label print ("ABCDEFGHIJ") is completed before the RFID circuit element To reaches the position of the loop antenna LC (FIG. 24F).

Thereafter, as the feeding proceeds, the RFID circuit element To reaches the position of the loop antenna LC (FIG. 24G). Here, unlike in the case (A) described above, all of the printing with respect to the print area S has been finished at this point. Accordingly, the feeding of the tag label tape 109 with print is temporarily stopped (interrupted), and after performing wireless communication with the RFID circuit element To by means of the loop antenna LC in this feeding stopped state, the feeding is resumed (FIG. 24H).

The subsequent procedures in FIGS. 24I to 24K are the same as those in FIGS. 21I to 21K described above. That is, when the feeding of the tag label tape 109 with print further proceeds from the state shown in FIG. 24H mentioned above, and the position of the half-cut line HC2 reaches the position of the half-cut unit 35, the feeding of the tag label tape 109 with print is stopped, and the rear half-cut line HC2 is formed by means of the half-cut unit 35 (FIG. 24I). When the feeding further proceeds and the front margin area S1 of the cover film 103 corresponding to the next RFID label T reaches the position of the print head 23, the printing of the finished print number R1 is started (FIG. 24J). When the feeding further proceeds and the position of the cutting line CL reaches the position of the cutting mechanism 15, the feeding is stopped, and cutting is performed by the cutting mechanism 15 at the cutting line CL (FIG. 24K), so the leading end side of the tag label tape 109 with print is cut off to produce the RFID label T.

Figure 25A:
FIG. 25 is a view showing an example of the RFID label T.
Figure 25B:

FIGS. 25A and 25B are views, substantially corresponding to FIGS. 22A and 22B described above, each showing an example of the RFID label T completed as described above. Similarly as described above, since the RFID label shown in FIG. 25A is the first RFID label T-1, the remaining-number information is not printed in the front margin area S1, whereas the finished print number R1 is printed in the front margin area S1 of the second RFID label T-2 onward shown in FIG. 25B.

(C) When Printing Corresponding to Communication Error is Performed

In either of the cases (A) and (B) mentioned above, the description is based on the assumption that the communication between the loop antenna LC and the RFID circuit element To has succeeded and that the writing of information to the IC circuit part 151 of the RFID circuit element To (or reading of information from the IC circuit part 151) has succeeded. However, there may be cases where such transmission/reception of information fails (=communication error) due to some circumstances. In these cases, the corresponding printing may be performed in order to clearly inform the operator to that effect.

(C-1) When the Print Length is Relatively Long

FIGS. 26A to 26F, 26G' to 26I', and 26J and 26K are explanatory views, corresponding to FIG. 21 mentioned above, showing the processing when the above-mentioned communication error occurs in the above-mentioned case (A) where the print length is relatively long.

FIGS. 26A to 26F are completely the same as FIGS. 21A to 21F. As described above with reference to FIG. 21F, in response to the arrival of the RFID circuit element To at the loop antenna LC at this time (FIG. 26F) (not all of the printing in the print area S has been finished at this point), the feeding and printing of the tag label tape 109 with print are temporarily stopped (interrupted), and wireless communication with the RFID circuit element To is performed by means of the loop antenna LC in the feeding stopped state. In this example, printing is interrupted in the state where printing of "ABCDEFGHIJK", out of "ABCDEFGHIJKLMN" to be finally printed, has been substantially completed.

Here, if transmission/reception of information by the above-mentioned wireless communication succeeds, then, as described above with reference to the case (A), the feeding and printing are resumed and printing of all of the letter string "ABCDEFGHIJKLMN" is finally completed by printing the remaining letter "LMN" (see FIGS. 21G and 21H described above). If the transmission/reception of information has not succeeded, instead of the remaining letter "L", printing of another form of print R' (in this case, a string of small letters "NG" indicating a failure) is performed immediately after this in order to indicate the failure (FIGS. 26G' and 26H').

Since such a tag label tape 109 with print for which writing of information to or reading of information from the RFID circuit element To has failed is not used as an RFID label, the feeding is continued as it is (FIG. 26I') without stopping the feeding and forming the half-cut line HC2 as described above with reference to FIG. 21I. Then, as in FIG. 21J described above, when the front margin area S1 of the cover film 103 corresponding to the next RFID label T reaches the position of the print head 23, the printing of the above-mentioned finished print number R1 onto the cover film 103 is started (FIG. 26J). When the position of the cutting line CL corresponding to the dimension X of the print area S of the RFID label T with respect to the tape length direction, which is set to a predetermined value, reaches the position of the cutting mechanism 15, cutting is performed by the cutting mechanism 15 at the cutting line CL (FIG. 26K), thus producing an RFID label T' that is not intended for actual use.

Figure 27A:
FIG. 27 is a view showing the RFID label completed in a communication failure state.
Figure 27B:
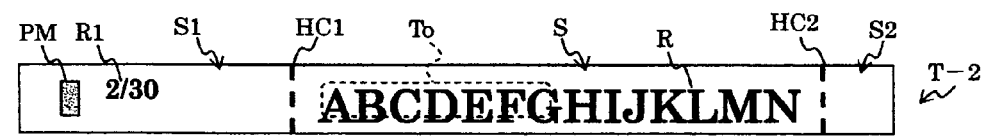

FIG. 27A is a view, corresponding to FIG. 22A described above, showing an (in this example, the first) RFID label T'-1 completed as described above (in the communication failure state). Since the rear half-cut line HC2 is omitted as described above, in the RFID label T'-1, the RFID circuit element To is arranged on the center side in the tape length direction, the label print R and the above-described other form of print R' are printed in the print area S corresponding to the RFID circuit element To, and the front margin area S1 where the identifier PM is present is provided across the front half-cut line HC1 from the print area S. FIG. 27B shows a case where after the production of the RFID label T'-1, communication has succeeded with the next RFID circuit element To onward (FIG. 27B is substantially the same as FIG. 22B). Even when communication fails as described above, the printing of the remaining-number information is performed as usual for the next label to be produced (see FIG. 26J or 26K described above). Accordingly, in this example, the finished print number R1 is printed in the front margin area S1 in the second RFID label T-2.

(C-2) When the Print Length is Relatively Short

Like FIGS. 26A to 26F, 26G' to 26I', and 26J and 26K mentioned above, FIG. 28A to 28F, 28G' to 28I', and 28J and 28K are explanatory views showing the processing when the above-mentioned communication error occurs in the case where the print length is relatively short. In this example, as will be described later, a relatively short string of letters (alphabet letters "ABCDEFGHIJ") is printed.

FIGS. 28A to 28G are completely the same as FIGS. 24A to 24G. As described above with reference to FIG. 24G, in response to the arrival of the RFID circuit element To at the position of the loop antenna LC at this time (FIG. 28G) (all of the printing in the print area S has been finished at this point), the feeding of the tag label tape 109 with print is temporarily stopped (interrupted), and wireless communication with the RFID circuit element To is performed by means of the loop antenna LC in the feeding stopped state. In this example, printing is interrupted in the state where printing of all of the letter string "ABCDEFGHIJ" to be finally printed has been completed.

At this time, if transmission/reception of information by the above-mentioned wireless communication succeeds, as described with reference to the case (2), the feeding is simply resumed (printing is not performed; see FIG. 24H); if transmission/reception of information has not succeeded, in order to clearly indicate this, printing of another form of print R' (in this example, a string of small letters "NG" indicating a failure) is additionally performed. In this case, since the position of the print head 23 is spaced apart from the last letter "J" of the label print R, the printing of the other form of print R' is started at a position slightly away from the last letter "J" (FIG. 28H').

Since such a tag label tape 109 with print for which writing of information to or reading of information from the RFID circuit element To has failed is not used as an RFID label, the feeding is continued as it is (FIG. 28I') without stopping the feeding and forming the half-cut line HC2 as described above with reference to FIG. 24I. Then, as in FIG. 24J described above, when the front margin area S1 of the cover film 103 corresponding to the next RFID label T reaches the position of the print head 23, the printing of the above-mentioned finished print number R1 onto the cover film 103 is started (FIG. 28J). When the position of the cutting line CL corresponding to the dimension X of the print area S of the RFID label T with respect to the tape length direction, which is set to a predetermined value, reaches the position of the cutting mechanism 15, cutting is performed by the cutting mechanism 15 at the cutting line CL (FIG. 28K), thus producing an RFID label T' that is not intended for actual use.

FIG. 29A is a view, corresponding to FIG. 25A described above, showing an (in this example, the first) RFID label T'-1 completed as described above (in the communication failure state). Since the rear half-cut line HC2 is omitted as described above, in the RFID label T'-1, the RFID circuit element To is arranged on the center side in the tape length direction, the label print R (printing of all the letters has been completed) and the above-described other form of print R' are printed in the print area S corresponding to the RFID circuit element To, and the front margin area S1 where the identifier PM is present is provided across the front half-cut line HC1 from the print area S. FIG. 29B shows a case where after the production of the RFID label T'-1, communication has succeeded with the RFID circuit element To onward (FIG. 29B is substantially the same as FIG. 25B). Even when communication fails as described above, the printing of the remaining-number information is performed as usual for the next label to be produced (see FIGS. 28J and 28K described above). Accordingly, in this example, the finished print number R1 is printed in the front margin area S1 in the second RFID label T-2.

As described above, in this embodiment, a control is performed in which, depending on whether or not printing with the print head 23 has been completed at the time when the RFID circuit element To reaches the communication position with the loop antenna LC, the subsequent operations of the print head 23, loop antenna LC, and the like are switched in cooperation with each other.

Figure 30:
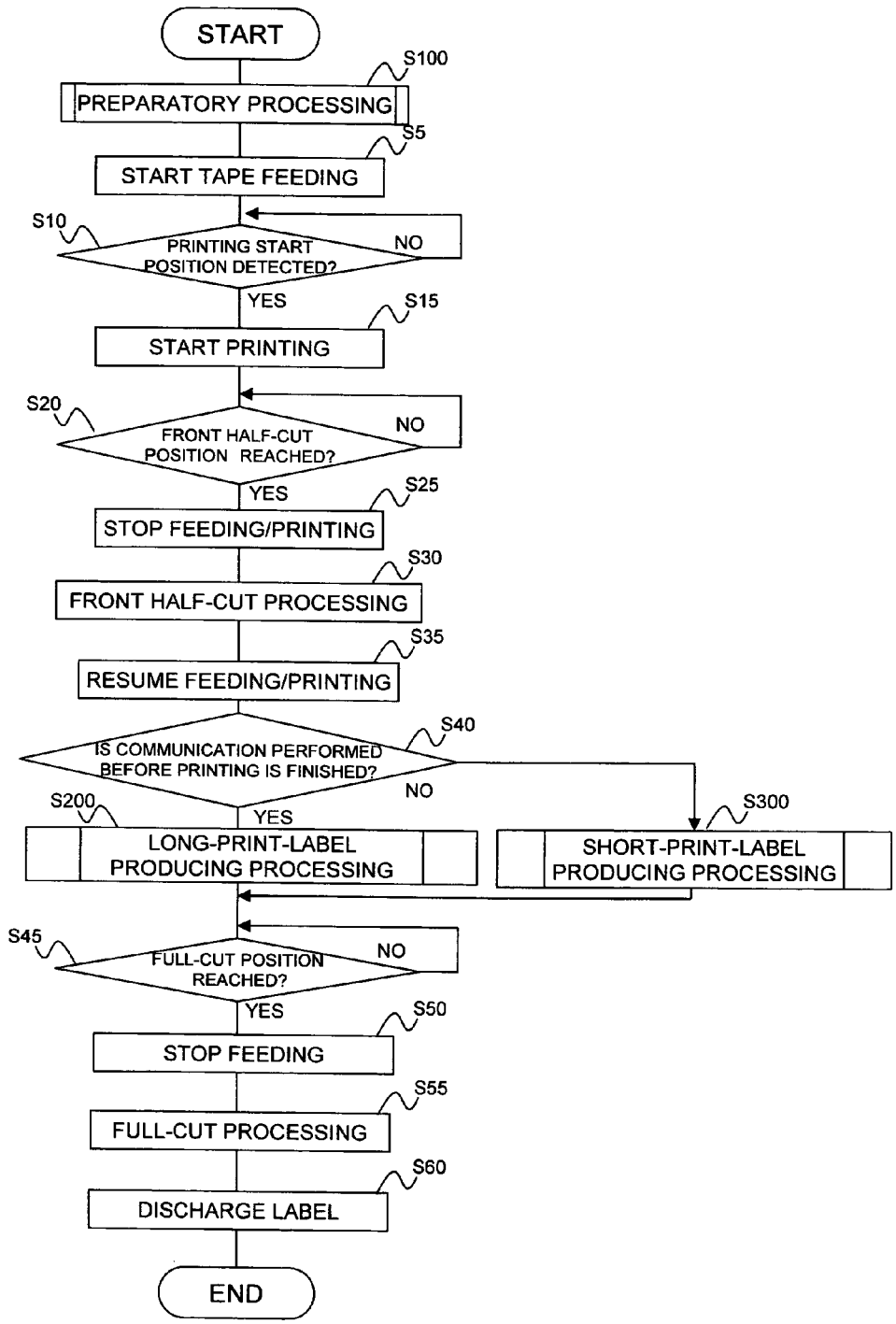
FIG. 30 is a flowchart showing the procedure of control executed by a control circuit.

FIG. 30 is a flowchart showing the procedure of control executed by the control circuit 110 in order to perform the above-described control.

In FIG. 30, this flow is started when a predetermined RFID label producing operation is performed by the tag-label producing device 1 via the PC 118. First, in step S100, preparatory processing (for details, see FIG. 31 that will be described later) is executed. In the preparatory processing, an operation signal from the PC 118 is input (via the communication line NW and the input/output interface 113), and on the basis of this operation signal, setting of print data or communication data with the RFID element To, or the like is performed.

Thereafter, the process transfers to step S5 where a control signal is output to the feed-motor drive circuit 121 via the input/output interface 113, and the tape feed roller 27 and the ribbon take-up roller 106 are rotationally driven by the drive force of the feed motor 121. Further, a control signal is output to the tape discharging motor 65 via the tape-discharging-motor drive circuit 123, and the drive roller 51 is rotationally driven. Due to these operations, the base tape 101 is paid out from the first roll 102 and supplied to the tape feed roller 27, and the cover film 103 is paid out from the second roll 104. By means of the tape feed roller 27 and the pressure roller 28, the base tape 101 and the cover film 103 are adhered and integrated together to form the tag label tape 109 with print, which is carried in the direction to the outside of the cartridge 7 and further to the outside of the tag-label producing device 1.

Thereafter, in step S10, on the basis of a detection signal of the mark sensor 127 input via the input/output interface 113, it is determined whether or not the identifier PM of the tag label tape 109 with print has been detected (in other words, whether or not the tag label tape 109 with print has reached the printing start position). The determination is not satisfied and this procedure is repeated until the identifier PM is detected, and upon detecting the identifier, the determination is satisfied, and the process transfers to the next step S15.

In step S15, a control signal is output to the print-head drive circuit 120 via the input/output interface 113, and the print head 23 is energized, thus starting printing of the label print R such as letters, signs, or barcodes corresponding to the print data generated in step S100, with respect to the above-described print area S (=the area to be substantially bonded onto the back surface of the RFID circuit elements To that are arranged in the base tape 101 at predetermined equal pitched) of the cover film 103 (see FIGS. 21B and 21C).

Thereafter, in step S20, it is determined whether or not the tag label tape 109 with print has been fed to the above-described front half-cut position (in other words, whether or not the tag label tape 109 with print has reached the position where the half-cutter 34 of the half-cut mechanism 35 directly faces the front half-cut line HC1 set in step S100). The determination at this time may be performed by, for example, detecting by a predetermined known method the distance by which the tag label tape 109 with print has been fed after the detection of the identifier PM of the base tape 101 in step S10 mentioned above (such as by counting the number of pulses output by the feed-motor drive circuit 121 for driving the feed motor 119 that is a pulse motor). The determination is not satisfied until the arrival at the front half-cut position and this procedure is repeated, and upon the arrival at the front half-cut position, the determination is satisfied and the process transfers to the next step S25.

In step 25, a control signal is output to each of the feed-motor drive circuit 121 and the tape-discharging-motor drive circuit 123 via the input/output interface 113, and the drives of the feed motor 119 and tape discharging motor 65 are stopped to thereby stop the rotations of the tape feed roller 27, ribbon take-up roller 106, and drive roller 51. Accordingly, as the tag label tape 109 with print paid out from the cartridge 7 moves in the discharge direction, the paying out of the base tape 101 from the first roll 102, the paying out of the cover film 103 from the second roll 104, and the feeding of the tag label tape 109 with print are stopped in the state with the half-cutter 34 of the half-cut mechanism 35 directly facing the front half-cut line HC1 set in step S100. Further, at this time, a control signal is also output to the print-head drive circuit 120 via the input/output interface 113, and the energization of the print head 23 is stopped to thereby stop (interrupt) the printing of the label print R.

Thereafter, in step S30, a control signal is output to the half-cutter motor drive circuit 128 via the input/output interface 113 to drive the half-cutter motor 129, and the half-cutter 34 is pivoted to perform front half-cut processing of cutting the cover film 103, adhesive layer 101a, base film 101b, and adhesive layer 101c of the tag label tape 109 with print to thereby form the front half-cut line HC1 (see FIG. 21D).

Then, the process transfers to step S35 where, in the same manner as in step S5 mentioned above, the feeding of the tag label tape 109 with print is resumed by rotationally driving the tape feed roller 27, the ribbon take-up roller 106, and the drive roller 51, and as in step S15, the print head 23 is energized to resume the printing of the label print R.

Thereafter, in step S40, in accordance with the print end position (see step S130 that will be described later), which is set so as to be variable in accordance with the content of print (the number of print letters, font, and the like) in step S100, and the tag rear end position (see step S145 that will be described later), which is set in accordance with the information on the kind of the cartridge 7 included in the operation signal input by the operator in step S100, it is determined with respect to the tag label tape 109 with print whether or not the communication position with the RFID circuit element To (the position where the RFID circuit element To directly faces the loop antenna LC) is reached before the printing of all of the label print R with respect to the print area S is finished (the state shown in FIG. 21F described above), or whether or not the printing of all of the label print R with respect to the print area S is finished before the communication position with the RFID circuit element To (the position where the RFID circuit element To directly faces the loop antenna LC) is reached (the state shown in FIG. 24G described above).

For example, if the length of the label print R to be printed is relatively long and the positional relation as shown in FIG. 21F mentioned above results, the determination of step S40 mentioned above is satisfied, and the process transfers to step S200 where the processing of producing a long print label is performed. That is, once the tag label tape 109 with print has been fed to the communication position with the RFID circuit element To (the position where the RFID circuit element To directly faces the loop antenna LC), the feeding and printing are stopped to perform transmission/reception of information; thereafter, the feeding and printing are resumed to complete the printing, and after the feeding is further continued and then stopped at the rear half-cut position to form the rear half-cut line HC2, printing (margin printing) of the finished print number R1 for the next RFID label T is performed (see FIG. 32 that will be described later).

On the other hand, for example, if the length of the label print R to be printed is relatively short and the positional relation as shown in FIG. 24G mentioned above results, the determination of step S40 mentioned above is not satisfied, and the process transfers to step S300 where the processing of producing a short print label is performed. That is, after the feeding and printing are continued as they are to complete the printing first, the feeding is further continued; upon arrival at the communication position with the RFID circuit element To (the position where the RFID circuit element To directly faces the loop antenna LC), the feeding is stopped to perform transmission/reception of information, and after the feeding is further continued and then stopped at the rear half-cut position to form the rear half-cut line HC2, printing (margin printing) of the finished print number R1 for the next RFID label T is performed (see FIG. 33 that will be described later).

Once step 200 or step 300 has been finished as described above, the process transfers to step S45 (at this point, the feeding of the tag label tape 109 with print has been resumed in step 200 or step 300). In step S45, it is determined whether or not the tag label tape 109 with print has been fed to the above-described full-cut position (in other words, whether or not the tag label tape 109 with print has reached the position where the movable blade 41 of the cutting mechanism 15 directly faces the cutting line CL set in step S100). In the same manner as described above, the determination at this time as well may be performed by, for example, detecting by a predetermined known method the distance by which the tag label tape 109 with print has been fed after the detection of the identifier PM of the base tape 101 in step S10 mentioned above (such as by counting the number of pulses output by the feed-motor drive circuit 121 for driving the feed motor 119 that is a pulse motor). The determination is not satisfied until the arrival at the full-cut position and this procedure is repeated, and upon the arrival at the full-cut position, the determination is satisfied and the process transfers to the next step S50.

In step S50, in the same manner as step S25 mentioned above, the rotations of the tape feed roller 27, ribbon take-up roller 106, and drive roller 51 are stopped to thereby stop the feeding of the tag label tape 109 with print. Accordingly, in the state with the movable blade 41 of the cutting mechanism 15 directly facing the cutting line CL set in step S100, the paying out of the base tape 101 from the first roll 102, the paying out of the cover film 103 from the second roll 104, and the feeding of the tag label tape 109 with print stop.

Thereafter, in step S55, a control signal is output to the cutter-motor drive circuit 122 to drive the cutter motor 43, and the movable blade 41 of the cutting mechanism 15 is pivoted to perform full-cut processing of cutting (severing) all of the cover film 103, adhesive layer 101*a*, base film 101*b*, adhesive layer 101*c*, and separation sheet 101*d* of the tag label tape 109 with print to form the cutting line CL (see FIG. 21K). Due to the severing by the cutting mechanism 15, a label-shaped RFID label T from which RFID tag information of the RFID circuit element To has been read and on which corresponding predetermined printing has been performed, is produced as it is cut off from the tag label tape 109 with print.

Thereafter, the process returns to step S60 where a control signal is output to the tape-discharging motor drive circuit 123 via the input/output interface 113 to resume the drive of the tape discharging motor 65, thereby rotating the drive roller 51. Accordingly, the feeding by the drive roller 51 is resumed, the RFID label T produced in a label shape in step S55 mentioned above is fed toward the label discharge port 11 and discharged to the outside of the tag-label producing device 1 from the label discharge port 11, and this flow is ended.

It should be noted that the cutting processing in step S55 and the label discharge processing in step S60 mentioned above may be performed in synchronization with each other as described below, for example.

For example, first, at the time of the cutting operation by the cutting mechanism 15, the cutter motor 43 is driven via the input/output interface 113 and the cutter-motor drive circuit 122, the cutter helical gear 42 is rotated counterclockwise (the arrow 70 direction in FIG. 3), and the roller supporting holder 57 is pivoted counterclockwise (the arrow 71 direction in FIG. 3) about the holder supporting portion 59 via the boss 50 and the cam 60. Then, immediately before the cutting of the tag label tape 109 with print with the stationary blade 40 and the movable blade 41 is started, the tag label tape 109 with print is pressed against the drive roller 51 by the pressure roller 52, and the tag label tape 109 with print is retained until the tape is cut.

Thereafter, whether or not the cutting of the tag label tape 109 with print has been completed is determined by the control circuit 110 on the basis of the detection signal of the tape cut sensor 124. If the detection signal of the micro switch 126 is switched from OFF to ON, and it is determined that the cutting has been completed, the rotation of the cutter motor 43 is temporarily stopped via the input/output interface 113 and the cutter-motor drive circuit 122. On the other hand, if the cutting has not been completed, the drive of the cutter motor 43 is continued until the micro switch 126 is switched from OFF to ON.

Once the cutting is completed and the cutter motor 43 stops, the tape discharging motor 65 is rotated via the input/output interface 113 and the tape-discharging-motor drive circuit 123, and the drive roller 51 is rotated via the gear train 66, thereby discharging the tape (RFID label T) that has been retained. Then, the determination as to whether or not the RFID label T has been discharged is made in the control circuit 110 on the basis of whether or not a predetermined period of time (for example, 0.5 to 1.0 sec) has elapsed after starting the discharge of the tape. If it is determined that the RFID label T has been discharged, the rotation of the tape discharging motor 65 is stopped via the input/output interface 113 and the tape-discharging-motor drive circuit 123, and if the RFID label T has not been discharged, the rotation is continued until the discharge is completed.

After the rotation of the tape discharging motor 65 is stopped, the cutter motor 43 is rotated again via the input/output interface 113 and the cutter-motor drive circuit 122. Accordingly, also the cutter helical gear 42 rotates again, thus pivoting and returning the movable blade 41 to the release position again (see FIG. 12). At the same time, the roller supporting holder 57 is pivoted by means of the urging spring 61 in the direction away from the pressure roller 52 (the direction opposite to the arrow 71 direction in FIG. 3), and retained by the stopper 72 while leaving a certain spacing. Thereafter, on the basis of the detection signal from the cut release sensor 125, the detection as to whether or not the above-mentioned cut release operation has been completed is made by the control circuit 110. If the micro switch 126 has not been switched from ON to OFF, and the cut release operation has not been completed, the rotation of the cutter motor 43 is continued until the completion of the cut release operation. Further, if the micro switch 126 has been switched from ON to OFF and the cut release operation has been completed, the rotation of the cutter motor 43 is stopped, thus finishing the full-cut processing and label discharge processing mentioned above.

Figure 31:
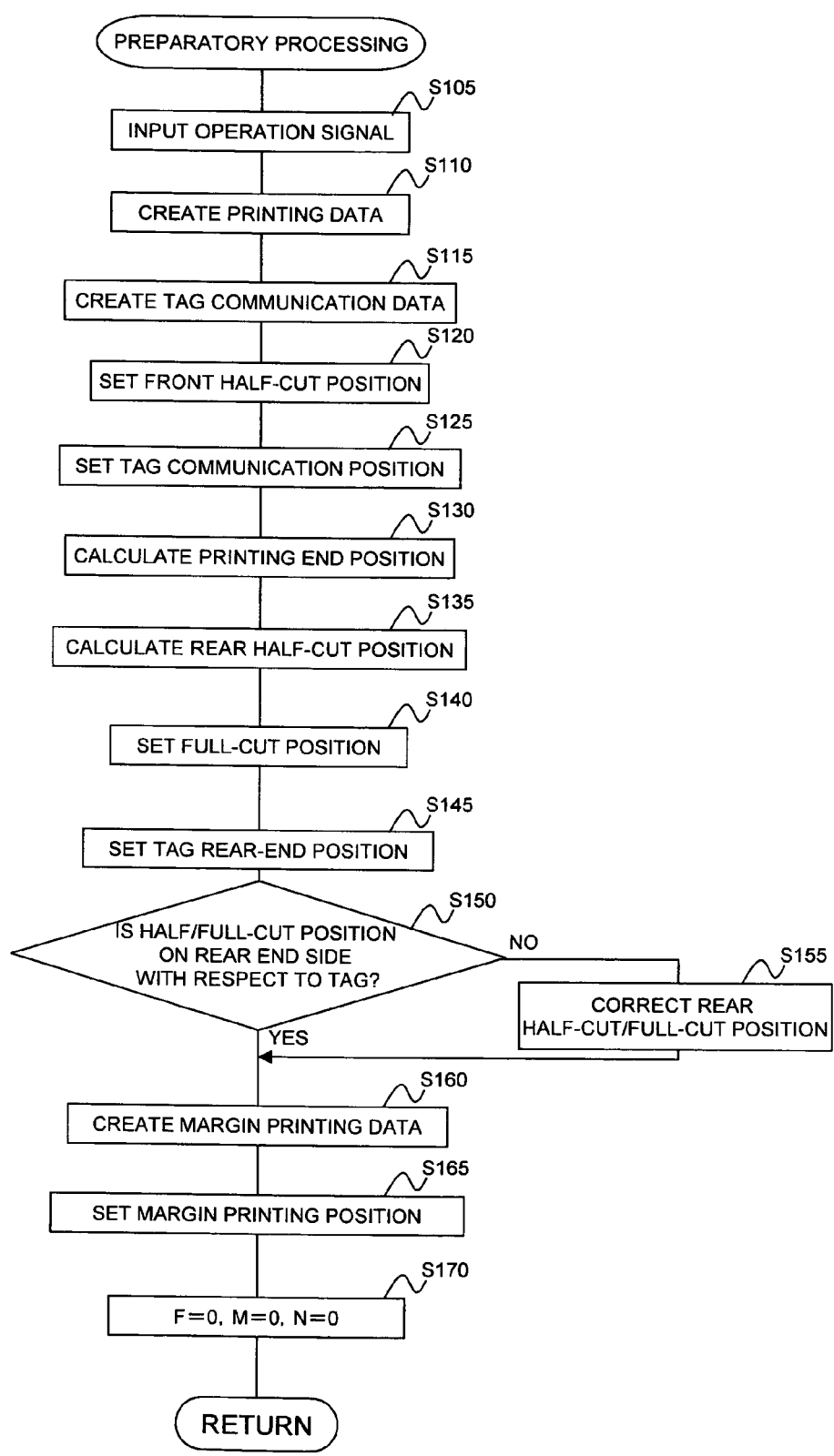
FIG. 31 is a flowchart showing the detailed procedure of step S100.

FIG. 31 is a flowchart showing the detailed procedure of step 100 descried above. In the flow shown in FIG. 31, first, in step S105, an operation signal for which input operation has been made from the PC 118 is input (identified) via the input/output interface 113. This operation signal contains print information including, for example, the letter, design, pattern, and the like of the label print R and finished print number R1 designated by the operator or the font (typeface, size, thickness, and the like) thereof, or the code data of characters such as letters and numerals. When performing writing of information with respect to the RFID circuit element To, the operation signal also contains this writing information (RFID information including at least tag ID as identification information). Further, the operation signal also contains information on the kind of the cartridge 7 loaded on the cartridge holder 6 (in other words, tag attribute information such as the arrangement interval of the RFID circuit elements in the base tape 101, the tape width of the base tape 101, and the like).

It should be noted that as for this cartridge information, a portion to be detected (for example, an identifier with an uneven configuration or the like), which is separately provided to the cartridge 7, may be detected by suitable detection device (those performing mechanical detection such as a mechanical switch, a sensor performing optical detection, a sensor performing magnetic detection, or the like), with the kind of the cartridge 7 being automatically detected and retrieved on the basis of the resulting detection signal.

Thereafter, the process transfers to step S110, and print data corresponding to the above-mentioned printing information is created on the basis of the operation signal input in step S105 mentioned above.

Then, in step S115, on the basis of the operation signal input in step S105 mentioned above, communication data corresponding to the above-mentioned writing information is created. It should be noted that as described above, although this procedure is executed in the case where the RFID label T is produced by performing writing of information to the RFID circuit element To, in the case where the FID label T is produced by performing reading of information previously stored in the RFID circuit element To, this procedure may be omitted.

Thereafter, the process transfers to step S120, and the position of the front half-cut line HC1 described above is set. In this setting, on the basis of the operation signal input in step S105 mentioned above, the position of the front half-cut line HC1 on the tape corresponding to the above-mentioned cartridge information is set. That is, as described above, the arrangement interval (in other words, the distance between the cutting line CL and the cutting line CL, or the length of one RFID label T) of the RFID circuit elements in the base tape 101 is uniquely determined by the kind of the cartridge 7. Further, the position of the front half-cut line HC1 is (unlike the rear half-cut line HC2) previously determined (for example, stored in a suitable location of the control circuit 110 in the form of a table) by the length of this RFID label T to be a certain position from the leading end of the tag label tape 109 with print, irrespective of the content of the label print R. In this procedure, under the assumption as mentioned above, the position of the front half-cut line HC1 mentioned above is (fixedly) set to a position that is previously defined for each cartridge 7.

Then, in step S125, the communication position on the tape with the RFID circuit element To described above is set. As in step S120 mentioned above, in this setting as well, on the basis of the operation signal input in step S105 mentioned above, the arrangement position of the RFID circuit element To in the tag label tape 109 with print is (fixedly) set to a position previously defined for each cartridge 7 under the assumption that the kind (size) and arrangement position of the RFID circuit element To are previously determined by the kind of the cartridge 7 to be a certain position from the leading end of the tag label tape 109 with print.

Thereafter, the process transfers to step S130, and on the basis of the print data prepared in step S110 mentioned above, the position on the tape where the printing of the label print R ends is calculated. That is, this position varies in accordance with the content of the label print R such that when the print length is long, the printing end position becomes (relatively) closer to the rear end portion of the label, and when the print length is short, the printing end position becomes (relatively) closer to the front end portion of the label.

Then, in step S135, the position of the rear half-cut line HC2 described above is set. In this setting, on the basis of the operation signal input in step S105 mentioned above and the printing end position calculated in step S130 mentioned above, the position of the rear half-cut line HC 2 on the tape corresponding to the above-mentioned cartridge information is set. That is, on the basis of the operation signal input in step S105 mentioned above, under the assumption that the distance from the printing end position to the rear half-cut line HC2 is previously determined to a certain distance by the kind of the cartridge 7, the position of the rear half-cut line HC2 on the tape is calculated by adding (intervening) the determined distance with respect to the printing end position calculated in step S130 mentioned above.

Thereafter, the process transfers to step S140, and the position (full-cut position) of the cutting line CL of the tag label tape 109 with print is set. As in step S120 mentioned above, in this setting as well, on the basis of the operation signal input in step S105 mentioned above and under the assumption that the size of the label is previously determined to be a certain size by the kind of the cartridge 7, the cutting position of the tag label tape 109 with print is (fixedly) set to a position that is previously defined for each cartridge 7.

Then, in step S145, the rear end position of the RFID circuit element To on the tape mentioned above is set. In this setting as well, in the same manner as described above, on the basis of the operation signal input in step S105 mentioned above and under the assumption that the kind (size) and the arrangement position of an RFID circuit element To is previously determined by the kind of the cartridge 7, the rear end position of the RFID circuit element To in the tag label tape 109 with print is (fixedly) set to a position that is previously defined for each cartridge 7.

Then, the process transfers to step S150, and it is determined whether or not the position of the rear half-cut line HC2 set in step S135 or the position of the cutting line CL set in step S140 is located on the label rear end side with respect to the rear end position of the RFID circuit element To set in step S145. If the position of the rear half-cut line HC2 or the position of the cutting line CL is set on the label rear end side, the determination is satisfied, and the process transfers to step S160.

If the position of the rear half-cut line HC2 or the position of the cutting line CL is set on the label front end side with respect to the rear end position of the RFID circuit element To, the determination is not satisfied, and the process transfers to step S155. Since there is a possibility that a part of the RFID circuit element To may be cut if this state is left as it is, in order to avoid this, in step S155, positional correction (resetting) is performed so that the position of the rear half-cut line HC2 and the position of the cutting line CL are both on the label rear end side with respect to the rear end position of the RFID circuit element To, and the process transfers to step S160.

Thereafter, the process transfers to step S160 where, on the basis of the operation signal input in step S105 mentioned above, margin printing data (remaining-number information data) corresponding to the above-mentioned printing information is created. As for the counting of the remaining number, as described above, upon loading the cartridge 7 onto the cartridge holder 6 by the operator, for example, how-manieth RFID label the first RFID label T is out of the remaining number of RFID labels that can be produced with all the RFID circuit elements To in the cartridge 7 (or how-manieth the first RFID label T is out of the total RFID labels so far produced) may be input through operation (Thereafter, for each label production, the total number of RFID labels T may be added up by a counter that is separately provided inside the tag-label producing device 1). Alternatively, like the above-described cartridge information, for each label production, the count may be done and stored on a server or the like associated with a portion to the detected which is separately provided to the cartridge 7, the remaining number (usage number) being automatically acquired by performing a search on the server upon the loading of the cartridge 7. Further, the remaining number may also be acquired by performing transmission/reception of information with each RFID circuit element To.

Thereafter, the process transfers to step S165 where the printing position of the margin printing data (remaining-number information) created in step S160 mentioned above is set. This setting is also performed in the same manner as described above. That is, on the basis of the operation signal input in step S105 mentioned above and under the assumption that the size of the label is previously determined to be a certain size by the kind of the cartridge 7, the position of the front margin area S1 where the margin printing is executed is (fixedly) set to a position that is previously defined for each cartridge 7, with the position (full-cut position) of the cutting line CL of the tag label tape 109 with print taken as a reference, for example.

Thereafter, in step S170, when performing communication with an RFID circuit element To from the loop antenna LC that will be described later, variables M, N for counting the number of times communication retry is performed (the number of times of access try) if there is no response from the RFID circuit element To, and a flag F indicating whether or not communication has succeeded are initialized to 0, and this routine is ended.

Figure 32:
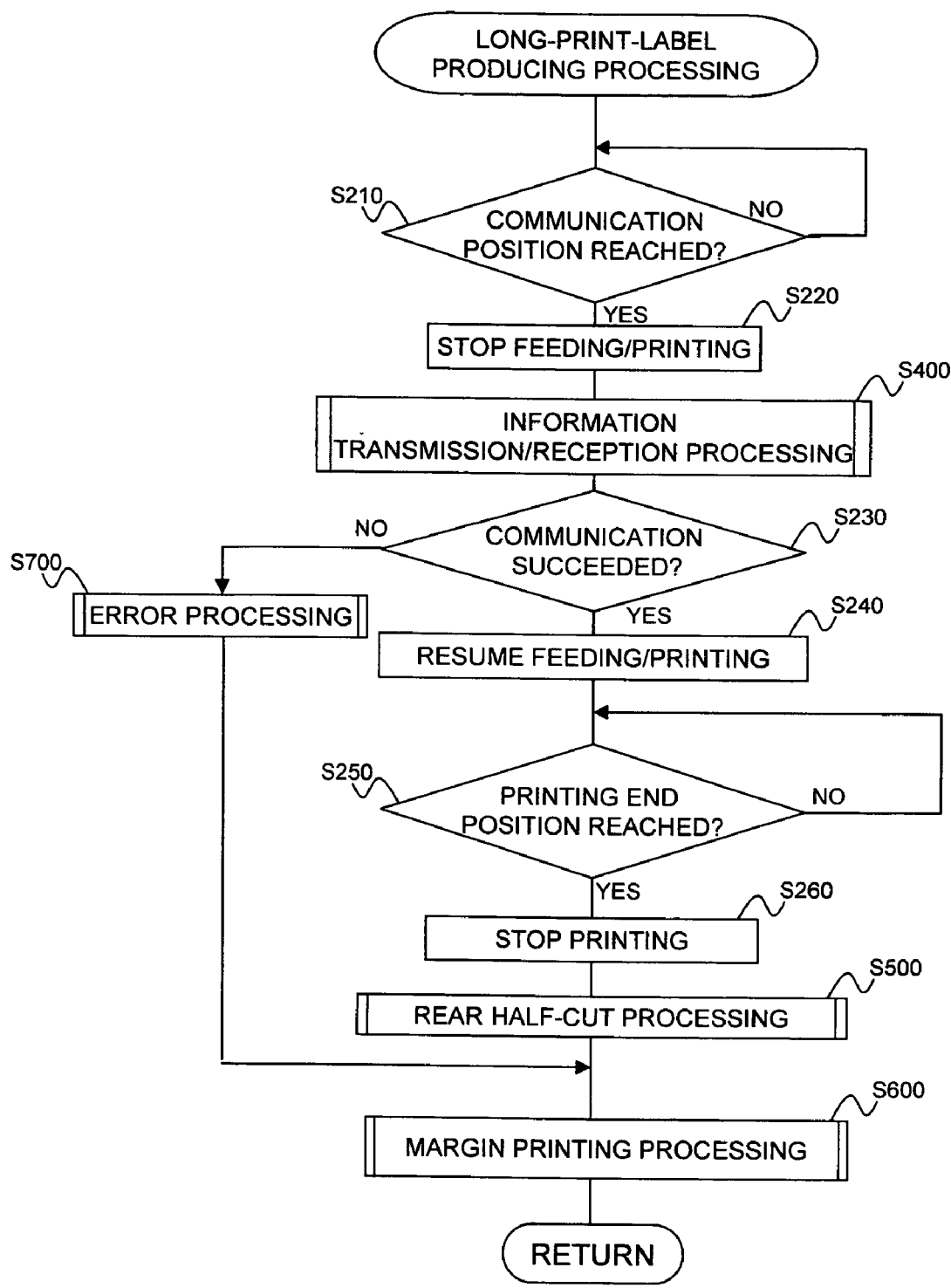
FIG. 32 is a flowchart showing the detailed procedure of step S200.

FIG. 32 is a flowchart showing the detailed procedure of step S200 described above. In the flow shown in FIG. 32, first, in step S210, it is determined whether or not the tag label tape

109 with print has been fed to the communication position with the loop antenna LC described above (in other words, whether or not the tag label tape 109 with print has substantially reached the position as set in step S125 mentioned above where the loop antenna LC substantially directly faces the position of the RFID circuit element To). As in step S20 of FIG. 30 described above, the determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the communication position and this procedure is repeated, and upon the arrival at the communication position, the determination is satisfied and the process transfers to the next step S220.

In step S220, as in step S25 mentioned above, the rotations of the tape feed roller 27, ribbon take-up roller 106, and drive roller 51 are stopped, and feeding of the tag label tape 109 with print is stopped in the state with the loop antenna LC substantially directly facing the RFID circuit element To. Further, the energization of the print head 23 is stopped to thereby stop (interrupt) the printing of the above-mentioned label print R (see FIG. 21F).

Figure 34:
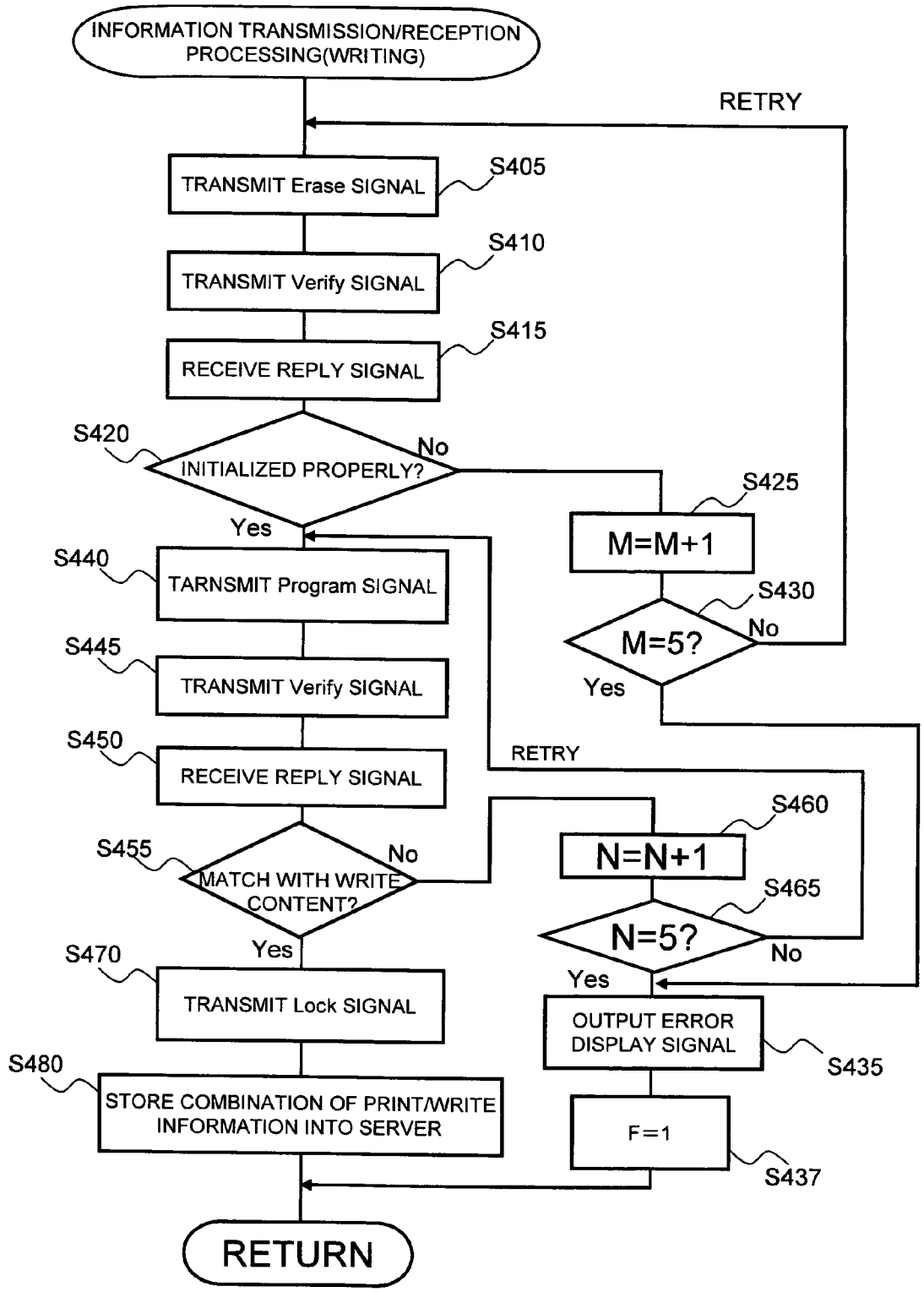
FIG. 34 is a flowchart showing the detailed procedure of step S400.

Thereafter, the process transfers to step S400, and transmission/reception of information is performed via wireless communication between the antenna LC and the RFID circuit element To, thereby performing information transmission/reception processing of writing the information created in step S115 of FIG. 31 mentioned above to the IC circuit part 151 of the RFID circuit element To (or reading information previously stored in the IC circuit part) (for details, see FIG. 34 that will be described later).

Thereafter, the process transfers to step S230 where it is determined whether or not transmission/reception of information has succeeded in step S400 mentioned above. Specifically, since the above-mentioned flag F should be F=1 if the communication has failed in step S400 (see step S437 of FIG. 34 that will be described later), it is determined whether or not F=0.

If F=1, the determination is not satisfied, and it is regarded that the communication with respect to the RFID circuit element To has failed. The process thus transfers to step S700, and error processing (details of which will be described later) for notifying the operator of this communication failure on the label is carried out. The process then transfers to step S600.

On the other hand, of F=0, the determination is satisfied, and the communication with respect to the RFID circuit element To is regarded to have succeeded, so the process transfers to step S240.

In step S240, in the same manner as in step S35 of FIG. 30, the tape feed roller 27, the ribbon take-up roller 106, and the drive roller 51 are rotationally driven to resume the feeding of the tag label tape 109 with print, and the print head 23 is energized to resume the printing of the label print R.

At this time, if the print head 23 has been stopped for a somewhat long time after step S220 due to such reasons as the large number of times of communication trial (number of times of retry) in step S400 mentioned above, there is a possibility that the temperature of the print head 23 may have dropped. Accordingly, in order to cope with this, the amount of energization (the amount of energy applied per unit time) of the print head 23 may be increased than usual at the time of resuming the printing in step S240 mentioned above.

Thereafter, the process transfers to step S250, and it is determined whether or not the tag label tape 109 with print has been fed to the above-described printing end position (calculated in step S130 of FIG. 31 mentioned above). The determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the printing end position and this procedure is repeated, and upon the arrival at the printing end position, the determination is satisfied and the process transfers to the next step S260.

In step S260, as in step S25 of FIG. 30 mentioned above, the energization of the print head 23 is stopped to stop the printing of the above-mentioned label print R. This completes the printing of the label print R with respect to the print area S (see FIG. 21H).

Thereafter, the process transfers to step S500, and rear half-cut processing, in which the formation of the rear half-cut line HC2 is performed using the half-cutter 34 of the half-cut unit 35 after the tag label tape 109 with print is fed to a predetermined rear half-cut position, is carried out (for details, see FIG. 35 that will be described later).

Once step S500 as described above or step S700 mentioned above is finished, the process transfers to step S600. In step S600, margin printing processing, in which printing of the finished print number R1 described above is performed with respect to the front margin area S1 (of the next RFID label T) located on the tape rear end side with respect to the above-mentioned cutting line CL, is executed (for details, see FIG. 36 that will be described later), and this routine is ended.

Figure 33:
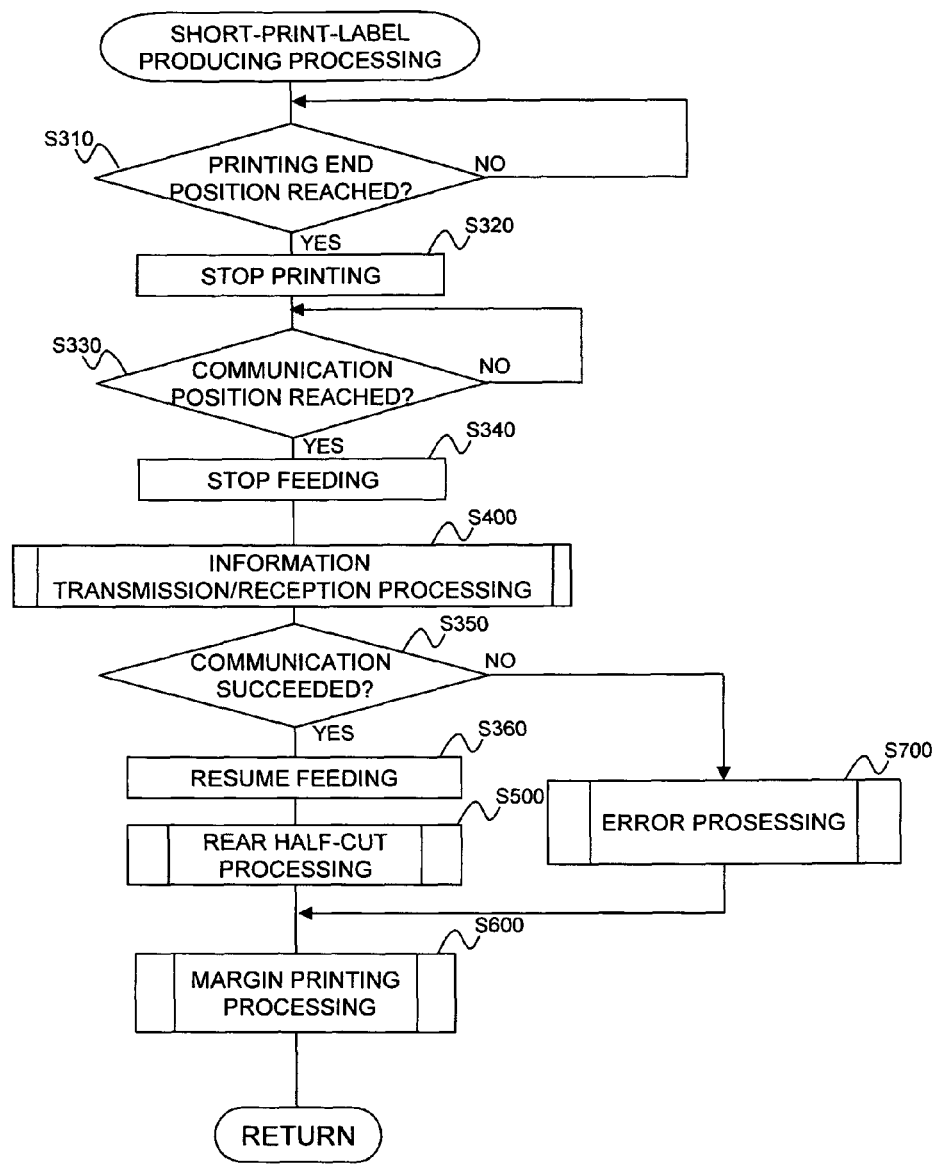
FIG. 33 is a flowchart showing the detailed procedure of step S300.

FIG. 33 is a flowchart showing the detailed procedure of step S300 described above. In the flowchart shown in FIG. 33, first, in step 310, in the same manner as in step S250 of FIG. 32, it is determined whether or not the tag label tape 109 with print has been fed to the above-described printing end position (calculated in step S130 of FIG. 31 mentioned above). The determination at this time as well may be performed in the same manner as in step S250. The determination is not satisfied until the arrival at the printing end position and this procedure is repeated, and upon the arrival at the printing end position, the determination is satisfied and the process transfers to the next step S320.

In step S320, in the same manner as in step S260 of FIG. 32 mentioned above, the energization of the print head 23 is stopped to thereby stop the printing of the above-mentioned label print R. This completes the printing of the label print R with respect to the print area S (see FIG. 24F).

Thereafter, the process transfers to step S330, and in the same manner as in step S210 of FIG. 32 mentioned above, it is determined whether or not the tag label tape 109 with print has been fed to the communication position with the loop antenna LC described above. The determination at this time as well may be performed in the same manner as in step S210. The determination is not satisfied until the arrival at the communication position and this procedure is repeated, and upon the arrival at the communication position, the determination is satisfied and the process transfers to the next step S340.

In step S340, in the same manner as in step S220 mentioned above, the rotations of the tape feed roller 27, ribbon take-up roller 106, and drive roller 51 are stopped, and feeding of the tag label tape 109 with print is stopped in the state with the loop antenna LC substantially directly facing the RFID circuit element To (see FIG. 24G).

The step S400 after step S340 is the same as that of FIG. 32, and information transmission/reception processing of performing transmission/reception of information via wireless communication between the antenna LC and the RFID circuit element To is carried out (for details, see FIG. 34 that will be described later).

Thereafter, the process transfers to step 350, and as in step S230 of FIG. 32, whether or not the transmission/reception of information in step S400 has succeeded is determined on the basis of whether or not F=0.

The determination is not satisfied if F=1, and as in FIG. 32, the process transfers to step S700 where error processing (details of which will be described later) is performed. The process then transfers to step S600. If F=0, the determination is satisfied, and the communication with respect to the RFID circuit element To is regarded to have succeeded, so the process transfers to step S360.

In step S360, as in step S240 of FIG. 32, the tape feed roller 27, the ribbon take-up roller 106, and the drive roller 51 are rotationally driven to resume the feeding of the tag label tape 109 with print (see FIG. 24H).

Since the steps S500 and S600 after step S360 are the same as those of FIG. 32, the description thereof is omitted.

FIG. 34 is a flowchart showing the detailed procedure of step S400 described above with reference to FIGS. 32 and 33. It should be noted that in this example, of the information writing and information reading described above, the description is directed to the case of information writing.

First, in step S405 of the flow shown in FIG. 34, a control signal is output to the above-described transmitting circuit 306 (see FIG. 15 or the like) via the input/output interface 113, and as an "Erase" signal for initializing information stored in the memory part 157 of the RFID circuit element To, a carrier wave on which predetermined modulation has been performed is transmitted via the loop antenna LC to the RFID circuit element To which information is to be written. The memory part 157 of the RFID circuit element To is thus initialized.

Next, in step S410, a control signal is transmitted to the transmitting circuit 306 via the input/output interface 113, and as a "Verify" signal for verifying the contents of the memory part 157, a carrier wave on which predetermined modulation has been performed is transmitted via the loop antenna LC to the RFID circuit element To which information is to be written, thus urging a reply.

Thereafter, in step S415, a reply signal transmitted from the RFID circuit element To, to which writing is to be performed, in response to the above-mentioned "Verify" signal is received via the loop antenna LC, and taken in via the receiving circuit 307 (see FIG. 15 or the like) and the input/output interface 113.

Next, in steps S420, on the basis of the reply signal received as mentioned above, information in the memory part 157 of that RFID circuit element To is checked to determine whether or not the memory part 157 has been properly initialized.

If the determination is not satisfied, the process transfers to step S425 where 1 is added to M, and further in step S430, it is determined whether or not M=5. If M≦4, the determination is not satisfied, and the process returns to step S405 to repeat the same procedure. If M=5, the process transfers to step S435. In step S435, an error display signal is output to the above-mentioned PC 118 via the input/output interface 113 and the communication line NW, and a corresponding writing failure (error) display is made. Further, in step S437, the above-described flag F is set as F=1, and this routine is ended. In this way, even when the initialization is unsuccessful, retry is performed up to 5 times.

If the determination in step S420 is satisfied, the process transfers to step S440 where a control signal is output to the transmitting circuit 306, and as a "Program" signal for writing desired data to the memory part 157, a carrier wave on which predetermined modulation has been performed is transmitted to the RFID circuit element To which information is to be written, thus performing writing of information.

Thereafter, in step S445, a control signal is output to the transmitting circuit 306, and as the "Verify" signal, a carrier wave on which predetermined modulation has been performed is transmitted via the loop antenna LC to the RFID circuit element To which information is to be written, thus urging a reply. Thereafter, in step S450, a reply signal transmitted from the RFID circuit element To, to which writing is to be performed, in response to the received "Verify" signal mentioned above is received via the loop antenna LC, and taken in via the receiving circuit 307 and the input/output interface 113.

Next, in step S455, on the basis of the received reply signal mentioned above, information stored in the memory part 157 of that RFID circuit element To is checked, and it is determined using a known error detecting code (CRC code: Cyclic Redundancy Check or the like) whether or not the predetermined information transmitted as described above has been properly stored into the memory part 157.

If the determination is not satisfied, the process transfers to step S460 where 1 is added to N, and further in step S465, it is determined whether or not N=5. If N≦4, the determination is not satisfied, and the process returns to step S440 to repeat the same procedure. If N=5, the process transfers to step S435, and in the same manner as described above, a writing failure (error) display corresponding to the PC 118 is made. In step S437, the above-described flag F is set as F=1, and this routine is ended. In this way, even when the writing of information is unsuccessful, retry is performed up to 5 times.

If the determination in step S455 is satisfied, the process transfers to step S470. In step S470, a control signal is output to the transmitting circuit 306, and a carrier wave on which predetermined modulation has been performed is transmitted as a "Lock" command via the loop antenna LC to the RFID circuit element To which information is to be written, thereby prohibiting additional writing of information to that RFID circuit element To. This completes the writing of RFID tag information to the RFID circuit element To which writing is to be performed.

Thereafter, the process transfers to step S480, and a combination of the information written to the RFID circuit element To in step S440 mentioned above, and the print information of the label print R that has already been printed in the print area S by the print head 23 in correspondence with the above-mentioned information, is output via the input/output interface 113 and the communication network NW and stored into the information server IS or the route server RS. It should be noted that this storage data is stored and retained in the database of each of the serves IS and RS, for example, so that it can be referenced by the PC 118 as required. In this way, this routine is ended.

Figure 35:
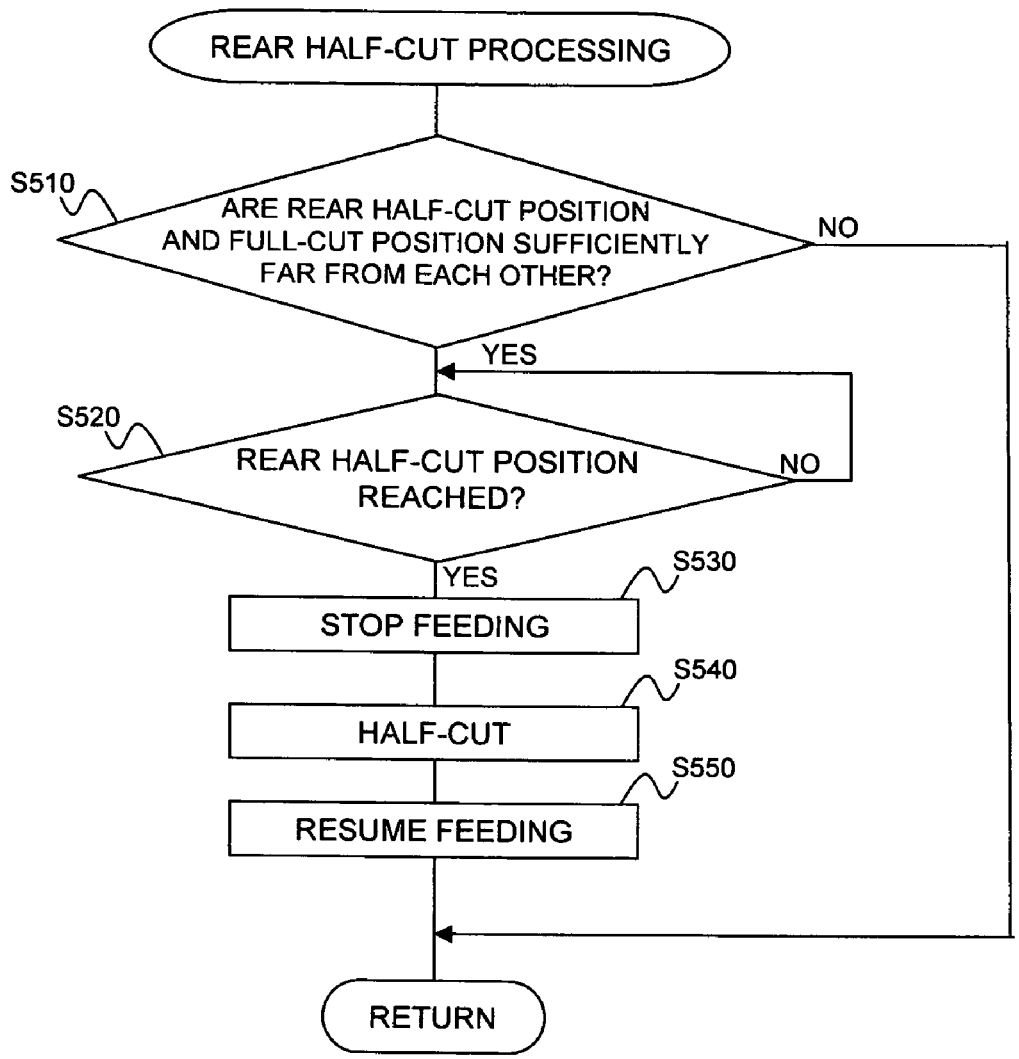
FIG. 35 is a flowchart showing the detailed procedure of step S500.

FIG. 35 is a flowchart showing the detailed procedure of step S500 described above with reference to FIGS. 32 and 33.

First, in step S510 of the flow shown in FIG. 35, it is determined whether or not there is a preset predetermined distance or more between the position of the rear half-cut line HC2 set in step S135 mentioned above, and the position of the cutting line CL set in step S140 mentioned above. This determination is not satisfied if the position of the rear half-cut line HC2 and the position of the cutting line CL are too close to each other, and it is regarded inappropriate to provide the rear half-cut line HC2 separately from the cutting line CL, so this routine is ended. On the other hand, this determination is satisfied if the position of the rear half-cut line HC2 and the position of the cutting line CL are sufficiently far from each other, and the process transfer to step S520. It should be noted that step S510 mentioned above is a procedure aimed at, for example, preventing the label from peeling at the time of full-cutting by the cutting mechanism 15 because the positions of the cutting line CL and rear half-cut line HC2 are too close to each other, or for preventing the peeled tape from sticking to the movable blade 41 of the cutting mechanism 15 or the like to cause a glitch in the operation of the device.

In step S520, in the same manner as in step S20, it is determined whether or not the tag label tape 109 with print has been fed to the above-described rear half-cut position (in other words, whether or not the tag label tape 109 with print has reached the position where the half-cutter 34 of the half-cut mechanism 35 directly faces the rear half-cut line HC2 calculated in step S135). In the same manner as described above, the determination at this time as well may be performed by, for example, detecting by a predetermined known method the distance by which the tag label tape 109 with print has been fed after the detection of the identifier PM of the base tape 101 in step S10 mentioned above (such as by counting the number of pulses output by the feed-motor drive circuit 121 for driving the feed motor 119 that is a pulse motor). The determination is not satisfied until the arrival at the rear half-cut position and this procedure is repeated, and upon the arrival at the rear half-cut position, the determination is satisfied and the process transfers to the next step S530.

In step S530, in the same manner as in step S50 or the like described above, a control signal is output to the feed-motor drive circuit 121 and the tape-discharging-motor drive circuit 123 via the input/output interface 113, and the drives of the feed motor 119 and tape discharging motor 65 are stopped, thus stopping the rotations of the tape feed roller 27, ribbon take-up roller 106, and drive roller 51. Accordingly, in the state with the half-cutter 34 of the half-cut mechanism 35 directly facing the rear half-cut line HC2 calculated in step S135, the paying out of the base tape 101 from the first roll 102, the paying out of the cover film 103 from the second roll 104, and the feeding of the tag label tape 109 with print stop.

Thereafter, the process transfers to step S540, and in the same manner as in step S30 mentioned above, a control signal is output to the half-cutter motor drive circuit 128 to pivot the half-cutter 34, thereby performing rear half-cutting processing of cutting the cover film 103, adhesive layer 101a, base film 101b, and adhesive layer 101c of the tag label tape 109 with print to form the rear half-cut line HC2 (see FIG. 21I or 24I).

Then, the process transfers to step S550 where, in the same manner as in step S35 mentioned above, the tape feed roller 27, the ribbon take-up roller 106, and the drive roller 51 are rotationally driven to resume the feeding of the tag label tape 109 with print, and this routine is ended.

Figure 36:
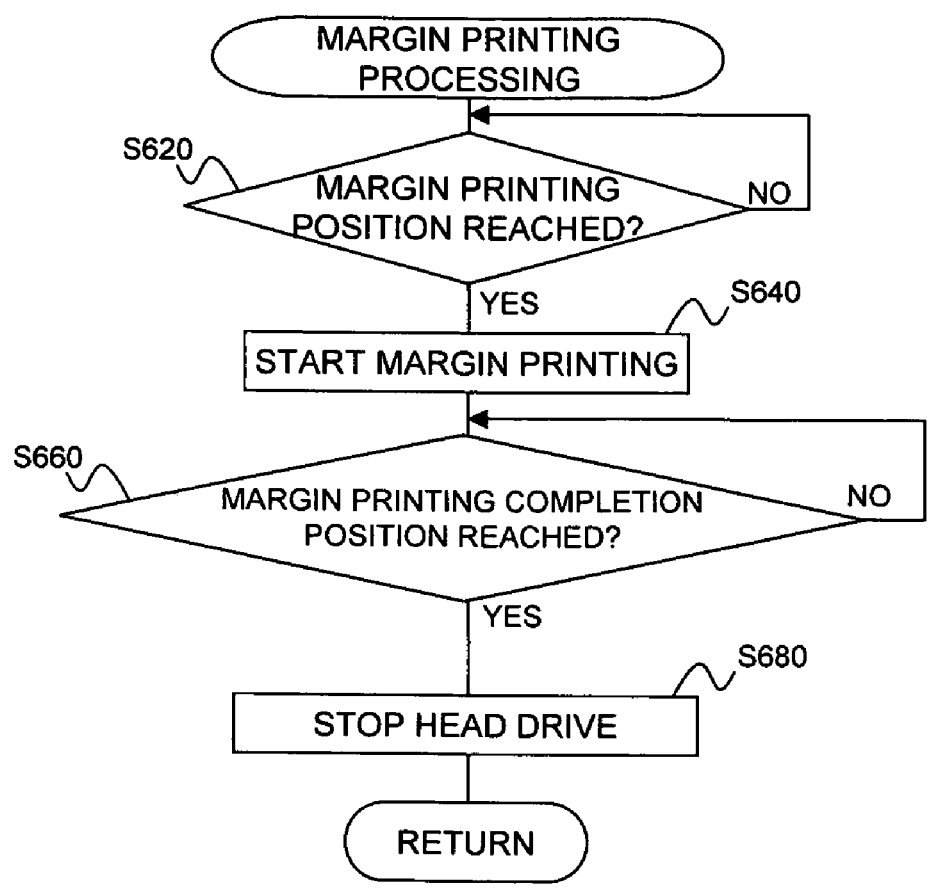
FIG. 36 is a flowchart showing the detailed procedure of step S600.

FIG. 36 is a flowchart showing the detailed procedure of step S600 described above with reference to FIG. 32 or 33. In the flow shown in FIG. 36, first, in step S620, it is determined whether or not the tag label tape 109 with print has been fed to the above-described margin printing start position (calculated in step S165 of FIG. 31 mentioned above). In the same manner as described above, the determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the margin printing start position and this procedure is repeated, and upon the arrival at the margin printing start position, the determination is satisfied and the process transfers to the next step S640.

In step S640, in the same manner as described above, the printing of the finished print number R1 is started by energizing the print head 23 (see FIG. 21J or 24J).

Thereafter, the process transfers to step S660, and it is determined whether or not the tag label tape 109 with print has been fed to the above-described margin printing end position (substantially set in steps S160 and S165 of FIG. 31 mentioned above). In the same manner as described above, the determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the margin printing end position and this procedure is repeated, and upon the arrival at the margin printing end position, the determination is satisfied and the process transfers to the next step S680.

In step S680, in the same manner as in step S260 described above, the energization of the print head 23 is stopped to stop the printing of the remaining-number information R. The printing of the remaining-number information R with respect to the front margin area S1 is thus completed, and this routine is ended.

Figure 37:
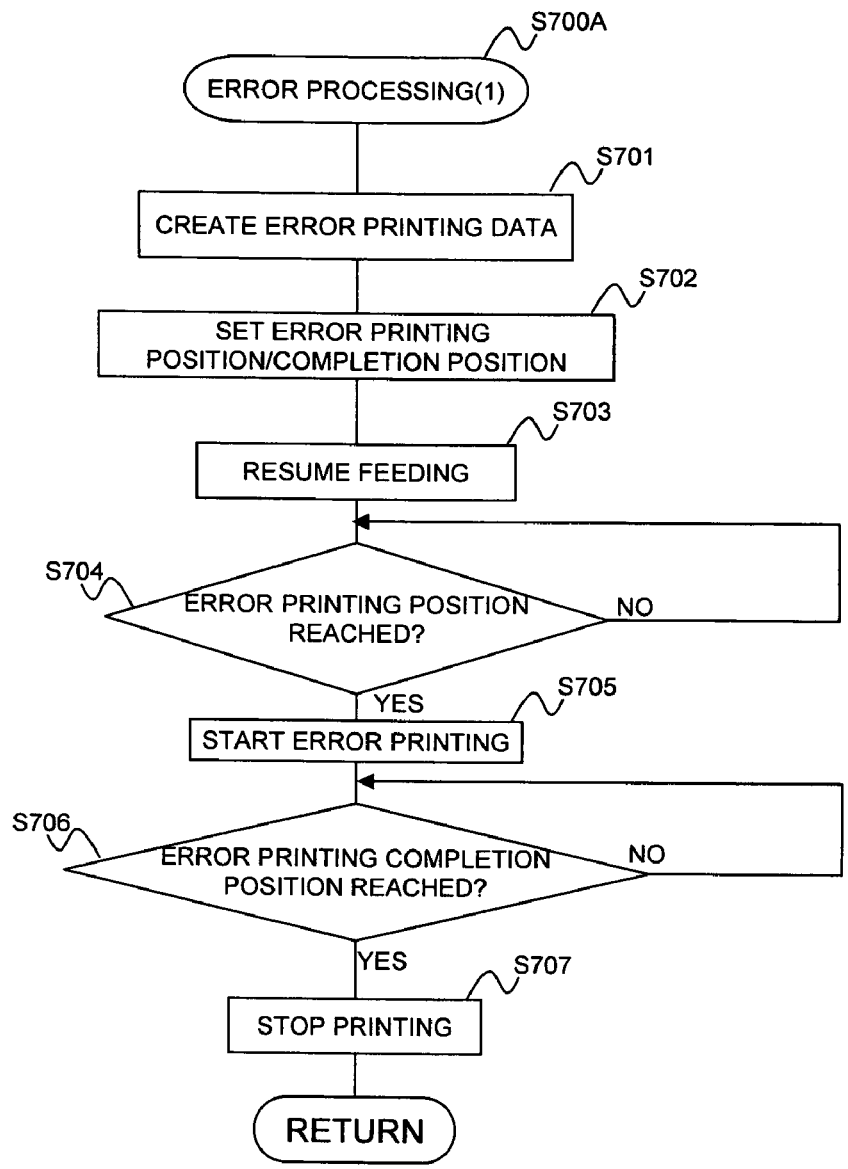
FIG. 37 is a flowchart showing step S700A as an example of the detailed procedure of step S700.

FIG. 37 is a flowchart showing step S700A as an example of the detailed procedure of step S700 shown in FIGS. 32 and 33. In this flow, at the time when a communication error occurs due to failed communication between the loop antenna LC and the RFID circuit element To, error processing (1) is executed in correspondence with this to perform printing of the above-mentioned other form of print R' indicative of the communication error.

First, in step S701 of the flow shown in FIG. 37, print data corresponding to the other form of print R' (the letter string "NG" in the example of FIG. 26 or FIG. 28 described above) printed at the time of the above-mentioned communication error is created. It should be noted that the content of the other form of print R' may be fixedly stored in advance in a suitable location of the control circuit 110, or may be designated or selected by the operator through the operation signal input in step S105. In step S701, on the basis of these, the creation of printing data is executed.

Thereafter, the process transfers to step S702, and the position on the tape where the printing of the other form of print R' corresponding to the above-mentioned communication error is performed is set. This setting is performed so that as for the printing start position, for example, in the state in which the tag label tape 109 with print has been fed by a predetermined distance (provided that this distance is 0, immediately after the above-mentioned state) from the communication position with the loop antenna LC (the feed position of the tag label tape 109 with print where the RFID circuit element To and the loop antenna LC substantially directly face each other) set in step S125 mentioned above, the printing is started (=printing is started from a tape position which the print head 23 substantially directly faces at the feed position that becomes the above-mentioned communication position). As for the printing completion position, in accordance with the content of the other from of print R' set in step S701 mentioned above, the setting is performed in correspondence with the print length thereof or the like.

Thereafter, the process transfers to step S703, and in the same manner as in step S240 of FIG. 32 or step S360 of FIG. 33, the tape feed roller 27, the ribbon take-up roller 106, and the drive roller 51 are rotationally driven to resume the feeding of the tag label tape 109 with print.

Thereafter, the process transfers to step S704, and it is determined whether or not the error printing start position set in step S702 has been reached. In the same manner as in step 210 of FIG. 32 or the like, the determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the error printing start position and this procedure is repeated, and upon the arrival at the error printing start position, the determination is satisfied and the process transfers to the next step S704. It should be noted that in the above-described example, if the error printing start position is set so that error printing is started immediately after the communication position, the determination of step S704 is satisfied immediately after resuming the feeding in step S703.

In step S705, in the same manner as in step S240 of FIG. 32, the print head 23 is energized to start the printing of the other form of print R' (see FIG. 26F or 28G).

Thereafter, the process transfers to step S706, and it is determined whether or not the error printing completion position set in step S702 has been reached. The determination at this time as well may be performed in the same manner as in step S250 of FIG. 32 or the like. The determination is not satisfied until the arrival at the error printing completion position and this procedure is repeated, and upon the arrival at the error printing completion position, the determination is satisfied and the process transfers to the next step S707.

In step S707, in the same manner as in step S260 of FIG. 32, the energization of the print head 23 is stopped to stop the printing of the above-mentioned other form of print R'. This completes the printing of the other form of print R' on the label rear-end side of the print area S (see FIG. 26G' or 28H').

Figure 38:
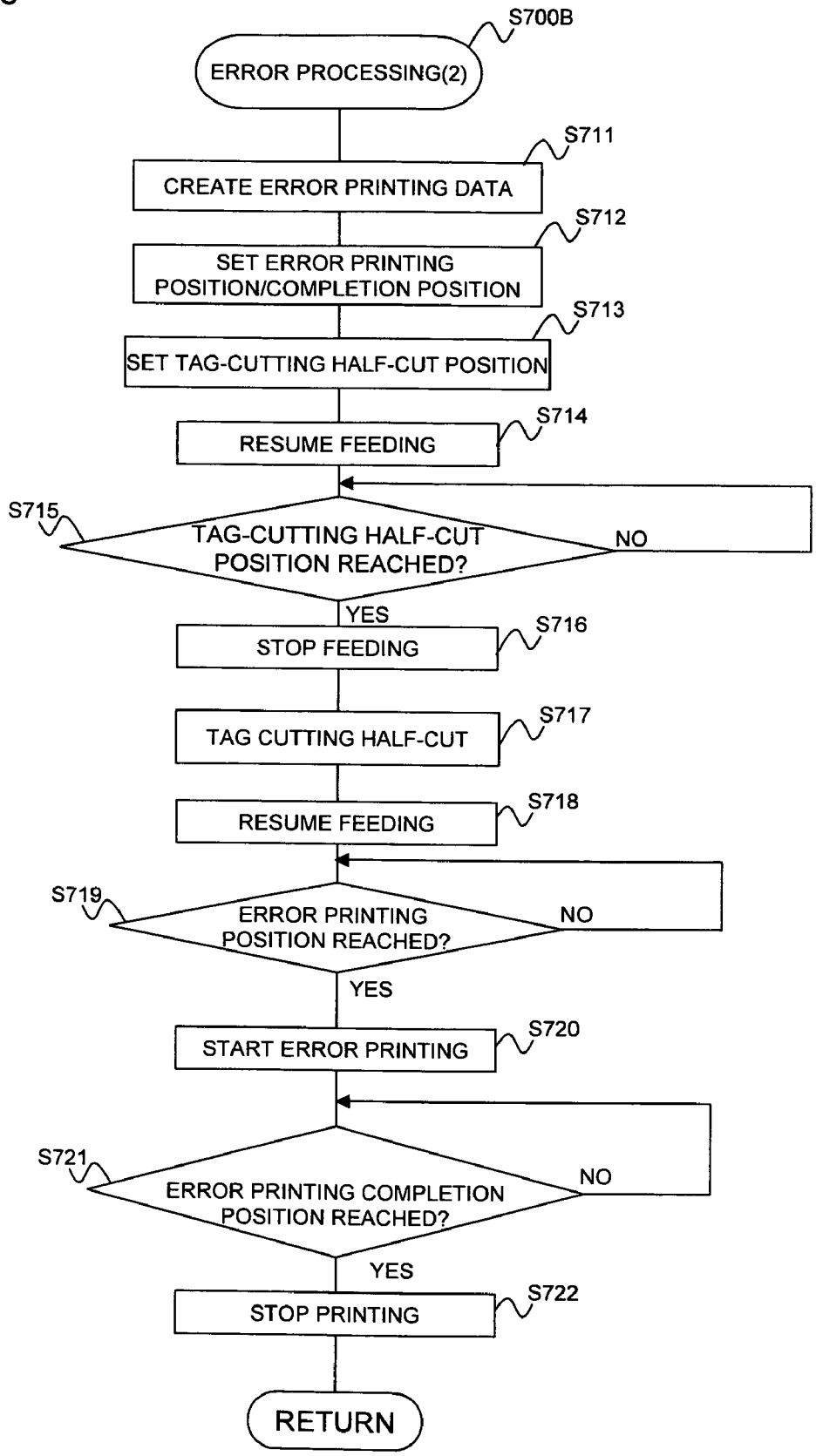
FIG. 38 is a flowchart showing step S700B as an example of the detailed procedure of step S700.

FIG. 38 is a flowchart showing step S700B as another example of the detailed procedure of step S700 shown in FIGS. 32 and 33. In this flow, at the time when a communication error occurs due to failed communication between the loop antenna LC and the RFID circuit element To, in response to this, printing of the above-mentioned other form of print R' indicative of this communication error is performed, and further, error processing (2) of cutting the RFID circuit element To with the half-cutter 34 of the half-cut unit 35 is executed.

Steps S711, S712 of the flow shown in FIG. 38 are the same as steps S701, S702 of FIG. 37 mentioned above, respectively. In steps S711, S712, printing data of the other form of print R' to be printed at the time of the communication error mentioned above is created, and the position on the tape where the other form of print RV is printed is set.

Thereafter, in step S713, the cutting position of the RFID circuit element To with the half-cutter 34 mentioned above is set. As for this position setting, for example, since the location of the RFID circuit element To from the front end to the rear end on the tape is known from steps S125 and S145 of FIG. 31 described above, the position setting is performed to determine which position within the above-mentioned location (for example, a position at a predetermined distance from the front end of the RFID circuit element To) is to be cut by the half-cutter 34. It should be noted that this position setting may be previously stored fixedly in a suitable location of the control circuit 110 (for example, always at the central portion of the RFID circuit element To with respect to the tape length direction or at the ¼ length position), or may be designated or selected by the operator through the operation signal input in step S105 described above.

Thereafter, the process transfers to step S714, and in the same manner as in step S703 of FIG. 37, the tape feed roller 27, the ribbon take-up roller 106, and the drive roller 51 are rotationally driven to resume the feeding of the tag label tape 109 with print.

Thereafter, substantially in the same manner as in steps S520, S530, S540, S550 described above with reference to FIG. 35, steps S715, S716, S717, S718 are executed. That is, in step S715, it is determined whether or not the tag label tape 109 with print has been fed to the tag-cutting half-cut position set in step S713 mentioned above. If the determination is satisfied, in step S716, the feeding of the tag label tape 109 with print is stopped (in this state, the half-cutter 34 directly faces some location of the RFID circuit element To), and in step S717, a control signal is output to the half-cutter motor drive circuit 128 to pivot the half-cutter 34, thereby cutting some location of the RFID circuit element To. In step S718, the feeding of the tag label tape 109 with print is resumed.

Since steps S720, 721, 722 after step S719 are the same as steps S704, S705, S706, S707 of FIG. 37 mentioned above, the description thereof is omitted.

Figure 39:
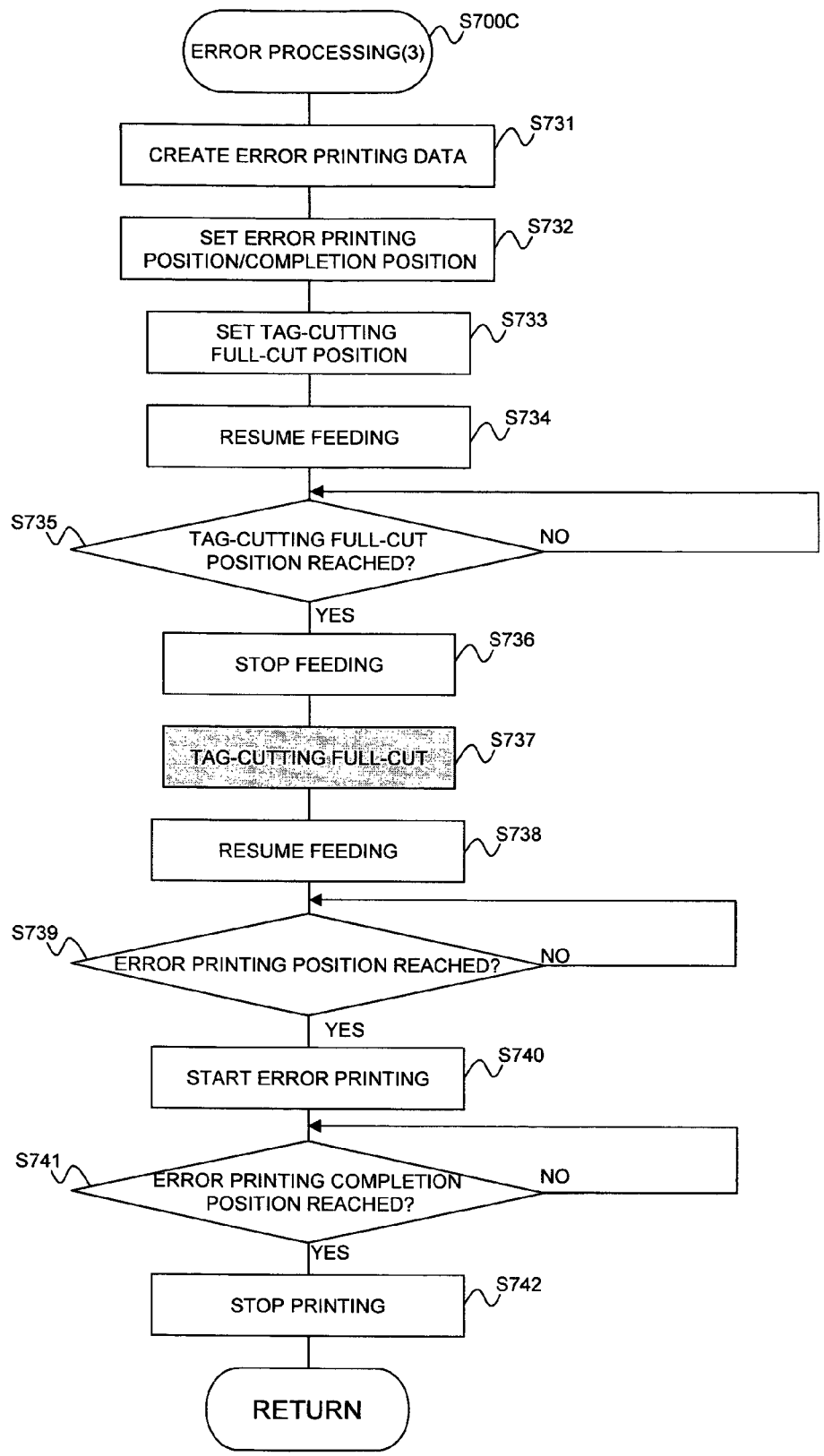
FIG. 39 is a flowchart showing step S700C as an example of the detailed procedure of step S700.

FIG. 39 is a flowchart showing step S700C as still another example of the detailed procedure of step S700 shown in FIGS. 32 and 33. In this flow, at the time when a communication error occurs due to failed communication between the loop antenna LC and the RFID circuit element To, in response to this, printing of the above-mentioned other form of print R' indicative of this communication error is performed, and further, error processing (3) of cutting the RFID circuit element To with the movable blade 41 of the cutting mechanism 15 is executed.

The respective procedures shown in the flow of FIG. 39 are identical to the respective procedures shown in FIG. 38 except only that the procedures relating to the half-cutter 34 are replaced by those relating to the movable blade 41. That is, in step S733 corresponding to step S713, the cutting position of the RFID circuit element To with the movable blade 41 is set. In step S735 corresponding to step S715, it is determined whether or not the full-cut position thus set has been reached, and if the full-cut position has been reached, in step S737 (corresponding to step S717), the movable blade 41 is driven by the cutter motor 43 to thereby perform cutting of the RFID circuit element To. The other procedures are the same as those of FIG. 38, so description thereof is omitted.

Figure 40:
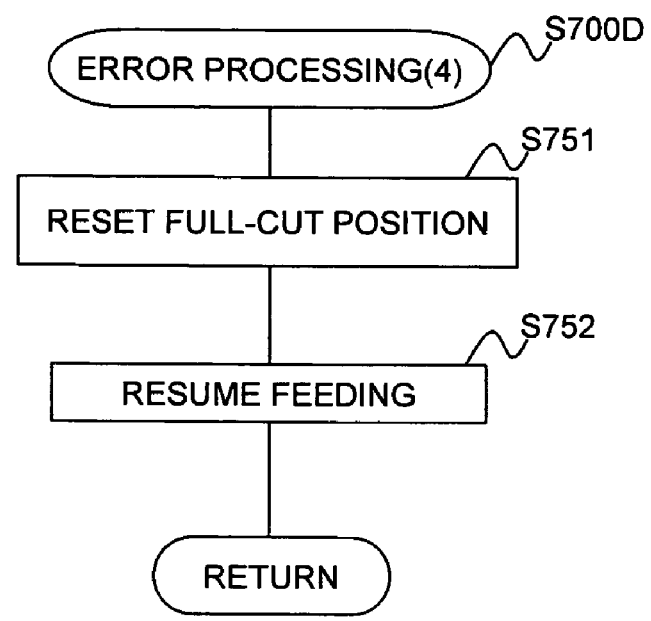
FIG. 40 is a flowchart showing step S700D as an example of the detailed procedure of step S700.

FIG. 40 is a flowchart showing step S700D as yet still another example of the detailed procedure of step S700 shown in FIGS. 32 and 33. In this flow, at the time when a communication error occurs due to failed communication between the loop antenna LC and the RFID circuit element To, the printing of the other form of print R' as described above is not performed but error processing (4) is executed instead, in which an RFID label T that is longer than usual is produced as an exceptional case to make the operator recognize the error.

In step S751 of the flow shown in FIG. 40, in order to produce an RFID label T that is longer than usual at the time of the communication error mentioned above, the full-cut position (the position of the cutting line CL on the tape where cutting is performed by the movable blade 41 of the cutting mechanism 15) once set in step S140 of FIG. 31 is reset. Specifically, for example, the position of the cutting line CL is largely offset to the tape rear-end side with respect to the position set in step S140 mentioned above.

Thereafter, in step S752, in the same manner as in step S703 or the like, the tape feed roller 27, the ribbon take-up roller 106, and the drive roller 51 are rotationally driven to resume the feeding of the tag label tape 109 with print, and this routine is ended.

In the label producing device 1 according to this embodiment configured as described above, the predetermined label print R is printed by the print head 23 with respect to the print area S of the cover film 103, and the tag label tape 109 with print of a laminate structure including three layers consisting of the cover film 103, the adhesive layer 101c, and the separation sheet 101d covering the adhesive layer 101c is fed, and this tag label tape 109 with print is cut by the cutting mechanism 15 into a predetermined length to thereby produce the RFID label T. At this time, by cutting the layers other than the separation sheet 101d by means of the half-cut unit 35, the front and rear half-cut lines HC1, HC2 are formed. Accordingly, when peeling off the separation sheet 101d from the other layers (the label main body 103, 101a to 101c) in order to affix the produced RFID label T onto a target affixing object, the separation sheet 101d is easily peeled off with the fingertips.

Further, at this time, the two half-cut lines HC1, HC2 are formed by means of the half-cut unit 35 on both end sides of the print area S with respect to the label length direction as mentioned above. Accordingly, while using the front half-cut line HC1 as the half-cut line for discarding a margin as a non-printing portion when using one end side (in this example, the front-end side) of the print area S with respect to the label length direction, when the print length of the label print R in the print area S is long, the rear half-cut line HC2 on the other end side (in this example, the rear-end side) with respect to the label length direction is positioned far from one end in the label length direction (close to the other end) (see FIG. 21 or 22) and, on the other hand, when the print length of the label print R is short, the rear half-cut line HC2 is positioned close to the one end in the label length direction (or far from the other end) (see FIG. 24 or 25). Accordingly, the length of the label main body 103, 101a to 101c between the two half-cut lines HC1, HC2 can be varied in conformity to the print length of the label print R mentioned above. As a result, the length of the RFID label T can be made constant at all times irrespective of the length of the label main body 103, 101a to 101c (in other words, irrespective of the print length of the label print R). That is, irrespective of whether the print length of the label print R in the label main body 103, 101a to 101c is long or the print length of the label print R in the label main body 103, 101a to 101c is short, the length of the produced RFID label T is the same. Therefore, unlike in the related art in which only one half-cutting part is provided, it is possible to ensure ease of handling of the RFID label T by the user while making the length of the label main body 103, 101a to 101c variable in accordance with the print length of the label print R.

In particular, in this embodiment, as described above with reference to FIG. 35 or 23, when the print length of the label print R in the print area S is particularly long, the formation of the rear half-cut line HC2 is omitted. Accordingly, the print area S can be made to extend as close as possible to the other end portion (rear end portion) in the label length direction (see FIG. 23), whereby the RFID label T can be reliably produced without causing an error even in the case of a long print.

In particular, in this embodiment, the front margin area S1 is provided on the label end side with respect to the front half-cut line HC1 which is not used when affixing the label by the user, and predetermined information (in this example, the finished print number R1) is printed in the front margin area S1. Accordingly, the portion of the label that is discarded without being used when affixing the label by the user is effectively used to inform the user of the remaining number of labels that can be produced or the number of already produced labels at the time of label production, thereby making it possible to achieve enhanced convenience for the user.

In particular, in this embodiment, the detection identifier PM is provided on the label end side with respect to the front half-cut line HC1 which is not used when affixing the label by the user, and this is detected by the mark sensor 127, thereby making is possible to enhance the accuracy of feeding or positioning at the time of label production. As a result, it is possible to achieve enhanced reliability or production efficiency of the label, or the like.

It should be noted that the present disclosure is not limited to the above-described embodiment but can be modified in various ways without departing from the scope and technical idea thereof. Such modifications will be sequentially described below.

(1) When the Print Head and the Sensor are Arranged Close to Each Other

In the above-mentioned embodiment, in the tag label tape 109 with print produced by bonding the base tape 101 and the cover film 103 together, the distance L from the leading end position in the tape feeding direction of the identifier PM provided in the cover film 103 to the leading end of the RFID circuit element To, which is provided in the base tape 101 so as to be offset (in terms of the positional relation after the bonding) with respect to the above-mentioned position of the identifier PM, is set in advance so as to be equal to the distance Lo in the tape feed direction between the mark sensor 127 and the print head 23. However, this should not be construed restrictively, and the print head 23 may be arranged closer to the mark sensor 127 side so that Lo<L.

By arranging the print head 23 closer to the mark sensor 127, the distance between the half-cut unit 34 and the print head 23 can be made shorter. As a result, at the time of label production, the distance between the front half-cut line HC1 formed by the half-cut unit 34 and the printing start position (see FIG. 21C or the like) can be made short, and the size of the margin area (the margin between the front half-cut line HC1 and the front end of the label print R) that can be produced on the label due to the above-mentioned distance can be made small.

(2) When Tape Bonding is not Performed

That is, while the foregoing description is directed to the system in which printing is performed on the cover film 103 that is separate from the base tape 101 equipped with the RFID circuit element To and the cover film 103 and the base tape 101 are bonded together, this should not be construed restrictively; for example, the present disclosure may also be applied to a system (of a type in which no bonding is performed) in which printing is performed on a first print area of a cover film layer equipped in a thermal tape serving as a tag tape.

Figure 41:
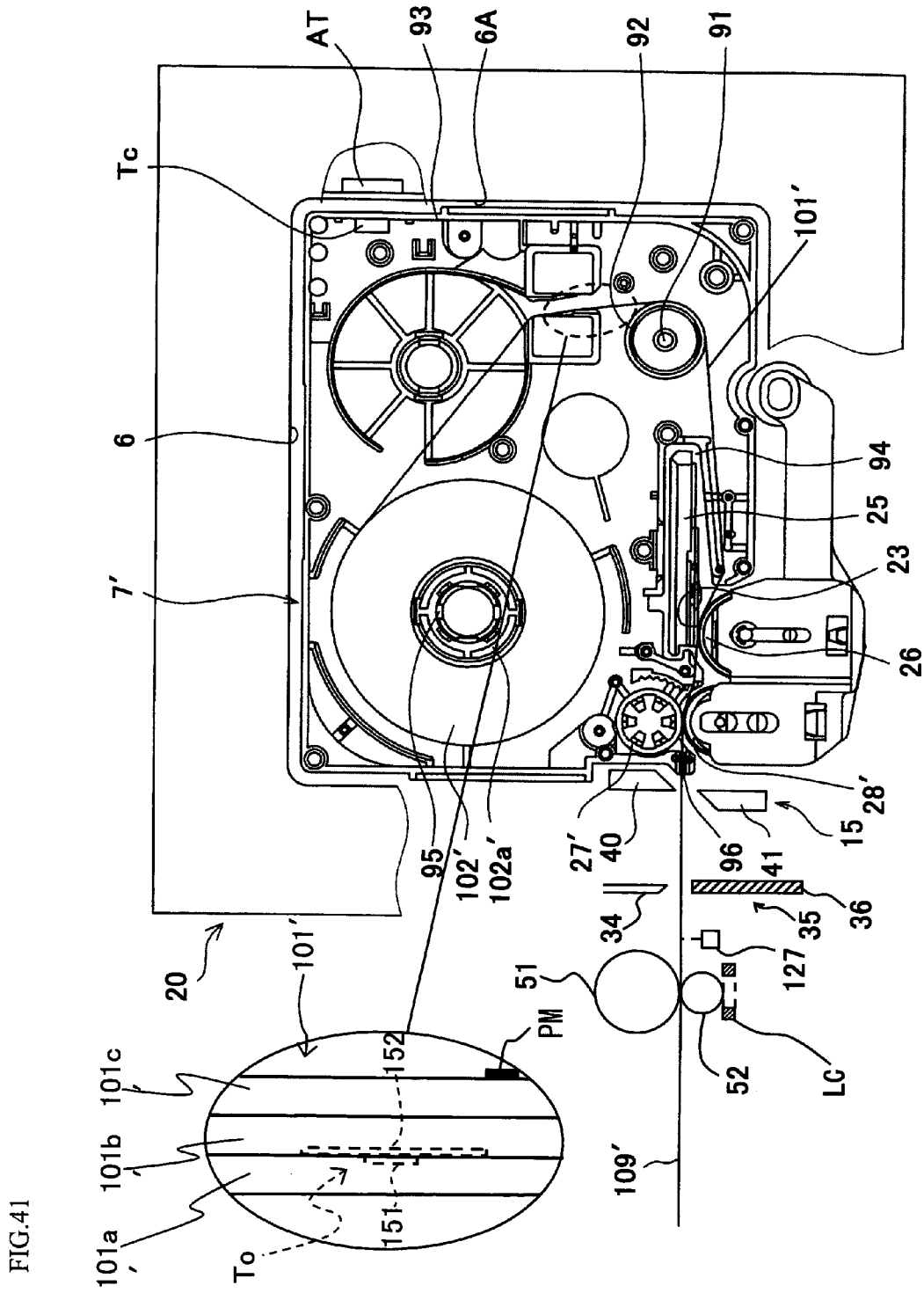
FIG. 41 is a plan view showing the detailed construction of a cartridge according to a modification in which tape bonding is not performed.

FIG. 41 is a plan view, corresponding to FIG. 4 described above, showing the detailed construction of a cartridge 7' according to this modification. The portions that are equivalent to those of FIG. 4 or the like are denoted by the same reference numerals, and description thereof is omitted as appropriate.

In FIG. 41, the cartridge 7' has a first roll 102' around which a thermal tape 101' is wound, and a tape feed roller 27' for feeding the thermal tape 101' toward the outside of the cartridge 7'.

In the first roll 102', the above-mentioned thermal tape 101', which is transparent and in a band shape and has a plurality of the RFID circuit elements To successively formed in the longitudinal direction thereof, is wound around a reel member 102a'. The reel member 102a' is rotatably fitted and accommodated in a boss 95 provided upright on the bottom surface of the cartridge 7'.

The thermal tape 101' wound around the first roll 102' is of a three-layer structure in this example (see the partially enlarged view in FIG. 41). The thermal tape 101' includes a cover film 101a' made of PET (polyethylene terephthalate) or the like having a thermal recording layer on its surface, an adhesive layer 101b' made of a suitable adhesive material, and a separation sheet 101c', which are laminated in the stated order from the side wound on the inner side toward the side opposite thereto.

On the back side of the cover film 101a', the loop antenna 152 (tag-side loop antenna) that is formed in a loop coil-like configuration and performs transmission/reception of information is provided integrally in this example, with the IC circuit part 151 being formed so as to connect to the loop antenna 152. These components constitute each RFID circuit element To. On the back side of the cover film 101a', the separation sheet 101c' is adhered onto the cover film 101a' by means of the adhesive layer 101b'. Further, on the surface of the separation sheet 101c', like the separation sheet 101d, a predetermined identifier for feed control (which in this example is a black-painted identifier. Alternatively, as described above, this may also be a hole bored by laser machining or the like so as to substantially penetrate the thermal tape 101', or the like) PM is provided at a predetermined position corresponding to each RFID circuit element To (which in this example is a position located on the side further forward with respect to the leading end of the antenna 152 located on the forward side in the feed direction).

When the cartridge 7' is loaded onto the cartridge holder 6 and the roller holder 25 is moved from the release position to the abutting position, the thermal tape 101' is held between the print head 23 and the platen roller 26, and between the tape feed roller 27' and a pressure roller 28'. Then, the tape feed roller 27', the pressure roller 28', and the platen roller 26 are rotated in synchronization with each other, and the thermal tape 101' is paid out from the first roll 102'.

The thermal tape 101' thus paid out is supplied to the print head 23 on the downstream side in the feed direction from an opening 94 while being guided by a substantially cylindrical reel 92 rotatably fitted in a reel boss 91 provided upright on the bottom surface of the cartridge. The plurality of heater elements of the print head 23 are energized by the print-head drive circuit 120 (see FIG. 15), and the label print R is thus printed on the front surface of the cover film 101a' of the thermal tape 101' to form a tag label tape 109' with print, which is then carried to the outside of the cartridge 7' from a discharge port 96.

After the tag label tape 109' with print is carried to the outside of the cartridge 7', access (reading/writing of information) is made to the IC circuit part 151 via the loop antenna LC mentioned above. Since the feeding by the drive roller 51, the cutting by the cutting mechanism 15, and the like thereafter may simply be performed in the same manner as those in the above-mentioned embodiment, description of these operations is omitted.

It should be noted that the half-cut unit 35 used is different from the one illustrated in FIG. 10 or the like corresponding to the so-called laminate type. That is, in the structure illustrated in FIG. 10 or the like, the pad 38 is located on the print head 23 side, and the half-cutter 34 is located on the platen roller 26 side. This construction is employed to perform half-cut from the surface on the side opposite to the separation sheet of the tape produced. However, in the case where a thermal tape is used as in this modification (the same applies to the type that will be described later with reference to FIG. 42, in which no lamination is performed and an ink ribbon is used), the separation sheet is located on the side opposite to that in the case of the above-mentioned laminate type. Accordingly, in order to perform half-cut of the portions other than the separation sheet, the placement of the pad 38 and the half-cutter 34 is reversed. That is, the half-cutter 34 is located on the print head 23 side, and the pad 38 is located on the platen roller 26 side.

It should be noted that in this example, in order to allow the above-described cartridge kind information and the like relating to the cartridge 7' to be automatically detected on the device side, a cartridge RFID circuit element Tc, in which information relating to the cartridge 7' is previously stored, is disposed on an outer peripheral side wall surface 93 of the cartridge 7'. Further, an antenna AT for performing transmission/reception of information to/from the RFID circuit element Tc via non-contact wireless communication is provided to a side wall portion 6A of the cartridge holder 6 opposed to the above-mentioned RFID circuit element Tc.

Although not shown in detail, in this modification as well, as in the above-mentioned embodiment, the distance L in the thermal tape 101' from the leading end position of the identifier PM in the tape feed direction to the leading end of the RFID circuit element To in the tape feed direction is set in advance so to be equal to the distance Lo in the tape feed direction between the mark sensor 127 and the print head 23. As a result, in the same manner as in the above-mentioned embodiment described with reference to FIGS. 21 to 29, during the printing by the print head 23 and the feeding of the tag label tape 109' with print, in accordance with whether or not the printing by the print head 23 has been completed at the time when the RFID circuit element To reaches the communication position with the loop antenna LC, the subsequent control on the print head 23 or the loop antenna LC is switched, thereby varying the length of the label main body 103, 101a to 101c between the two half-cut lines HC1, HC2 in conformity to the print length of the label print R mentioned above. Accordingly, as in the above-mentioned embodiment, it is possible to ensure ease of handling of the RFID label T by the user while making the length of the label main body 103, 101a to 101c variable in accordance with the print length of the label print R.

In the structure of the above-mentioned modification, by using a thermal tape as the tag tape, printing is performed solely with the heat generated by the print head 23 without particularly using an ink ribbon or the like. However, this should not be construed restrictively. As in the above-mentioned first embodiment, printing may also be performed using an ordinary ink ribbon.

Figure 42:
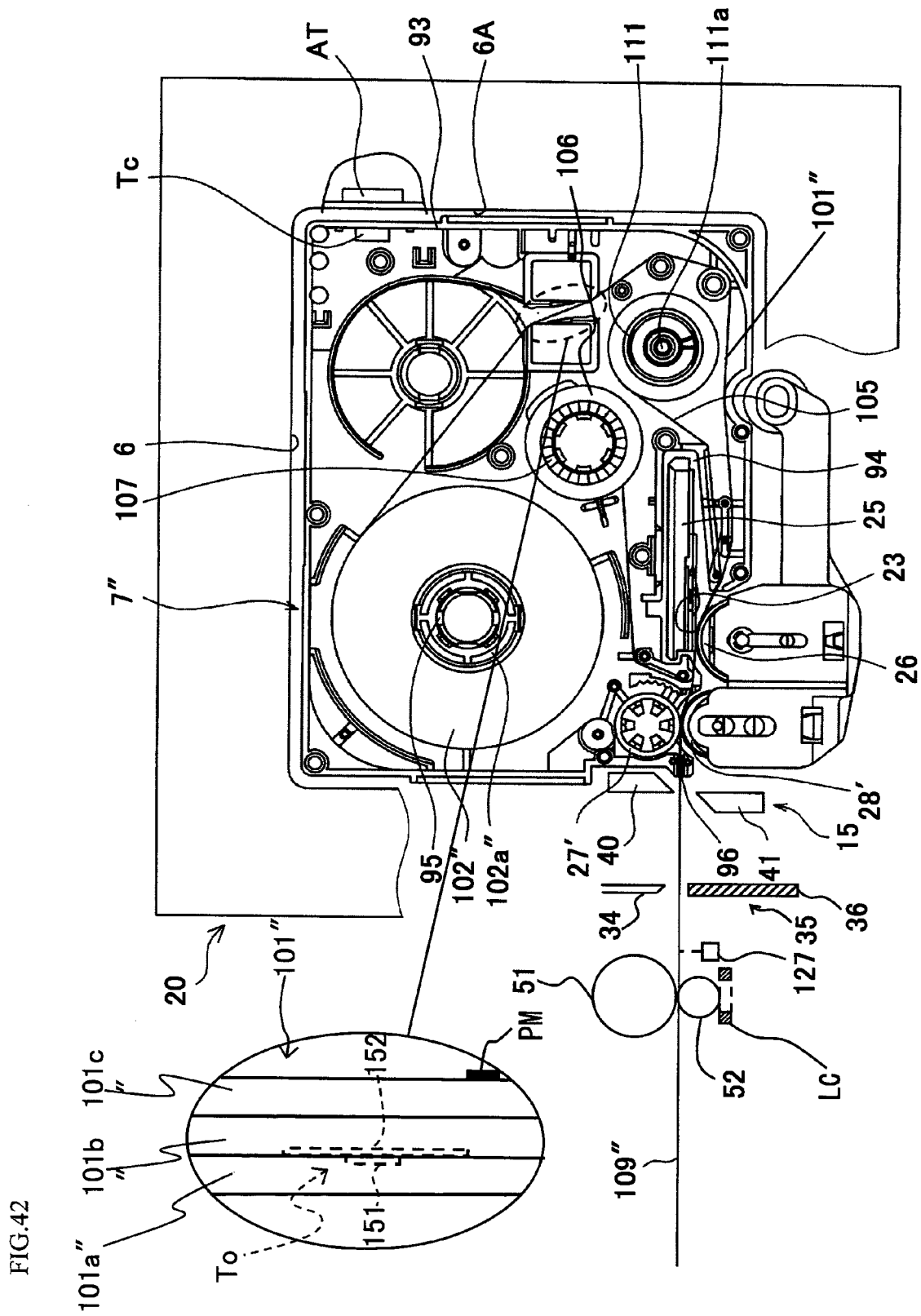
FIG. 42 is a plan view showing the detailed construction of a cartridge according to another modification in which tape bonding is not performed.

FIG. 42 is a plan view, corresponding to FIG. 41 or FIG. 4 mentioned above, showing the detailed construction of the cartridge 7" according to such a modification. The portions that are equivalent to those of FIG. 41, FIG. 4, or the like are denoted by the same reference numerals, and description thereof is omitted as appropriate.

In FIG. 42, the cartridge 7" according to this modification has a first roll 102" around which a base tape 101" is wound.

In the first roll 102", the above-mentioned base tape 101", which is transparent and in a band shape and has a plurality of the RFID circuit elements To successively formed in the longitudinal direction thereof, is wound around a reel member 102a".

The base tape 101" wound around the first roll 102" is of a three-layer structure in this example (see the partially enlarged view in FIG. 42). The base tape 101" includes a colored base film 101a" made of PET (polyethylene terephthalate) or the like, an adhesive layer 101b" made of a suitable adhesive material, and a separation sheet 101c", which are laminated in the stated order from the side wound on the inner side toward the side opposite thereto.

On the back side of the base film 101a", the loop antenna 152 (tag-side loop antenna) that is formed in a loop coil-like configuration and performs transmission/reception of information is provided integrally in this example, with the IC circuit part 151 being formed so as to connect to the loop antenna 152. These components constitute each RFID circuit element To. On the back side of the base film 101a", the separation sheet 101c" is adhered onto the base film 101a" by means of the adhesive layer 101b". Further, in the same manner as described above, on the surface of the separation sheet 101c", a predetermined identifier for feed control (which in this example is a black-painted identifier. Alternatively, as described above, this may also be a hole bored by laser machining or the like so as to substantially penetrate the base tape 101", or the like) PM is provided at a predetermined position corresponding to each RFID circuit element To (which in this example is a position located on the side further forward with respect to the leading end of the antenna 152 located on the forward side in the feed direction).

When the cartridge 7" is loaded onto the cartridge holder 6 and the roller holder 25 is moved from the release position to the abutting position, the base tape 101" and the ink ribbon 105 are held between the print head 23 and the platen roller 26, and between the tape feed roller 27' and the pressure roller 28'. Then, the tape feed roller 27', the pressure roller 28', and the platen roller 26 are rotated in synchronization with each other, whereby the base tape 101" is paid out from the first roll 102".

On the other hand, at this time, the plurality of heater elements of the print head 23 are energized by the print-head drive circuit 120 (see FIG. 15), and the label print R corresponding to information stored in the RFID circuit element To is thus printed on the front surface of the base film 101"a of the base tape 101" to form a tag label tape 109" with print, which is then carried to the outside of the cartridge 7".

After the tag label tape 109" with print is carried to the outside of the cartridge 7", access (reading/writing of information) is made to the IC circuit part 151 via the loop antenna LC described above. Since the feeding by the drive roller 51, the cutting by the cutting mechanism 15, and the like thereafter may simply be performed in the same manner as those in the above-mentioned embodiment, description of these operations is omitted. Further, the half-cut unit 35 used is the same as that of the modification shown in FIG. 41 described above.

In this modification as well, as in the modification shown in FIG. 41 mentioned above, the distance L in the base tape 101" from the leading end position of the identifier PM in the tape feed direction to the leading end of the RFID circuit element To in the tape feed direction is set in advance so to be equal to the distance Lo in the tape feed direction between the mark sensor 127 and the print head 23. As a result, in the same manner as in the above-mentioned embodiment described with reference to FIGS. 21 to 29, during the printing by the print head 23 and the feeding of the tag label tape 109" with print, in accordance with whether or not the printing by the print head 23 has been completed at the time when the RFID circuit element To reaches the communication position with the loop antenna LC, the subsequent control on the print head 23 or the loop antenna LC is switched, thereby varying the length of the label main body 103, 101a to 101c between the two half-cut lines HC1, HC2 in conformity to the print length of the label print R mentioned above. Accordingly, as in the above-mentioned embodiment, it is possible to ensure ease of handling of the RFID label T by the user while making the length of the label main body 103, 101a to 101c variable in accordance with the print length of the label print R.

(3) Others

The foregoing description is directed to the example in which, using a loop antenna as the antenna LP on the device side or the antenna 152 on the RFID circuit element To side, transmission/reception of information is performed by magnetic induction (electromagnetic induction, magnetic coupling, and other such non-contact induction method performed via a magnetic field). However, this should not be construed restrictively. For example, transmission/reception of information may be performed by radio communication by using, as the above-mentioned two antennas, dipole antennas, patch antennas, or the like.

Further, while in the foregoing example the half-cut unit 35 is provided separately from the cutting mechanism 15, this should not be construed restrictively. That is, for example, half-cutting may be performed by controlling the pivot angle of the stationary blade 41 of the cutting mechanism 15 to be smaller than that at the time of full-cutting. The same effect as mentioned above can be attained in this case as well.

Further, while the foregoing description is directed to the example in which RFID tag information is transmitted to the RFID circuit element To and written to the IC circuit part 151 to thereby produce the RFID label T, this should not be construed restrictively. That is, as already mentioned above, the present disclosure is also applicable to the case where the RFID label T is produced by reading RFID tag information from a read-only RFID circuit element To in which predetermined RFID tag information is previously stored and retained in a non-rewritable manner, and performing printing corresponding to the read information. In this case as well, the same effect as mentioned above can be attained.

Further, it may be also possible to detachably mount the above-mentioned first roll 102 to the tag-label producing device 1 side directly without using the cartridge 7. Further, the present disclosure is not limited to the one that can be detachably mounted to the tag label producing device 1 side such as the cartridge 7, either; the first roll 102 may be formed as an installed or integral type one that is undetachably mounted on the device main body side. In this case as well, the same effect as mentioned above can be attained.

It is assumed that the "Erase" signal, the "Verify" signal, and the "Program" signal used in the foregoing description conform to the specifications developed by EPC global. EPC global is a non-profit corporation jointly founded by the international EAN association, which is an international association of distribution codes, and the Uniformed Code Council (UCC), which is a distribution code association of the United States. It should be noted that signals that conform to other standards may be used as long as they serve the same function.

Further, while the foregoing description is directed to the example in which the RFID label equipped with the RFID circuit element To is produced as the print label, this should not be construed restrictively. That is, as long as the originally intended effect of the present disclosure, namely ensuring ease of handling of the label by the user while making the length of the label main body portion variable in accordance with the print length, can be attained, the present disclosure may be applied to a label producing device for producing an ordinal print label not equipped with the RFID circuit element To and to a print label produced by using such a label producing device. In this case, the loop antenna LC, the transmitting circuit 306, and the receiving circuit 307 can be omitted in the label producing device 1, and on the label side as well, the RFID circuit element To become unnecessary.

Further, other than those already described above, the methods according to the above-mentioned embodiment and the respective modifications may be used in combination as appropriate.

In addition, although not exemplified herein, it is to be understood that the present disclosure is implemented in various modified forms without departing from the scope of the present disclosure.

What is claimed is:

1. A label producing device comprising:

a feeding device that feeds a label tape in a tape-length direction, said label tape including: a print-receiving medium layer, an affixing adhesive layer for affixing said print-receiving medium layer onto a target affixing object, and a separation layer that covers said affixing adhesive layer;

a printing device that prints content on a first print area provided in said print-receiving medium layer;

a half-cutting device that cuts layers of said label tape, other than said separation layer, in a tape-width direction, to form two half-cutting parts;

said two half-cutting parts including opposing first and second half-cutting parts respectively located on opposing first and second tape-length end sides with respect to said first print area;

a cutting device that forms a cutting part, whereby said label tape is cut in the tape-width direction, on sides further toward both tape-length end sides with respect to said two half-cutting parts;

a detection device that detects a detection identifier that is located on said first of said tape-length end sides, opposite to said first print area of said print-receiving receiving medium layer, across said first of said two half-cutting parts; and a transmitting/receiving device that performs transmission/reception of information to/from an RFID circuit element in a non-contact manner, said RFID circuit element being included in said label tape and having an IC circuit part for storing information and an antenna for performing transmission/reception of information;

wherein a distance Lo between said detection device and said printing device along a feed path due to said feeding device is shorter than a distance L in said label tape between a front end portion of said RFID circuit element in the feed direction and said detection identifier.

2. A label producing device comprising:

a feeding device that feeds a label tape in a tape-length direction;

said label tape including: a print-receiving medium layer; an affixing adhesive layer for affixing said print-receiving medium layer onto a target affixing object; and a separation layer that covers said affixing adhesive layer;

a printing device that prints content on a first print area provided in said print-receiving medium layer;

a half-cutting device that cuts layers of said label tape, other than said separation layer, in a tape-width direction, to form two half-cutting parts;

said two half-cutting parts including opposing first and second half-cutting parts respectively located on opposing first and second tape-length end sides with respect to said first print area;

a cutting device that forms a cutting part, whereby said label tape is cut in the tape-width direction, on sides further toward both tape-length end sides with respect to said two half-cutting parts;

a detection device that detects a detection identifier that is located on said first of said tape-length end sides, opposite to said first print area of said print-receiving medium layer, across said first of said two half-cutting parts; and a transmitting/receiving device that performs transmission/reception of information to/from an RF1D circuit element in a non-contact manner;

said RFID circuit element being included in said label tape and having an IC circuit part for storing information and an antenna for performing transmission/reception of information;

wherein a distance Lo between said detection device and said printing device along a feed path due to said feeding device is substantially equal to a distance L in said label tape between a front end portion of said RFID circuit element in the feed direction and said detection identifier.

3. A device for producing labels from label tape, said tape comprising layers including: a print-receiving medium layer including print areas; an affixing adhesive layer for affixing said print-receiving medium layer onto a target affixing object; and a separation layer for covering said affixing adhesive layer;

said device comprising:

a feeding device for feeding a front end of said tape in a downstream direction;

a printing device for printing content on each print area;

a half-cutting device for cutting pairs of half-cutting parts, each pair of half-cutting parts cutting through said tape layers, other than said separation layer, in a tape widthwise direction;

each pair of half-cutting parts disposed about one print area so that each pair of half-cutting parts defines a front half-cutting part and a rear half-cutting part;

a cutting device for forming widthwise cutting parts, wherein adjacent to each cutting part, in said downstream direction, said tape forms one label, each label having a front end and a rear end and including one pair of half-cutting parts; and a cooperative control device for cooperatively controlling said feeding device, said cutting device, and said half-cutting device, whereby:

(i) each label has a substantially same tape total length; and (ii) within each label, said pair of half-cutting parts is positioned about said print area in accordance with the printed content, so that said labels are capable of having differing lengthwise dimensions between each pair of half-cutting parts.

4. The device of claim 3, wherein:

said printing device prints predetermined information on a second print area in each label, said second area being located between said rear half-cutting part and said cutting part.

5. The device of claim 3, further including:

a detection device that detects detection identifiers, one detection identifier located on each label; and said control device further controls said devices such that, in each label, each detection identifier is downstream from each front half-cutting part.

6. The device of claim 5, further including:

a transmitting/receiving device that performs transmission/reception of information in a non-contact manner to/from RFID circuit elements, one RFID circuit element located on each label; and each RFID circuit element having an IC circuit part for storing information and an antenna for performing transmission/reception of information.

7. The device of claim 6, further comprising:

a pressure device that bonds said print-receiving medium layer with a base layer where each RFID circuit element is arranged via a bonding adhesive layer.

8. The device of claim 6, wherein a distance Lo between said detection device and said printing device along a feed path due to said feeding device is shorter than a distance L in each label, between a front end portion of each RFID circuit element and each detection identifier.

9. The device of claim 6, wherein a distance Lo between said detection device and said printing device along a feed path due to said feeding device is substantially equal to a distance L in each label between a front end portion of each respective RFID circuit element in the feed direction and each detection identifier.

* * * * *